Dec. 30, 1969    R. W. DUTHIE ET AL    3,487,173
SMALL EXCHANGE STARED PROGRAM SWITCHING SYSTEM
Filed July 15, 1966    29 Sheets-Sheet 1

INVENTOR.
ROBERT W. DUTHIE
ROBERT M. THOMAS
BY
Bernard E. Franz
ATTY.

Dec. 30, 1969    R. W. DUTHIE ET AL    3,487,173
SMALL EXCHANGE STARED PROGRAM SWITCHING SYSTEM
Filed July 15, 1966    29 Sheets-Sheet 18

REGISTER & LINE SCAN

LINE CFS ROUTINE

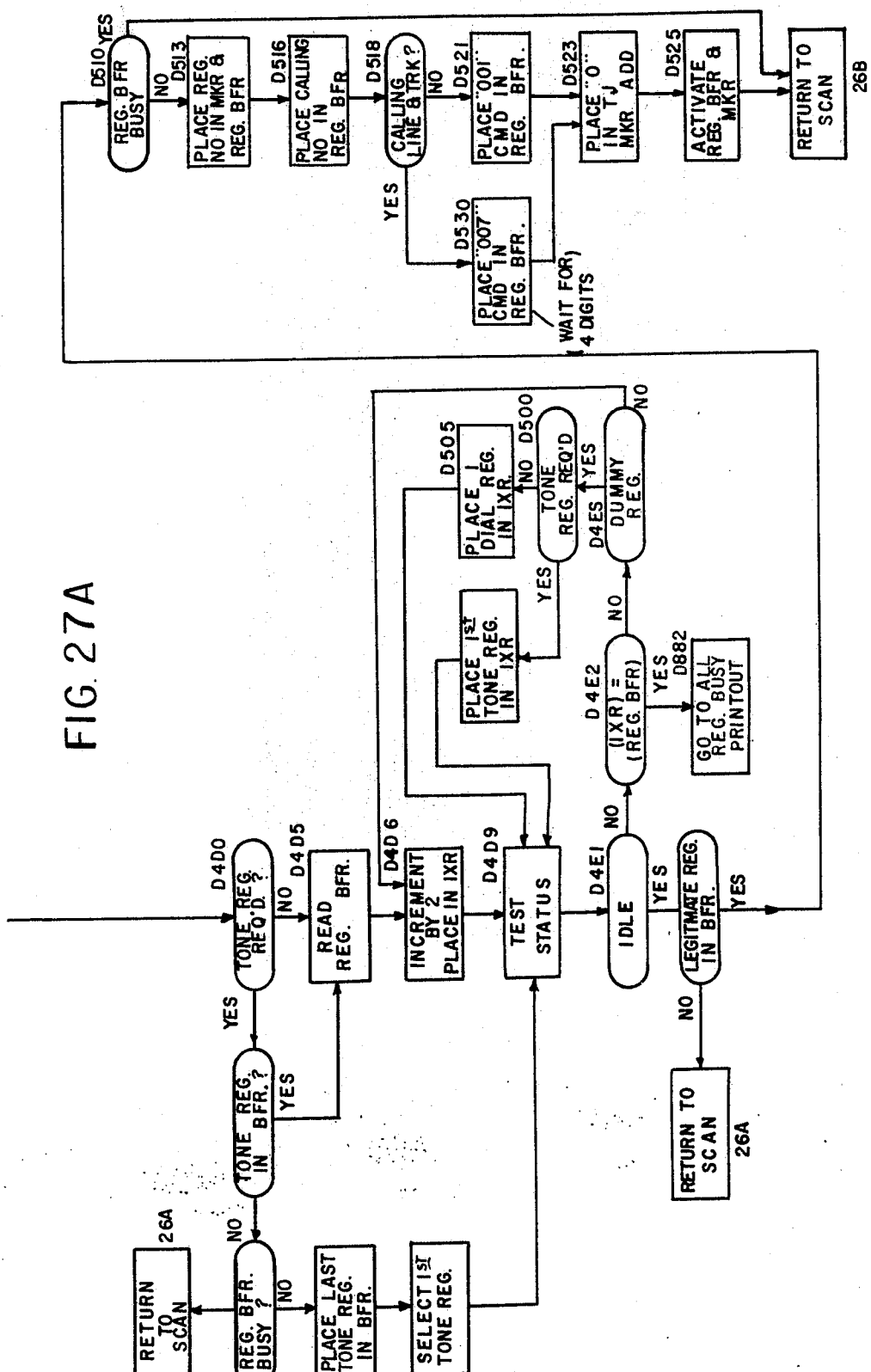

REGISTER CFS ROUTINE

REG CFS ("0100")

REG CFS ("0345")

REG CFS ("0300-0400-0700-0200-0342")
AND BUSY TONE ROUTINES

REG CFS ("0411")

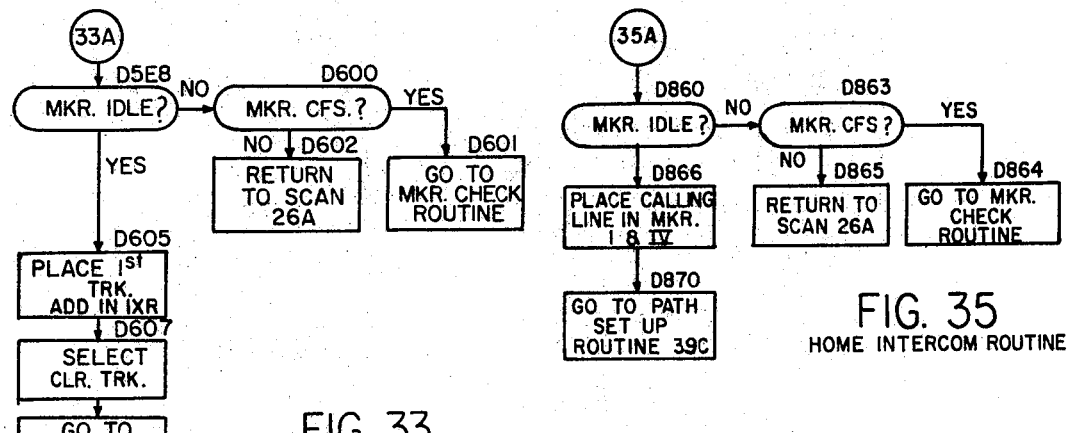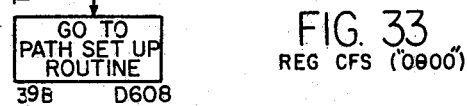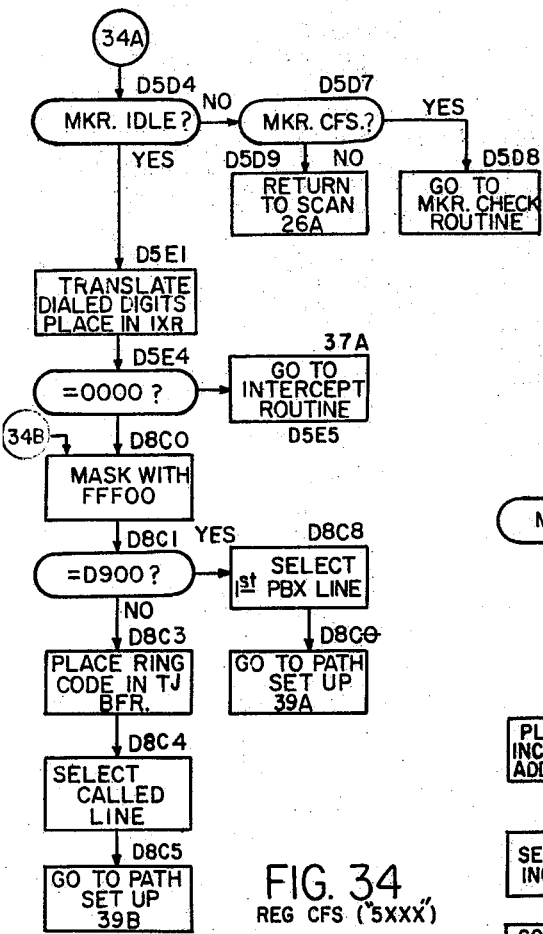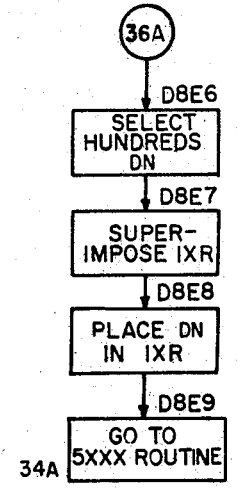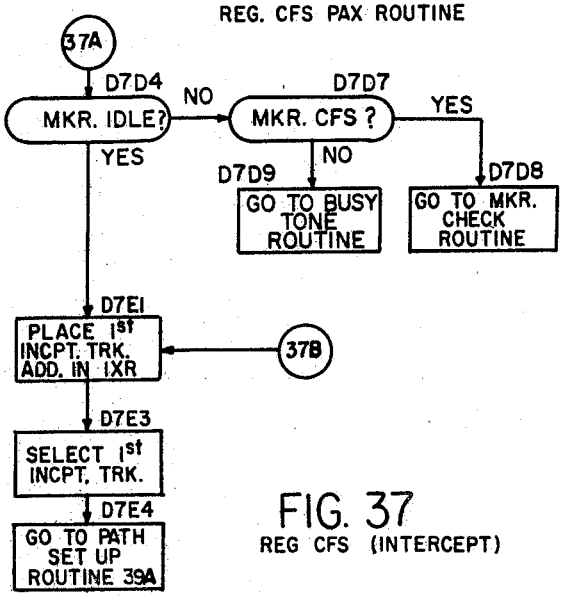

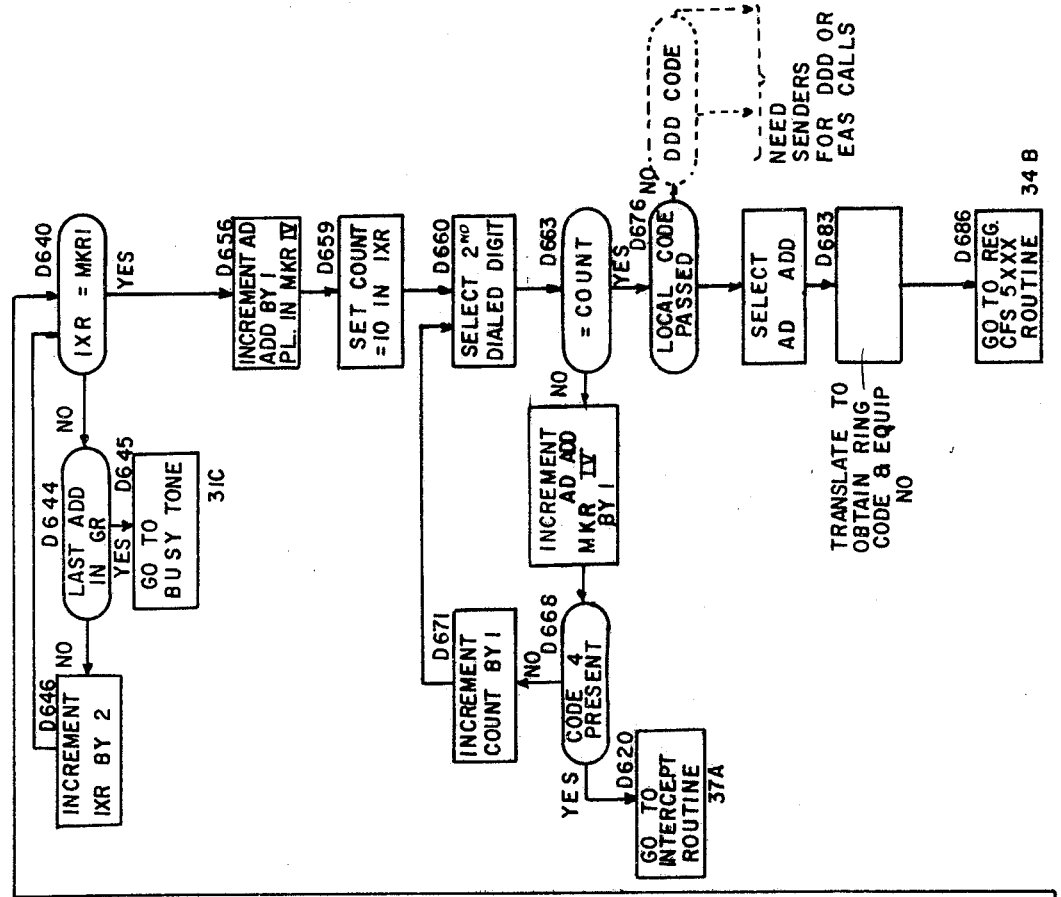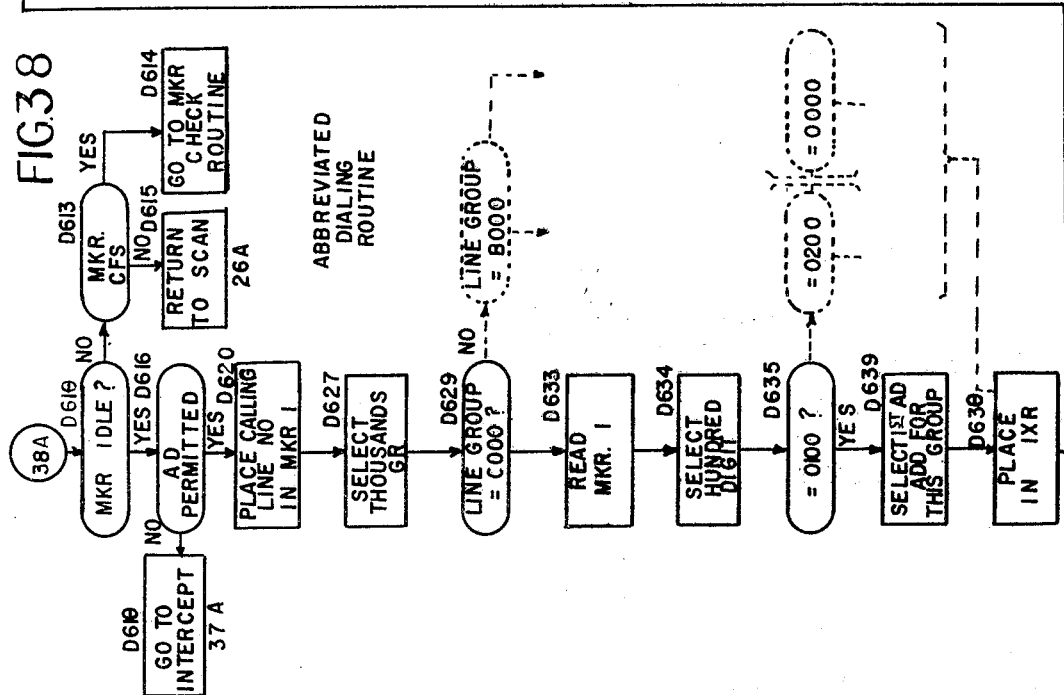

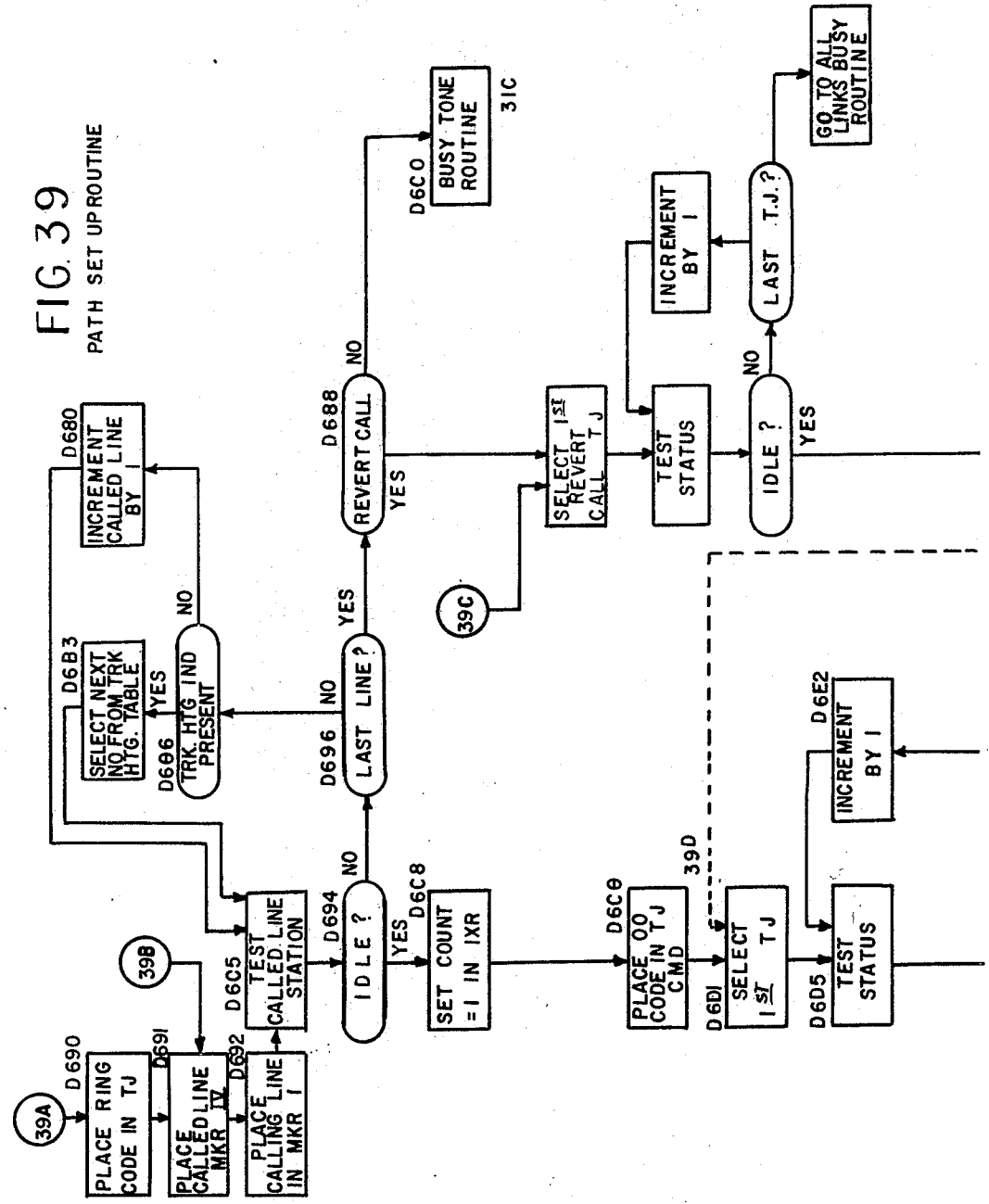

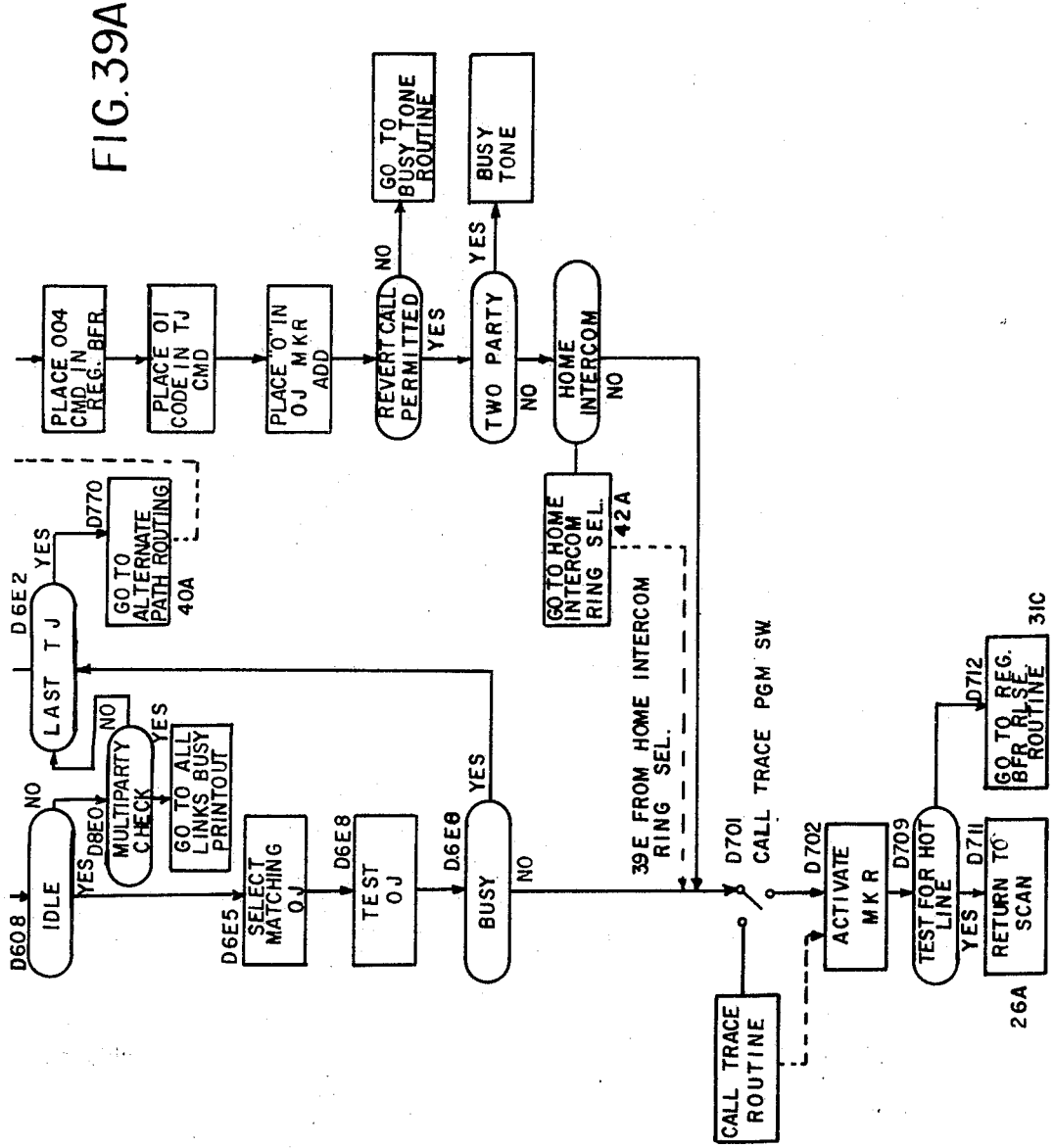

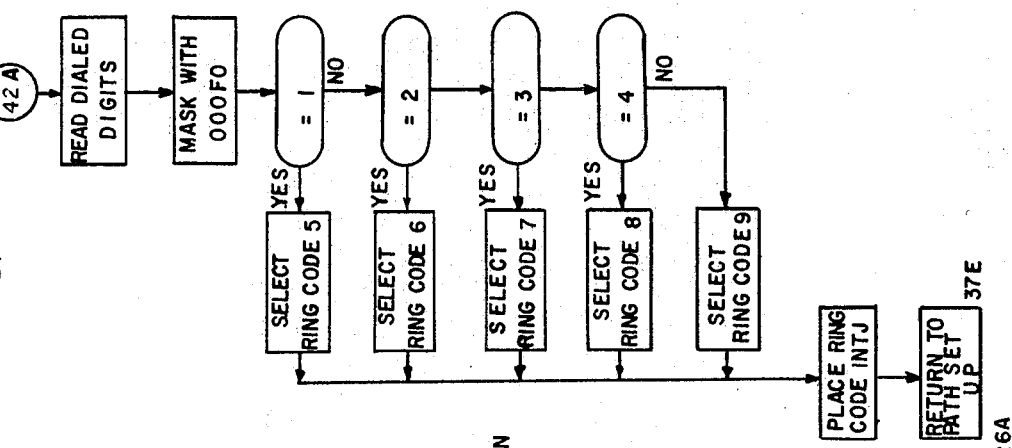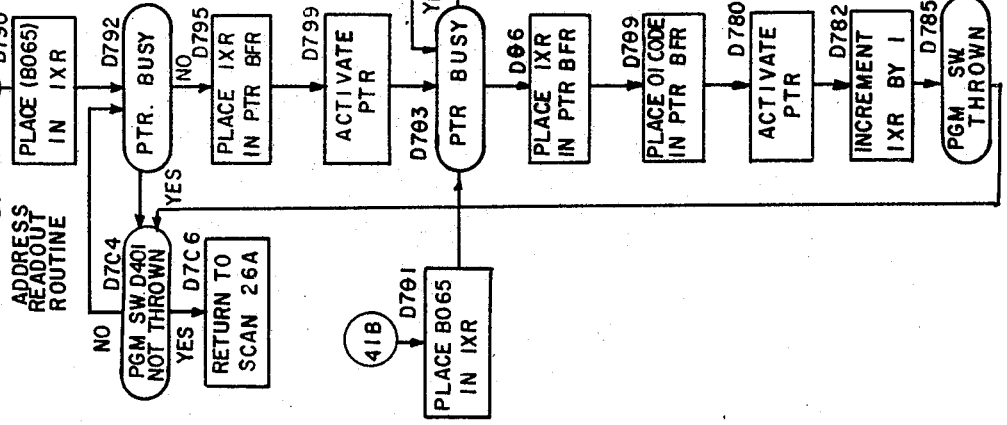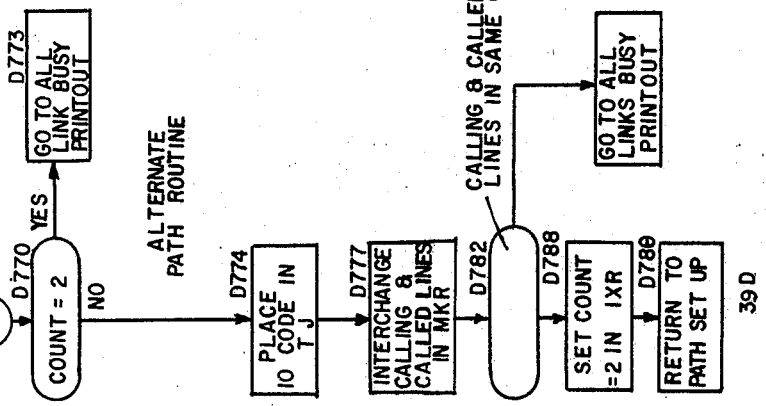

United States Patent Office 3,487,173
Patented Dec. 30, 1969

3,487,173
SMALL EXCHANGE STORED PROGRAM
SWITCHING SYSTEM
Robert W. Duthie and Robert M. Thomas, Brookville,
Ontario, Canada, assignors to Automatic Electric
Laboratories, Inc., Northlake, Ill., a corporation of
Delaware
Filed July 15, 1966, Ser. No. 565,544
Int. Cl. H04m 3/00
U.S. Cl. 179—18                             19 Claims

ABSTRACT OF THE DISCLOSURE

A small exchange (2000 lines and trunks) with an electro mechanical switching network and an electronic common control. A read-only ring core memory stores a program, translation information, and tables. Each word of memory comprises a wire manually threaded through some cores (bit value "1") and around others (bit value "0"). The memory also includes a line and junctor status section in which each word wire is in series with relay contacts of a line or junctor circuit for indicating busy, idle, call-for-service, etc. There is no separate temporary memory, but certain flip-flops are given a memory address.

---

This invention relates to a communication switching system, and more particularly to a stored program small exchange system.

Automatic communication switching systems employing a stored program computer type central processor are known, as disclosed for example in Budlong et al. U.S. Patents 2,955,165 and 3,223,785 and in the Bell System Technical Journal, September 1964, volume XLIII, No. 5. Switching systems of this type possess many advantages. The use of electronic components greatly reduces bulk of an exchange. The high speed of electronic components makes it possible to use only a single central processor to perform the necessary operations for each call serially or sequentially, while still adequately handling the traffic load. The use of a stored program in place of wired interconnections to provide the various functions greatly increases the flexibility of a telephone switching system, permitting rapid and inexpensive rearrangements to meet changes in traffic and other environmental conditions and facilitates the addition of new unusual functions in the system. Many new and novel services may be rendered to the communication system subscribers. Stored program systems have been designed to be economical over a range of approximately 4,000 lines up to about 65,000 lines. These systems are based on a single highspeed central processor which is essentially the same in both large and small offices.

It is the principal object of this invention to provide a stored program switching system which is economically competitive with systems of other types for small exchanges. The system disclosed herein provides an exchange serving a maximum of 2,500 line terminals.

Another object of the invention is to provide a central processor having a relatively small number of computer type operations provided by the hardware, and to provide these operations with simple inexpensive electronic logic circuits.

Another object is to provide a system memory which is expandable with a relatively low fixed cost to avoid penalizing the smaller sized offices, which employs a simple technology, and which is readily alterable by maintenance personnel in the field without elaborate tools.

The system according to the invention employs a memory of the ring core type, in which a number of relatively large toroidal cores with linear magnetization characteristics are manually threaded with wires, with each wire being one word having one bit for each core. The information stored is determined by threading the wire selectively through some cores and around other cores. This memory is a random access, mechanically alterable type. There is no separate temporary memory other than storage units provided in the central processor and various peripheral units.

According to a feature of the invention, the scanning of the lines, registers, and other peripheral units is combined with the processing of calls, whereby no separate line scanner is required. Directoy number translations are also combined therewith. The ring core memory is provided with four types of word wires in respective sections, a status section, a program section, a translation section, and tables.

It is a feature of the invention that the status of lines, registers, and other peripheral units is determined by wires threaded through given cores of the memory, and thence to relay contacts of the units. The wires may then be threaded through other cores of the memory to give information such as class of service. Each of these lines, registers and other units is assigned a memory address, and on this address being activated via the memory input, if the relay contacts are closed a bit is read from the memory core in series therewith.

Elimination of a large capacity temporary memory is made possible by using space division registers which are capable of receiving dialing signals and performing all of the counting and timing operations associated therewith independently of the central processor, and calling for service from the central processor in accordance with instructions received therefrom.

A feature of the invention relates to the numbering system plan for the memory addresses. Each digit in the numbering system is represented by four binary bits, which provides more than the ten decimal digit values. The decimal values are used for directory numbers, while the larger digit values are used for equipment number addresses and program addresses. This numbering system permits the reduction of the number of computer operation codes, permits less expensive equipment in the central processor, and provides other advantages.

Since a memory address which is not provided with any word wire produces an output of all zeros, this output from a directory number translation is used as an instruction to route a call to an intercept operator.

The above-mentioned and other objects and features of this invention and the manner of attaining them will become more apparent and the invention itself will be best understood, by reference to the following description of an embodiment of the invention taken in conjunction with the accompanying drawings comprising FIGS. 1 to 42, wherein:

FIG. 1 is a system block diagram;
FIGS. 2–4 comprise a functional block diagram of the memory;
FIG. 5 is a schematic diagram of part of the memory;
FIGS. 6–7 comprise a functional block diagram of the central processing unit;
FIGS. 8–9 comprise a call-through diagram;
FIG. 10 is a functional block diagram of the register buffer;
FIGS. 11–12 comprise a symbolic diagram of the switching network;
FIGS. 13–15 comprise a functional block diagram of the marker;
FIGS. 16–17 comprise a diagram of a register;
FIG. 18 is a graph of the clock pulses;
FIG. 19 is a timing sequence chart for the marker;

FIGS. 26-42 are flow charts.

SYSTEM—GENERAL DESCRIPTION

Figure 1:
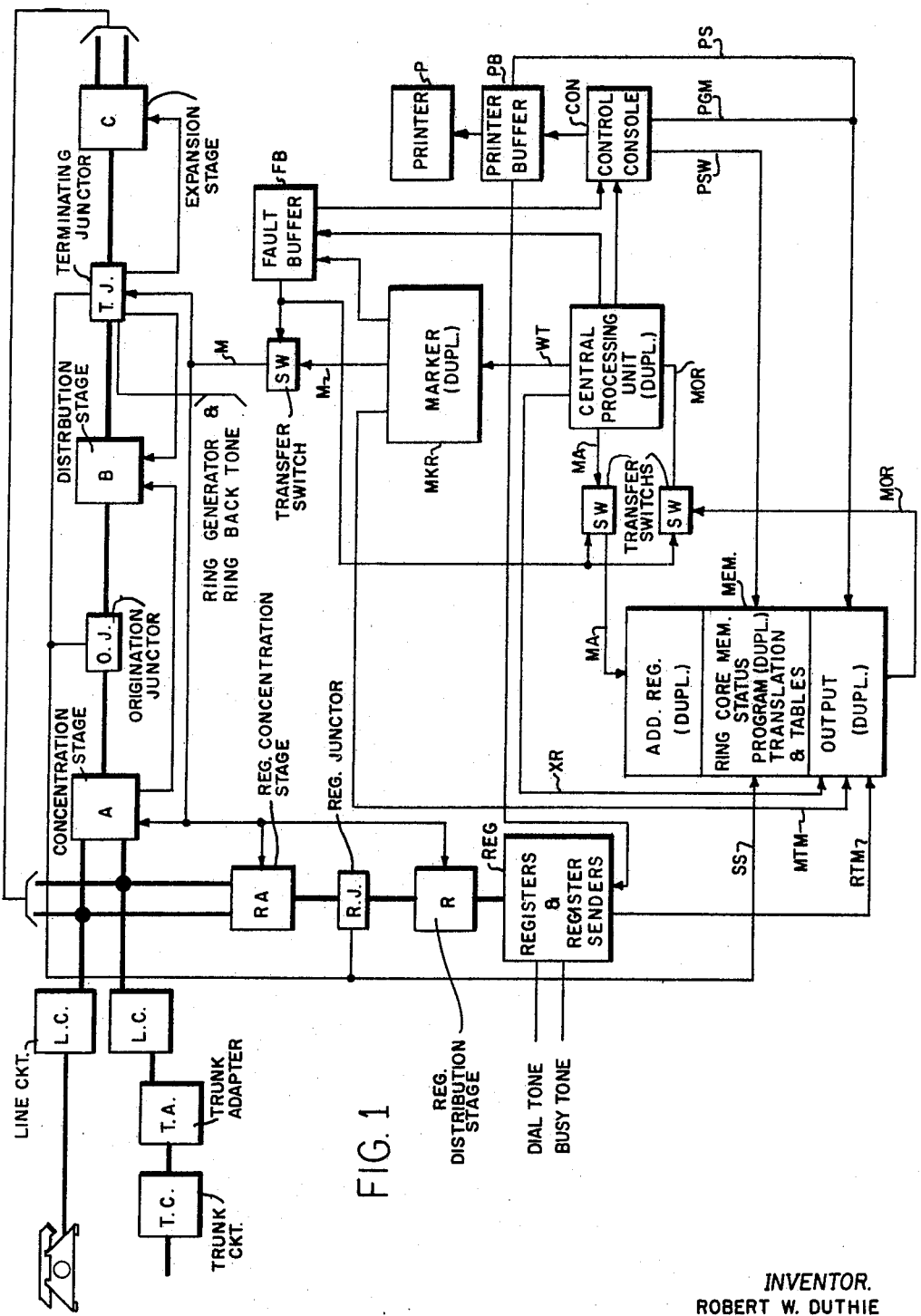

As shown in the block diagram of FIG. 1, the switching system comprises a coordinate metallic-path switching network with a marker MKR, and a stored program digital computer control arrangement. The computer comprises a central processing unit CPU and a memory unit MEM along with input devices and output devices in the peripheral units.

The system makes use of a permanent memory of the ring core type; and has no separate temporary memory other than relays and flip-flops in the central processing unit and the various peripheral units. Ring core memories have been used in telephone switching systems for automatic number identification and number group translators, one example being the arrangement disclosed in the T. L. Dimond U.S. Patent No. 2,614,176 issued Oct. 14, 1952 for Electronic Induction Number Group Translator. In the present system the ring core memory is used not only for translation but also for the stored program, and in conjunction with relay contacts in the peripheral units to indicate the status thereof.

The switching network uses a switching mechanism with some modifications of the type described in the H. P. Boswau U.S. Patent No. 2,573,889 issued Nov. 6, 1951 for Automatic Telephone Switching Mechanism. The basic device of the network is a "switch" for connecting a three conductor line between a single inlet and any one a hundred outlets, that is, it is a 1 x 100 matrix. Any number of these switches up to thirty-two are mounted on a "gate" having one hundred sets of bars, with three bars in a set, extending through the switches. Each switch has ten tens relays, ten units relays, and one allotter relay. Each gate also includes twenty or forty allotter bars extending through the switches, the tens and units relays in each switch having their windings individually connected to contacts of the allotter relay for connection, upon operation of the allotter relay, directly to the allotter bars. Operation of the switch requires operation of one tens relay and one units relay via contacts of the allotter relay to connect the single input to the bars for one of the outlets, the tens and units relays being held subsequent to the release of the allotter relay via ground potential on a control conductor which is one of the bars of the set.

The switching network comprises an A stage for concentration, a B stage for distribution, and a C stage for expansion. Originating junctors O.J. are included in the links between the A and B stages, and terminating junctors T.J. are included in the links between the B and C stages. In addition an RA stage and an R stage in tandem provide for connections from the line terminals to registers and register senders REG. Register junctors R.J. are provided in the links between the RA and R stages. The A stage, C stage, and RA stage all comprise switches mounted on the same gate for each hundred-line group. The system provides for a maximum of twenty-five line groups of one hundred lines each. Each of these switches mounted on a line group gate has its single inlet individually connected to one of the junctors, namely each A stage switch is connected to an originating junctor, each C stage switch to a terminating junctor, and each RA stage switch to a register junctor. The B stage comprises switches which have been split to provide two 1 x 25 matrices on a single switch, instead of a 1 x 100 matrix. Mounting twenty-five of these switches on a gate provides two 25 x 25 matrices. The R stage provides for distribution to connect any register junctor to any one of the registers or register senders.

The registers each provide storage for the equipment number of the calling line to which it is connected when in use, and equipment to receive and store dialed digits, including equipment for timing and counting on a space division basis.

The terminating junctors include the equipment required to supervise a connection once it is established including supply of transmission current, supply of ringing signals and ringback tone, with ringing for individual or party lines, provide for metallic cut through on trunk calls, and provide for reverting calls. Not all of the terminating junctors provide all of the possible features, but they are divided into classes as required.

Each of the network line terminals is provided with a three relay line circuit L.C. These terminals provide for service to all of the local lines and trunks, the trunks being a special class of line. The trunk lines in addition to their class of service marking, are provided with trunk circuits T.C. and trunk adapters T.A. as required. The trunks include several classes of incoming, outgoing and two-way trunks.

A control console CON provides a machine operator with a means of access to the computer for testing and routining purposes. It includes various manual switches for this purpose.

A printer P along with a printer buffer PB provides for reading out information from the computer for various test and information purposes.

A fault buffer FB provides for monitoring the operation of the system and for controlling the transfer switches SW to determine which of the duplicated units (indicated by DUPL. in FIG. 1) in the central processor, marker and the memory are in active service.

OPERATION—GENERAL DESCRIPTION

To place a call the subscriber of a local station removes his handset operating the line relay in the line circuit. A set of contacts of the line relay completes a path through one of the cores of the memory so that when this line circuit is addressed an indication of the call for service is provided from the memory to the central processing unit while scanning under control of the program. The computer then examines the busy or idle condition of those paths which can connect the calling line to a register. This process includes addressing the register junctors to determine their status via conductor group SS. The computer also finds an idle register, instructs the marker MKR, and upon finding an available idle path instructs the marker as to the identity of the path and also sends an instruction to the register to supply dial tone, and to wait for one digit and then call for service. At the same time that the comptuer is scanning lines it is also scanning the registers, with the registers having priority in scanning. After the calling line is connected to the register, the computer returns to scanning.

After the first digit has been dialed by the subscriber and stored in the register, the register calls for service. The computer detects this condition and examines the dialed digit. The dialed digit is translated by the memory, and the computer decides whether this is an operator call, a direct distance dialing call, or whether more digits are required before a decision can be made.

Assuming that this is a local call, the computer instructs the register to wait for two more digits and then again call for service. The computer then goes back to scanning. After the third digit is received and stored in the register, the computer responds to a call for service therefrom and causes a translation of the three digits which reveals that this is a local call. The register is then instructed to wait for four more digits and the computer goes back to scanning.

If the call were an outgoing trunk call a path would be connected from the calling line through the A, B, and C stages during the interdigital pause. The subsequent dialed digits would then be pulsed directly over the trunk to the distant office. Register-senders can be provided as an option for outgoing trunk calls.

Returning to the local call, after seven digits have been dialed, the computer responds to the call for service. A translation of the directory number reveals the equipment number location of the called party and a ringing code for this party.

The computer then tests the called line to determine whether it is busy or idle. If busy, the register is instructed to supply busy tone. If idle, the computer selects an idle path, and instructs the marker to connect this path, instructs the register to release, and instructs the terminating junctor as to how the called party is to be rung. The computer then returns to scanning.

The connected path has now been established from the calling line through the A and B stages to a terminating junctor, and from there through the C stage to the called line. The terminating junctor applies the ringing current, trips the ringing when the called party answers, and supplies transmission current to both parties. The terminating junctor also detects the on hook condition at the end of the call and releases the connection.

COMPONENTS AND SYMBOLISM

Figure 5:
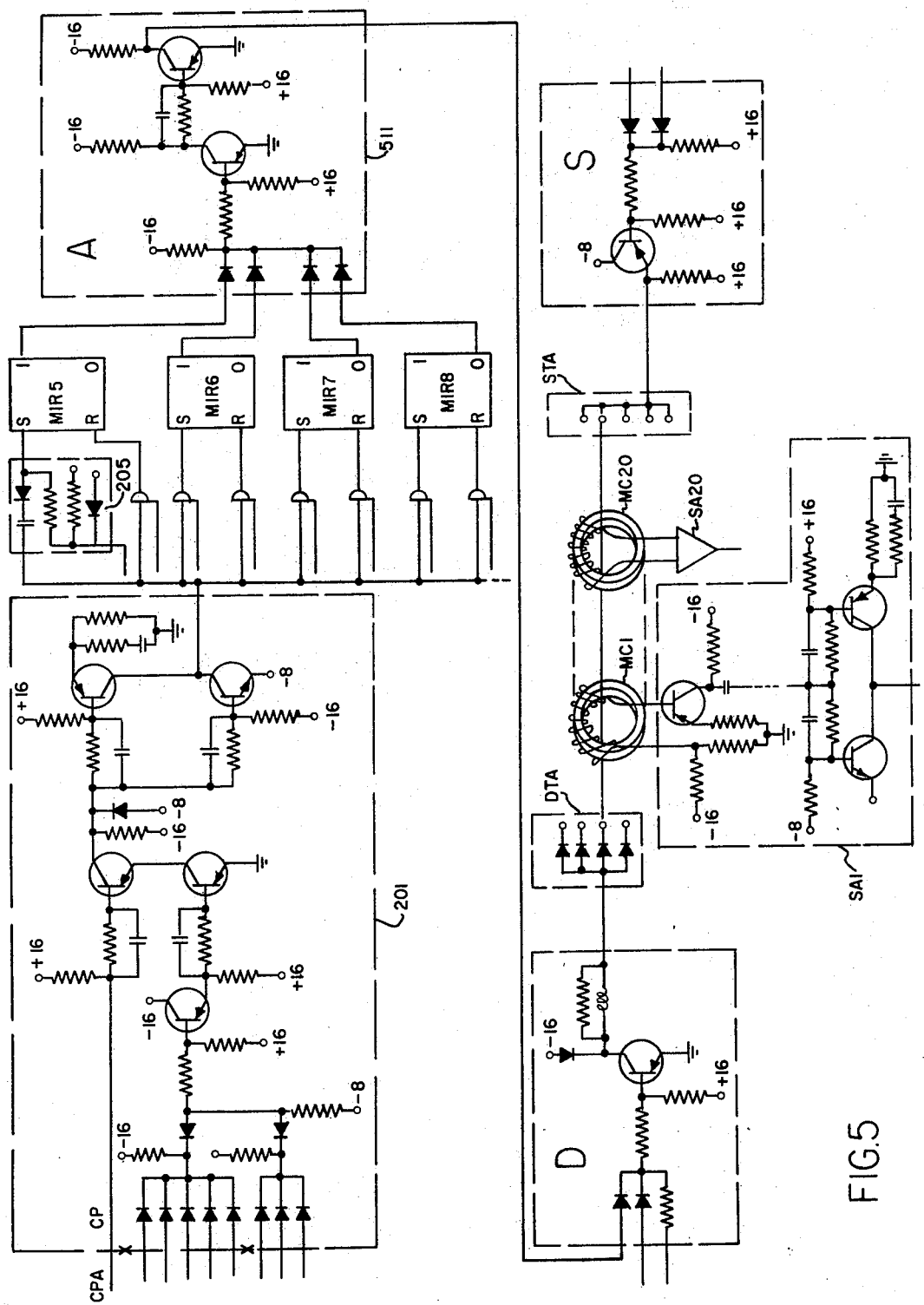
Figure 21:
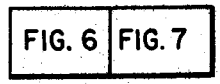

The components used in this system comprise telephone type relays, reed relays, and electronic circuits. The electronic building block circuits are generally of the type used in the system disclosed in U.S. Patent No. 3,173,994, wherein schematic diagrams are shown in FIG. 21 of a NOR gate, a flip-flop, and a reed relay driver. The coincidence gates shown as part of the flip-flop input circuits therein, are shown separately from the flip-flops herein. FIG. 5 herein shows additional schematic diagrams of some circuits. A flip-flop input coincidence gate such as 205 is shown symbolically in FIG. 2 and schematically in FIG. 5. This coincidence gate has an A.C. input shown symbolically at the center and a D.C. input shown symbolically off the side. Gated pulse amplifiers such as 201 shown symbolically in FIG. 2 and schematically in FIG. 5 are used to amplify A.C. trigger pulses under the gating control of direct current input signals. Each gated pulse amplifier includes a five-input diode AND gate, a three-input diode AND gate, an OR gate combining the outputs of the two diode AND gates, and a transistor gating arrangement to use the direct current output of the OR gate to enable or disable the trigger pulse input to accordingly generate or block an output trigger pulse. Many of the gated pulse amplifiers are drawn in several figures with unused inputs not shown, to simplify the drawing. If all inputs of one diode AND gate portion are unused, they must be grounded.

FIG. 5 also shows an AND gate designated symbolically with the letter A which comprises a four-input diode gate followed by a two-stage transistor amplifier. The memory includes driver circuits designated symbolically by the letter D, and switch circuits designated symbolically by the letter S.

Both flip-flops and relays are used as temporary storage registers in this system—there is no other temporary memory. Various gating, decoding, and other logic functions are generally performed by the standard electronic circuit components. Except for the pulse input of the gated pulse amplifiers and the flip-flop input coincidence gates, the logic signals are direct-coupled (D.C.), that is signals are represented by steady-state voltages. Two levels are employed. The first level is usually −8 volts and represents the binary 1 or true condition. The second level, ground potential, represents the binary 0 or false condition. The input leads are generally biased negative, so that an open input represents a true condition.

The system uses a fifty-volt exchange battery having the positive terminal grounded. Wherever in the drawings a minus sign appears adjacent a terminal without any value this designates the negative terminal of the exchange battery. A connection to this negative battery terminal is usually designated as a "battery" connection. There are also electronic power supplies having outputs of −8 volts, −16 volts, +16 volts, and a separate electronic ground.

MEMORY

Figure 2:
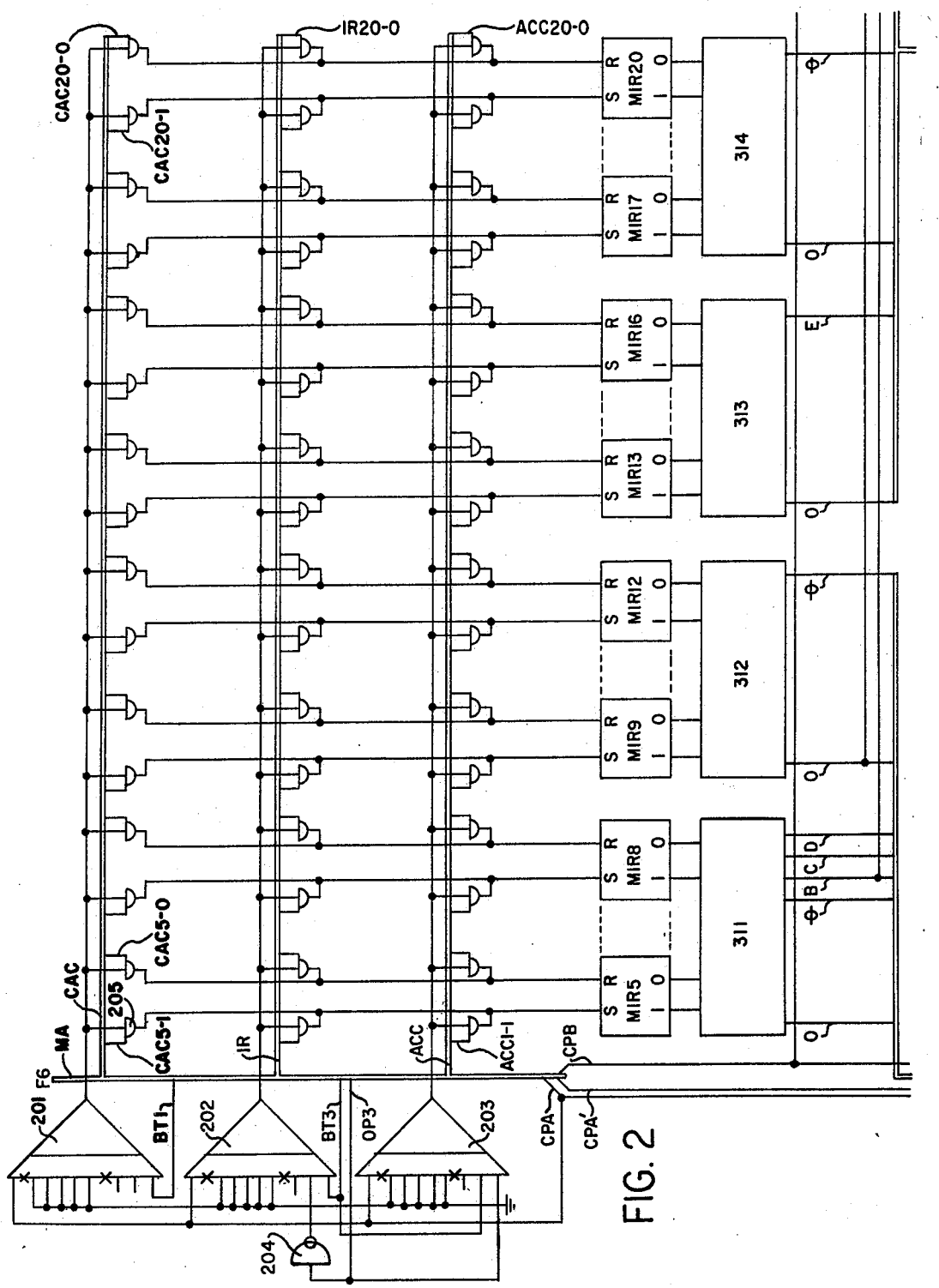
Figure 3:
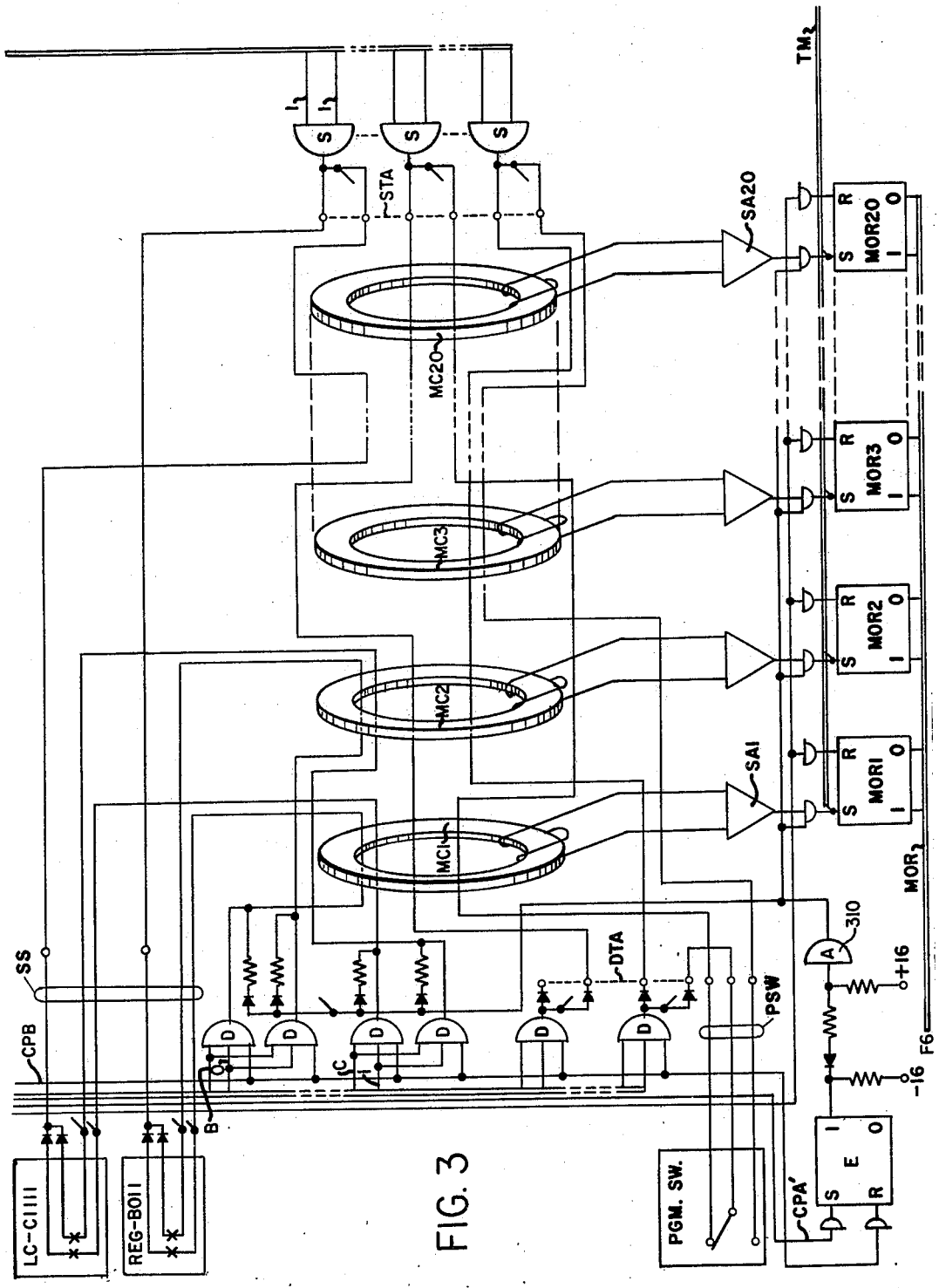
Figure 4:
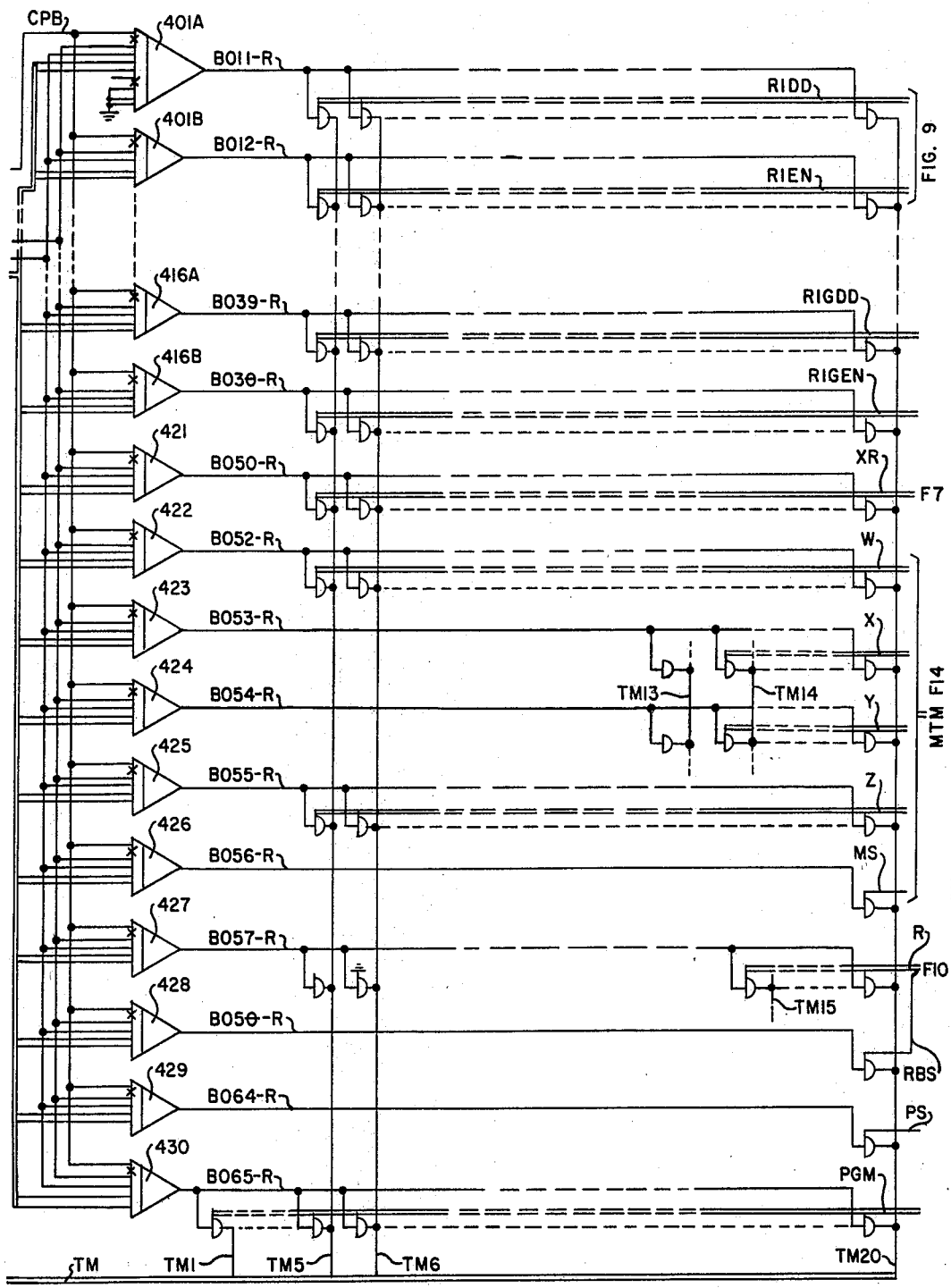
Figure 20:
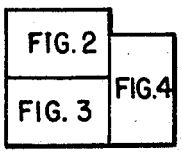
FIGS. 20-25 show how the above drawings are arranged.

The memory unit is shown by a symbolic block diagram in FIGS. 2–4 arranged as shown in FIG. 20. Typical components of the memory unit are shown schematically in FIG. 5.

The ring-core memory comprises twenty toroidal cores MC1–MC20, selectively threaded with wires extending between two terminal arrays DTA and STA. Each wire forms a twenty-bit word which is passed through a core to store a bit 1 and around the core to store a bit 0. The cores are made of a linear ferrite material. Each core is wound with a fifty-turn sense winding distributed uniformly around the core. An additional ten-turn winding (not shown) is interleaved with the main sense winding which may be connected series aiding or opposing to adjust the output voltage. (In FIG. 3 only two turns of each sense winding are shown to simplify the drawing). The sense windings from the twenty cores are connected to twenty sense amplifiers SA1–SA20 respectively. The ring-core memory is a high-speed, random-access, mechanically-alterable memory.

The memory has four functions as indicated in FIG. 1. The first function is as a program store for the central processing unit. The program section of the memory is duplicated. The second function is as a translator in which a wire forming a word represents a directory number, and the stored information includes a line equipment number plus ringing code and class of service. The third function is to determine the status of any line, trunk, junctor, register, the marker, or other peripheral units in the system. The fourth function provides tables of constants and other data. These functions are performed at sequentially different times, since only one word can be read from the memory at a time. The high speed of the memory and the arrangement of the system makes simultaneous operation unnecessary.

Access to the memory is provided by a memory input address register comprising flip-flops MIR5–MIR20. Input signals are supplied via cable MA from FIG. 6. An address is supplied to these flip-flops via a plurality of coincidence gates such as gate 205. The address may be obtained from any of three flip-flop registers in the central processing unit, a current-address counter via conductor group CAC, an instruction register via conductor group IR, or an accumulator via conductor group ACC. The particular address source is selected by way of the gated pulse amplifiers 201, 202, and 203. A clock pulse lead CPA is connected to the trigger pulse input of each of these three gated pulse amplifiers. The signal on lead BT1 enables gated pulse amplifier 201. The output of amplifier 201 is supplied to the A.C. inputs of thirty-two coincidence gates having their D.C. inputs connected to conductors CAC5–1 to CAC20–0 from conductor group CAC, to thereby transfer an address from the current address counter into the memory input address register flip-flops.

The gated pulse amplifier 202 is enabled by coincidence of signals BT3 and OP3 inverted, and the output pulse is supplied to the A.C. inputs of thirty-two coincidence gates having their D.C. inputs connected respectively to conductors IR5–1 to IR20–0 from conductor group IR, to transfer an address from the instruction register to the memory input address register flip-flops.

The gated pulse amplifier 203 is enabled by coincidence of signals BT3 and OP3, and the output pulse is supplied to the A.C. inputs of thirty-two coincidence gates having their D.C. inputs connected respectively to conductors ACC5–1 to ACC20–0 from conductor group ACC, to transfer an address from the accumulator to the memory input address register.

The sixteen bits of each memory address is divided into four groups of four bits each group of four bits being designated a digit. Each digit may assume a number of possible values as follows:

Digit #1—0, 1, 2, 3, 4, 5, 6, 7, 8, 9, ϴ, B, C, D, E.
Digit #2—0, 1, 2, 3, 4, 5, 6, 7, 8, 9, ϴ.
Digit #3—0, 1, 2, 3, 4, 5, 6, 7, 8, 9, ϴ, B, C, D, E.
Digit #4—0, 1, 2, 3, 4, 5, 6, 7, 8, 9, ϴ.

This numbering system gives the memory a theoretical capacity of $15 \times 11 \times 15 \times 11 = 26{,}225$ words. Each digit is binary coded with an 8–4–2–1 weighting. The following are the sixteen possible code combinations for the value of each digit.

| Digit value: | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| ϴ | 1010 |
| B | 1011 |
| C | 1100 |
| D | 1101 |
| E | 1110 |
| F | 1111 |

The outputs of the memory input address register flip-flops are decoded by decoders 311–314 each of which comprises a plurality of AND gates. The first digit from flip-flops MIR5–MIR8 via decoder 311 provides fifteen outputs 0–E, the second address digit frof flip-flops MIR9–MIR12 via decoder 312 provides eleven outputs 0–ϴ, the third address digit from flip-flops MIR13–MIR16 via decoder 313 provides fifteen outputs 0–E, and the fourth address digit from flip-flops MIR17–MIR20 via decoder 314 provides eleven outputs 0–ϴ.

The first two address digits are used to select from a number of driver circuits, which in FIG. 3 are symbolically designated by the letter D. As shown by the schematic in FIG. 5 each driver has two address inputs via diodes and a clock input via a resistor to drive a transistor amplifiier which when enabled by all of the inputs being true is driven into saturation to provide a ground pulse via an inductor-resistance combination at its output. The inductor provides a ramp output pulse to drive the memory word so that the sense windings of the cores provide a suitable output voltage pulse. Each driver is connected via a plurality of diodes to respective terminals of a driver terminal array DTA. This applies to the drivers for the program and translation sections of the memory, and also the table of constants.

In the status section there are sets of two drivers operating in parallel at their inputs, the first having a wire connected from its output threaded through the core MC1 and the second having a wire connected from its output threaded through the core MC2. These wires are then taken via a cable SS to the frame containing the equipment whose status is desired. At the equipment frame the wires fan out to the status contacts of the individual equipment units. After passing through the status contacts of the unit the two wires are brought together via diodes and taken back via cable SS to terminals of the array STA. The status contacts of a register and of a line circuit are shown in the upper left corner of FIG. 3 for reference.

The console CON shown in the block diagram of FIG. 1 includes a plurality of program switches, one of which (PGM. SW.) is shown in FIG. 3 for reference. These program switches are connected through a cable PSW to terminals at the array DTA. This makes it possible to have two different address words associated with the same memory address one connected when the program switch is in the normal position, and one connected when the program switch is in the thrown position, using a jumper at the array DTA as shown.

The third and fourth decoded address digits are used to select one out of a plurality of switch circuits, designated symbolically by the letter S in FIG. 3. As shown by the schematic in FIG. 5, each switch circuit has two address inputs via diodes driving the input of a transistor. When both inputs are true the transistor is driven into saturation to connect a negative 8-volt potential to its output. The output of each switch is connected to a plurality of terminals of a switch terminal array STA.

To load a word into the memory, a wire is inserted into a terminal of the array DTA associated with the first two digits of athe address, threaded through the appropriate ones of the cores MC1–MC20 in accordance with the data information to be stored, and then inserted into a terminal of the array STA associated with the last two digits of the address. In the status section the wire is threaded between the terminal arrays DTA and STA through the appropriate ones of the cores MC3–MC20.

The memory output register comprises flip-flops MOR1–MOR20, which may be set via the coincidence gates from the memory sense amplifiers. The flip-flops are all reset by clock pulse CPA. Output from the memory output register is supplied to the central processor via cable MOR to FIG. 6.

Figure 18:
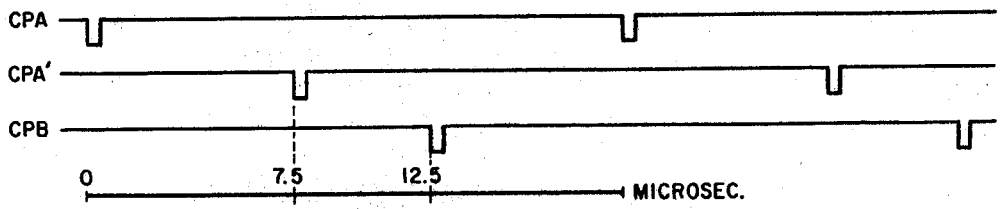

As shown by the diagram in FIG. 18. there are three clock pulse trains CPA, CPA', and CPB, each recurring every 20 microseconds. The leading edge of pulse CPA' follows the leading edge of pulse CPA by 7.5 microseconds, and the leading edge of pulse CPB follows the leading edge of pulse CPA by 12.5 microseconds. The pulse CPA is used via the gated pulse amplifiers 201–203 to set the memory input address register, via coincidence gates of the flip-flops MOR1–MOR20 to reset the memory output register, and in the central processor, the marker, and other units of the system to control the setting and resetting of the flip-flops therein. Clock pulse CPB is used at the inputs of the driver circuits to generate the memory read pulses, and at the inputs of gated pulse amplifiers in FIG. 4.

Clock pulse CPA' is used to control the loading of the memory output register flip-flops. When the address in the memory input address register is changed, the output voltages at two of the switch circuits S undergo a step change—that is, one switch must turn off and another on. These step voltages cause transient currents on the word wires connected to the switches, due to distributed inductance and capacitance. The currents in turn generate output voltages in the cores through which they pass. These output voltages can be detected by the sense amplifiers and read as 1's causing errors in the memory readout.

To overcome this effect, the signals from the sense amplifiers to the MOR flip-flops must be blocked until the transient currents decay. This is done by a signal at the D.C. inputs of the coincidence gates for setting the MOR flip-flops. Clock pulse CPA' is used to set a flip-flop E which via a resistance-diode network and an AND gate 310 used as an amplifier enables the set input coincidence gates of the MOR flip-flops. The clock pulse CPB resets flip-flop E to again disable the set inputs of the MOR flip-flops. The resistor-diode network delays the risabling of the coincidence gates to compensate for the propagation delay in the memory drivers, cores and sense amplifiers.

The output of gate 310 is also used to overcome a problem caused by the distributed capacitance of the status-driver wires in cable SS. This capacitance can become charged to a negative 8 volts, so that a current is produced when the status drivers are pulsed, causing a false 1 indication. To eliminate this charge, each status driver lead is connected through a resistor-diode combination to the output of the gate 310. This removes the unwanted charge from the wires, but since the gate 310 is turned off following pulse CPA' normal status readout is not affected.

It is a feature of this system that the same memory input addressing arrangement of FIG. 2, and the same memory output register are used to read various relay and flip-flop registers used as temporary memory storage. As shown in FIG. 4, the temporary memory reading is accomplished with a plurality of gated pulse amplifiers and coincidence gates. There are twenty temporary memory read conductors TM1–TM20 connected to the respective set inputs of the flip-flops MOR1–MOR20. Each coincidence gate in FIG. 4 has its A.C. input connected to the output of one of the gated pulse amplifiers, its D.C. input connected to the output of one bit position of a temporary memory location, and its output connected to a corresponding one of the conductors TM1–TM20. The number of coincidence gates for each temporary memory address corresponds to the number of bits to be read from that address. Some of the coincidence gates have their D.C. inputs permanently wired with an open connection for a 1 and a ground connection for a 0. Each of the gated pulse amplifiers is used for one specific address as determined by connections of four input leads thereof to respective output leads of the four decoders 311–314 of the memory input address register. The first two digits for all of the temporary memory addresses are B0, so each gated pulse amplifier has one input connected to the B output of decoder 311, and the second to the 0 output of decoder 312. The last two inputs are connected to the outputs of decoders 313 and 314 in accordance with the specific address. The trigger pulse input of each of the gated pulse amplifiers in FIG. 4 is connected to the clock pulse lead CPB.

Each of the sixteen registers has two temporary memory addresses. For the first register the address B011 for the dialed digit store is read via gated pulse amplifier 401A and lead B011–R, and the equipment number store address B012 is read via gated pulse amplifier 401B and lead B012–R. The other registers each have two corresponding addresses up to the sixteenth register which is read via gated pulse amplifiers 416A and 416B via respective leads B039–R and B030–R. The index register in the central processor has address B050 and is read via gated pulse amplifier 421 and lead B050–R. Four marker registers having addresses B052–B055 are read via gated pulse amplifiers 422–425. The status flip-flop of the marker having address B056 is read via gated pulse amplifier 426. The register buffer includes a register number store having address B057 which is read via gated pulse amplifier 427, and the status flip-flop having address B050 is read via gated pulse amplifier 428. The printer status having address B064 is read via gated pulse amplifier 429. The console includes a number of switches which may be manually set to a desired address, this set of switches having address B065 being read via gated pulse amplifier 430.

CENTRAL PROCESSING UNIT

Figure 6:
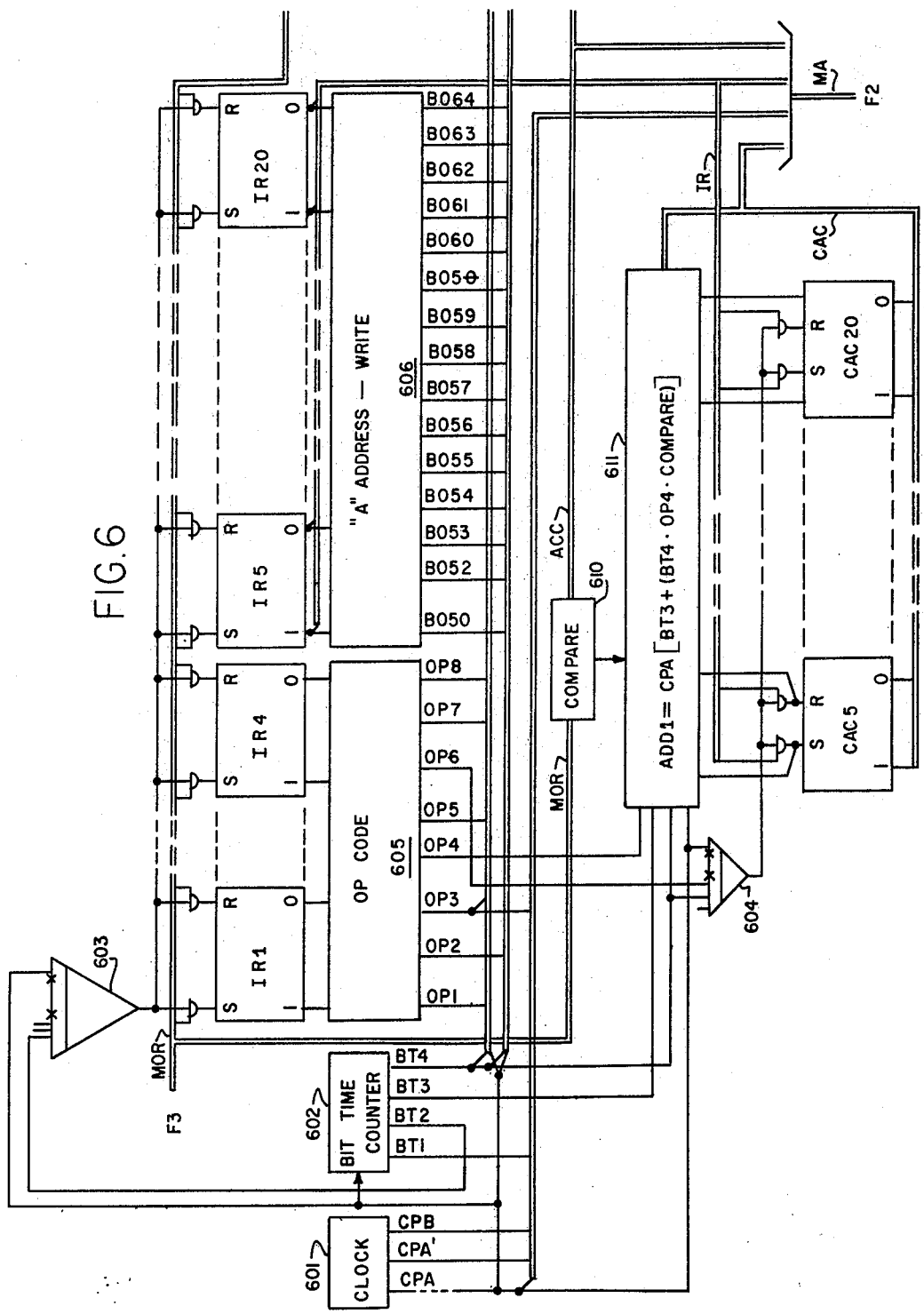
Figure 7:
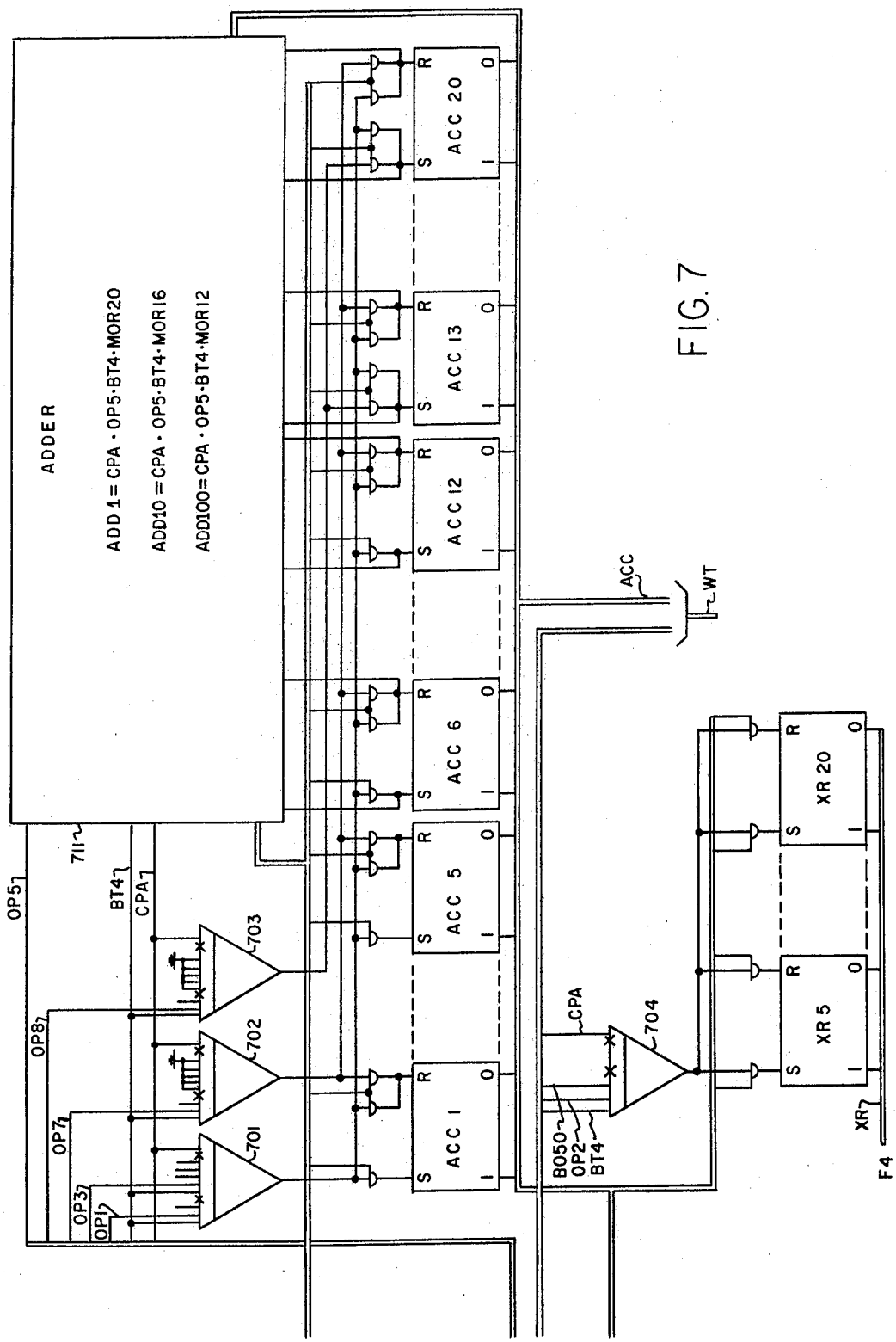

The central processing unit CPU is shown in the functional block diagram of FIGS. 6 and 7 arranged as shown in FIG. 21. It includes four flip-flop registers, namely, an instruction register comprising twenty flip-flops IR1–IR20, a current address counter comprising sixteen flip-flops CAC5–CAC20, an accumulator comprising twenty flip-flops ACC1–ACC20, and an index register comprising sixteen flip-flops XR5–XR20. Th synchronization of operation is controlled by the outputs from a clock 601 and a bit time counter 602.

The clock 601 has three output leads CPA, CPA' and CPB on which appear cyclically recurring pulses as shown in FIG. 18. Each pulse has a length of 1.25 microseconds. The colck may be operated at a frequency of 50 kilohertz, which is equivalent to a repetition rate of 20 microseconds.

The main pulses on lead CPA are used in the central processing unit, in the memory to place the address in the memory input address register and to reset the memory output register flip-flops, and in the peripheral units to load the flip-flop registers. The pulses CPA' and CPB are used in the memory. The interval between leading edges from the pulses on lead CPA to those on lead CPA' is 7.5 microseconds, and from the pulses on lead CPA to those on lead CPB is 12.5 microseconds.

The bit time counter 602 comprises two flip-flops (not shown) arranged to count from 1 to 4, advancing one step upon each occurrence of a pulse on lead CPA. A decoder provides a true signal (negative potential) on one of the four output leads BT1–BT4. These four output signals are used to sequence each operation of the central processing unit.

In the instruction register, the first four flip-flops IR1–IR4 are used to store an operation code (abbreviated hereafter as OP code); and the sixteen flip-flops IR5–IR20 are used to store an "A" address. An OP code decoder 605 has eight outputs OP1–OP8, one of which has a true signal thereon at a time. A total of sixteen outputs could be provided from decoder 605 as required. The address output from flip-flop IR5–IR20 are supplied via a cable IR to the memory and to the inputs of the current address counter, and those addresses required for a write operation are decoded via decoder 606. The outputs of this decoder 606 along with the signals on leads OP2, CPA, and BT4 are supplied to cable WT (FIG. 7) to control the transfer of information from the accumulator to other flip-flop registers.

The current address counter flip-flops CAC5–CAC20 are used to store the address which is supplied to the memory input address register during bit time 1 of each cycle of operation. Addition logic unit 611, comprising logic gates and gated pulse amplifiers is used to add one to the address stored, during each occurrence of bit time 3. Also during a comparison operation indicated by signal OP4 being true, a comparison circuit 610 compares the outputs of the memory output register on cable MOR and the outputs of the accumulator on cable ACC and if the respective outputs are not all the same a true signal from unit 610 in conjunction with the signals BT4 and OP4 advances the current address counter an additional step. The flip-flop count is advanced when the pulse on lead CPA triggers a gated pulse amplifier.

The accumulator, flip-flops ACC1–ACC20, forms a part of the arithmetic unit, and is used to store the results of an arithmetic operation, or as a temporary storage register.

The index register flip-flops XR5–XR20 are used as a temporary store.

Input to the central processor comes from the memory output register, via cable MOR from FIG. 3. Output to the memory is via cable MA to FIG. 2. Output to the marker, register buffer, printer buffer and other temporary memory locations is via cable WT.

The OP codes from decoder 605 are used to control the performance of various arithmetic and logical functions.

OP1—Read the contents of some memory address A. The result is placed in the accumulator.

OP2—Write the contents of the accumulator in some memory address A.

OP3—Transfer the contents of the address stored in the accumulator into the accumulator.

OP4—Compare the contents of the accumulator with the contents of the memory output register MOR. If equal proceed to the next instruction in sequence by incrementing the current address counter CAC by 1 as normal. If OP5—Add 1, 10 or 100 to the contents of the accumulator.

OP6—Jump to instruction at the address A.

OP7—Mask the contents of the accumulator with the contents of the memory output register MOR. Keep the digit where ONES are present and set to ZERO where ZEROS are present.

OP8—Superimpose on the accumulator the contents of the memory output register MOR. Only the tens and units are superimposed.

Each instruction designated by an OP code must proceed in a specified sequence of operations, during the four bit times of an operation cycle. The operational sequence is:

(1) Place the contents of the current address counter CAC into the memory input address register MIAR.

(2) Place the contents of the memory output register MOR into the instruction register IR.

(3) Place bits 5–20 of the instruction register IR into the memory input register MIR and allow the current address counter CAC to increment by 1.

The above operations are the same for all OP codes except for OP code 3 (Transfer). In this case the third operation is to place bits 5–20 of the accumulator into the memory input register MIR and allow the current address counter CAC to increment by 1.

(4) A fourth operation dependent on the OP code provides the desired arithmetic or logical function.

The rules of addition and counting should be carefully noted. A number may be added to the address of bits 5–20 in accordance with the numbering scheme used herein. The first digit (bits 5–8) proceeds from 0 through E and then returns to 0. The second digit (bits 9–12) proceeds from 0 through ⊖ and then returns to 0. The third digit (bits 13–16) proceeds from 0 through E and then returns to 0. The fourth digit (bits 17–20) proceeds from 0 through ⊖ and then returns to 0. As the fourth digit advances from ⊖ to 0 there is a carry to the third digit, as the third digit advances from E to 0 there is carry to the second digit, and as the second digit advances from ⊖ to 0 there is carry to the first digit.

The details of these arithmetic and logical operations will now be described with reference to FIGS. 2–6.

During bit time 1 the signal on lead BT1 enables the gated pulse amplifier 201 so that when triggered by the pulse on lead CPA, its output pulse at the inputs of thirty-two coincidence gates transfers the address from the current address counter CAC to the memory input register MIR. The address is decoded by the units 311–314 to enable one of the word wires of the permanent memory comprising cores MC1–MC20, or enables one of the gated pulse amplifiers in FIG. 4 for temporary memory reading, to transfer the stored data at that address to the memory output register MOR. During bit time 2 the signal on lead BT2 enables gated pulse amplifier 603 so that when it is triggered by the pulse on lead CPA its output pulse is applied to forty coincidence gates to transfer the data from the flip-flops MOR1–MOR20 via cable MOR to the corresponding instruction register flip-flops IR1–IR20. The OP code from flip-flops IR1–IR4 via decoder 605 appears on one of the eight leads OP1–OP8. The address containing the data for the operation appears in flip-flops IR5–IR20. During bit time 3 if a signal on lead OP3 is false it is inverted via inverter 204 and in conjunction with the signal on lead BT3 enables gated pulse amplifier 202 so that its output pulse is applied to thirty-two coincidence gates to transfer the address from flip-flops IR5–IR20 to the corresponding flip-flops MIR5–MIR20. This address is decoded via units 311–314, and the data from that address appears in the memory output register flip-flops MOR1–MOR20. If the signal on lead OP3 is true, it along with the signal on lead BT3 enables gated pulse amplifier 203 so that when it is triggered by the pulse on lead CPA its output pulse is applied to thirty-two coincidence gates to transfer the information from the accumulator flip-flops ACC5–ACC20 to the corresponding memory input register flip-flops MIR5–MIR20, followed by the information from this address being placed in the memory output register flip-flops MOR1–MOR20. Also during bit time 3 the signal on lead BT3 enables a gated pulse amplifier in add unit 611, which when triggered by a pulse on lead CPA advances the current address counter one step.

During bit time 4 the operation for each OP code is different.

Code OP1 along with the signal on lead BT4 enables the three-input AND gate portion of gated pulse amplifier 701 so that when triggered by the pulse on lead CPA the information from the flip-flops MOR1–MOR20 is transferred to the corresponding ones of the accumulator flip-flops ACC1–ACC20.

Code OP2 is used to write information from the accumulator into one of the flip-flop registers designated by the output of the address decoder 606. Each of these temporary memory flip-flop registers has associated therewith a gated pulse amplifier which is enabled by its own address in coincidence with the signals on lead OP2 and BT4. For example the index register has a gated pulse amplifier 704 associated therewith which is enabled by the signals on leads B050, OP2, and BT4, so that when triggered by the pulse on lead CPA the information is transferred from the accumulator flip-flops ACC5–ACC20 to the index register flip-flops XR5–XR20. Information can be similarly written into other temporary memory registers in the marker, register buffer, and printer buffer via cable WT.

Code OP3 is used to transfer, taking the address from the accumulator and placing the data stored at that address into the accumulator. It has already been noted that during bit time 3 the address from the accumulator is placed in the memory input register and the data from that address placed in the memory output register. During bit time 4 the signals on leads OP3 and BT4 enables the five-input AND portion of gated pulse amplifier 701 so that when triggered by the pulse on lead CPA the information from the memory output register is transferred to the corresponding accumulator flip-flops ACC1–ACC20.

Code OP4 is used to compare the outputs of flip-flops MOR1–MOR20 with the outputs of the accumulator flip-flops ACC1–ACC20 in a comparison logic unit 610, so that if each MOR flip-flop is in the same state as the corresponding ACC flip-flop the output from unit 610 is true. This signal along with the signals on leads OP4 and BT4 enables a gated pulse amplifier (not shown) in the addition unit 611 so that when it is triggered by the pulse on lead CPA the current address counter CAC is advanced one step. It has already been noted that this current address counter CAC is advanced one count every cycle in bit time 3. Therefore if the result of the comparison is *true* the current address counter makes only one step during an operation cycle as normally, while if the result of the comparison is *not true* the current address counter makes two steps during the operation cycle.

Code OP5 is used to enable an adder associated with the accumulator. To avoid the expensive complexity of a full parallel adder, a simplified adder is used which during a single operation can add either one, ten or one hundred. It is readily seen that any number may be added to the accumulator by calling up this OP code a number of times. The adder 711 comprises a number of logic gates an gated pulse amplifiers, the latter being enabled by the signals on leads OP5 and BT4, and triggered by the pulse on lead CPA. The inputs of the logic units in the adder 711 include the outputs of the accumulator. The constants 1, 10 and 100 are stored at respective addresses in the permanent memory as constants, the address being in flip-flops IR5–IR20 and the data transferred into the memory output register during bit time 3. It is readily apparent that the memory output register signals which must be true to add *one* is MOR20, to add *ten* is MOR16, and to add *one hundred* is MOR12.

Code OP6 is used to perform a jump from one address to another. The signals on leads OP6 and BT4 enable gated pulse amplifier 604 so that when triggered by the pulse on lead CPA, its output pulse enables coincidence gates to transfer the address from the instruction register flip-flops IR5-IR20 to the corresponding ones of the current address counter flip-flops CAC5-CAC20.

The mask code OP7 is used to delete certain bits of a number in the accumulator. If the memory output register bit is a one, then the corresponding accumulator bit is left as is. If the memory output register bit is a zero then the corresponding accumulator bit is to be set to zero regardless of its previous state. The mask information is stored in the address from flip-flops IR5-IR20 which is gated into the memory input register during bit time 3, transferring the masking data into the memory output register. The signals on leads OP7 and BT4 enables gated pulse amplifier 702 so that when triggered by the pulse on lead CPA its output pulse is applied to the A.C. input of the reset coincidence gates of the accumulator flip-flops ACC1-ACC20. Therefore for each MOR flip-flop which is in the one state, the reset coincidence gates will be enabled to reset the corresponding accumulator flip-flop.

Code OP8 is used to superimpose the contents of the memory output register on the contents of the accumulator. Only the tens and units flip-flops ACC13-ACC20 are superimposed via coincidence gates at the set inputs thereof having their A.C. inputs connected to the output of gated pulse amplifier 703 and their D.C. inputs connected to the corresponding memory output register signals. The signals on leads OP8 and BT4 enables gated pulse amplifier 703 so that when it is triggered by the pulse on lead CPA, its output pulse is applied to these coincidence gates.

CALL-THRU DIAGRAM

Figure 8:
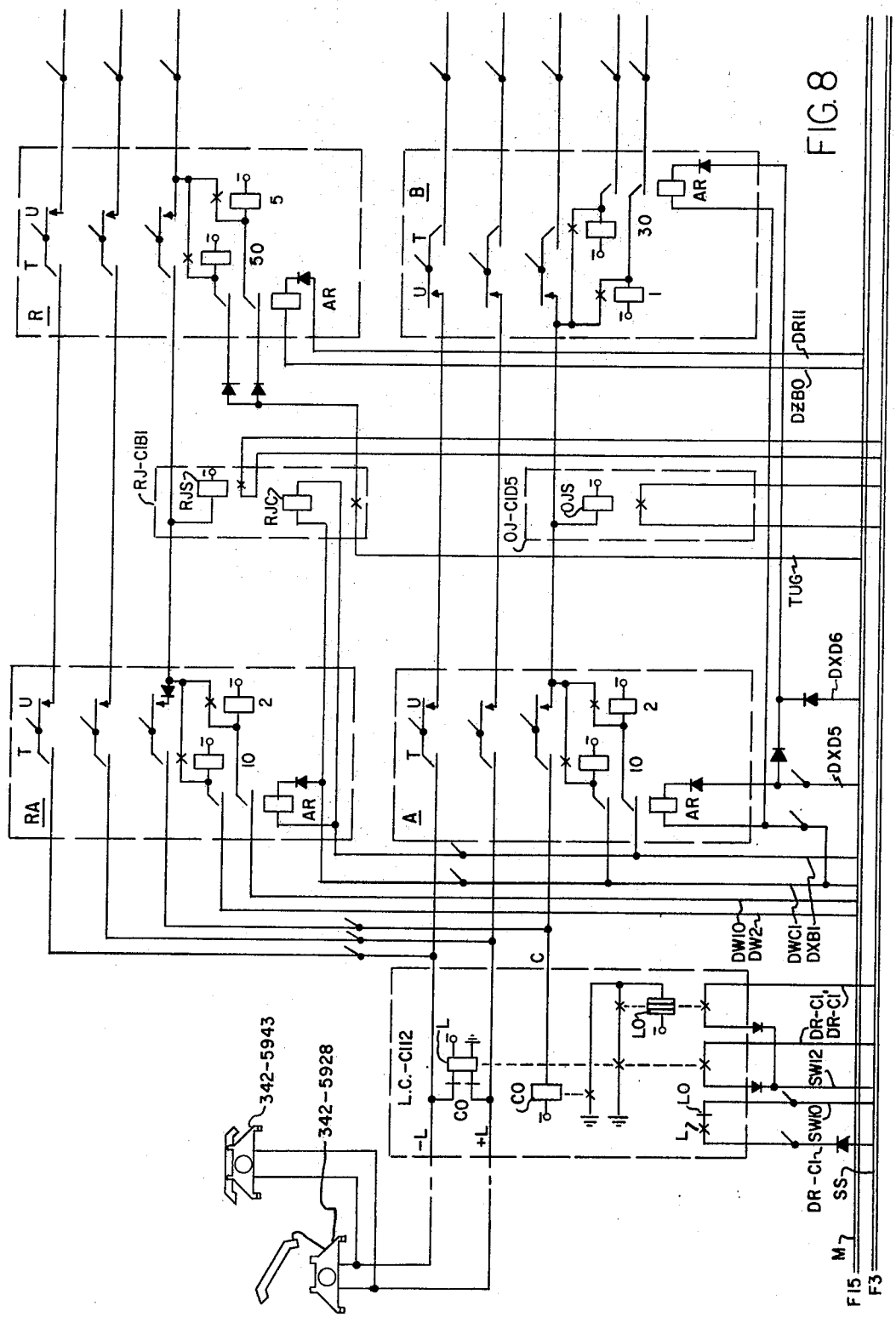
Figure 9:
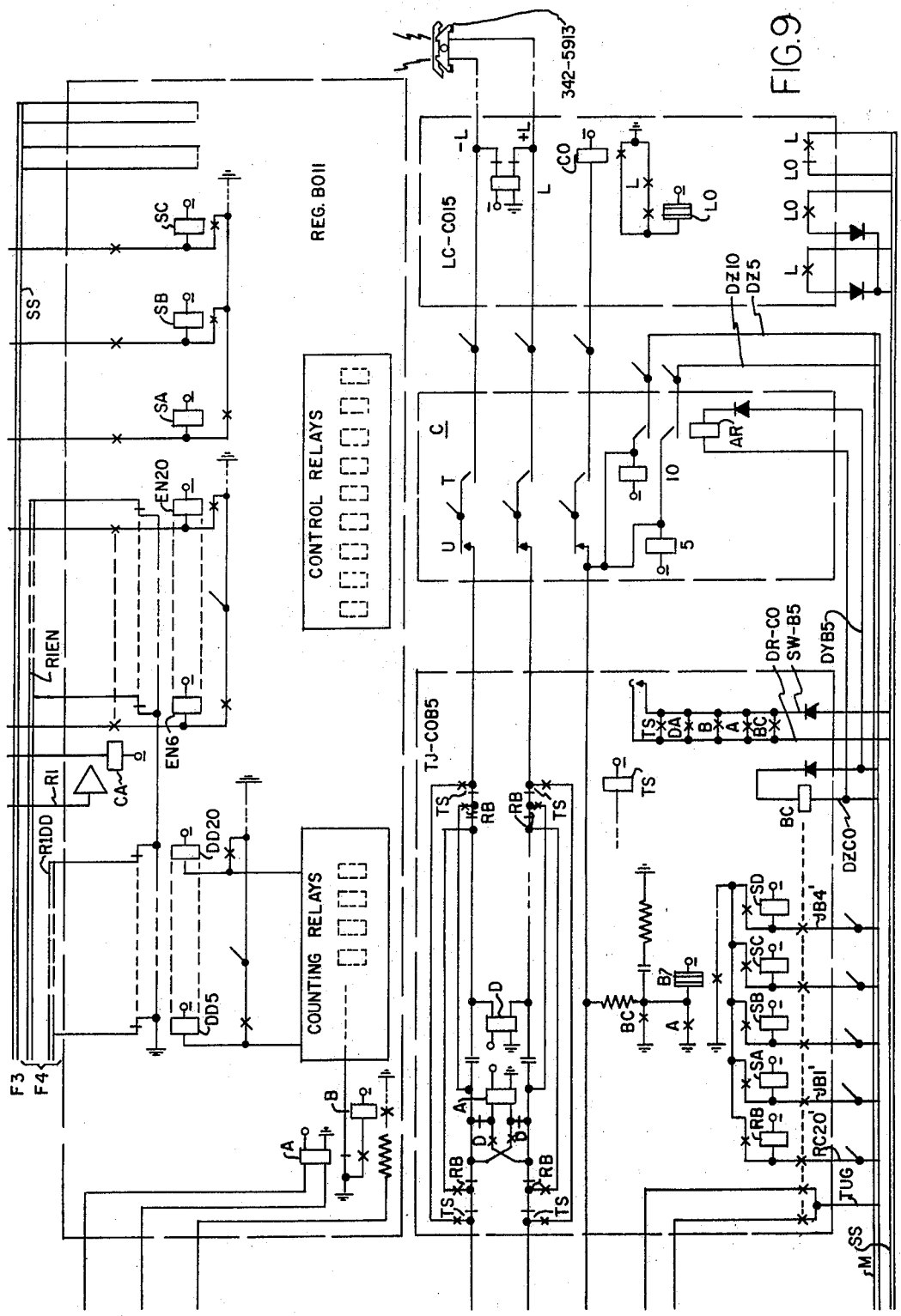
Figure 22:
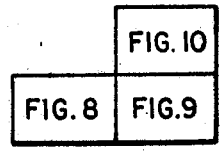
Figure 23:
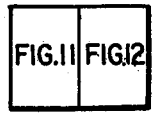

FIGS. 8 and 9 arranged as shown in FIG. 22 comprise a call-thru diagram of the switching network. The diagram shows one switch of each of the five stages, and one of each of the three types of junctors, along with a calling line circuit and telephone stations of a two-party line and a called line circuit and telephone station.

For each of the network switches the diagram shows one of the tens magnets along with three of its thirty contact fingers designated by a T above the contacts, one of the ten units magnets and its three contact fingers designated by a U above the contacts, and the allotter magnet designated AR along with two of its twenty contact fingers.

Each line circuit includes a line relay L, a cutoff relay CO, and a lockout relay LO. Two sets of break contacts of the cutoff relay disconnect the line circuit from the line. The lockout relay has an operate path through a set of make contacts of the cutoff relay to ground, and a holding path through its own contacts and the line relay contacts to ground. Thus a line calling for service has only relay L operated, a connected line (busy status) has relays CO and LO operated, and a line in lockout condition has relays L and LO operated. Contacts of the line and lockout relays are used for status indication to the memory via cable SS. Each group of 100 lines has a group status address in which the first two digits are the group number and the last two digits are 10. This pair of conductors is connected in multiple to each line circuit of the group, and in each line circuit there is a connection through make contacts of the line relay L and break contacts of the lockout relay LO in series. For the hundreds line group C1 one of these conductors is connected to driver DR-C1 in the memory, and the other is connected to switch SW-10. Each line circuit has an individual two bit status indication, the first via make contacts of the line relay L, and the second via make contacts of the lockout relay LO. For the line circuit LC-C112 the first status bit is connected via a wire to driver DR-C1 and the second is connected to the parallel driver DR-C1' these driver wires being respectively threaded through the first and second cores of the memory. At the other side of the contacts the wires include respective isolating diodes and then are connected together to the memory to switch SW-12.

The top of FIG. 8 shows a connection through a switch of stage RA, a register junctor RJ-C1B1 individual to the switch, and a switch of the R stage to a register in FIG. 9. The R stage switch is individual to the register REG-B011.

The lower portion of FIG. 8 shows a connection from line circuit LC-C112 through a switch of the A stage, an originating junctor OJ-C1D5, and a switch of the B stage. These A and B switches are individual to the originating junctor. The lower portion of FIG. 9 continues the connection through a terminating junctor TJ-C0B5 and a switch of the C stage individual thereto to a called line circuit LC-C015.

The line circuit LC-C112 is connected to a two party line having a first station 342-5928 which is shown in a calling off-hook condition, and a second station 342-5943. The line circuit LC-C015 is connected to an individual line to station 342-5913.

The terminating junctor includes a relay BC which is connected in parallel with the allotter relay of the C stage switch. The contacts of relay BC connect five instruction store relays RB, and SA-SD to the terminating junctor buffer in the marker, and connect the tens and units operate conductors of the B stage switch to the tens an units ground conductor TUG in the marker. If the terminating junctor were equipped to handle reverting calls there would be another instruction store relay connected through contacts of relay BC to the terminating junctor buffer in the marker. The instruction store relays lock through a holding path including break contacts of the ring trip relay (not shown) and make contacts of the B relay to ground. Relay A provides transmission battery and supervision for the calling line, and the back bridge relay D provides transmission battery and supervision for the called line. The hold relay B operates via contacts of relay BC and is held via contacts of relay A.

The holding ground for the switch train is provided in the terminating junctor from the control conductor C through a resistor and thence via contacts of BC to ground, or through contacts of relays B and A in series to ground. This is the connection for calling party release. Optional connections use contacts of relay D and its slave relay DA (not shown) to provide either last party release, or first party release to line lockout in the line circuit for the other party.

One feature of the system is the ability upon finding an all links busy blocking condition in the forward direction through the network to establish a connection in the reverse direction with the calling line connected via a C stage switch and the called line connected via an A stage switch. This requires reversing the terminating junctor which is accomplished by an instruction to operate the instruction store relay RB.

The four instruction store relays SA-SD, via contacts not shown, provide for a plurality of ringing codes for multi-party lines, for trunk switch through, and other types of connections. For trunk switch through the relay TS is operated via contacts (not shown) of the instruction store relays, which establishes a metallic connection through the junctor and disconnects the A and D relays from the path.

The terminating junctor also includes ringing and ring trip relays, not shown.

The status conductors of the terminating junctor connected to driver DR-C0 and switch SW-B5 in the memory includes make contacts of relays BC, A, B, DA, and TS, and also a busy key. Relay DA, not shown, is a slave of relay D.

Each originating junctor includes a status relay OJS operated via the control conductor C with contacts wired via cable SS, and each register junctor includes a status relay RJS operated via the control conductor C with a set of contacts wired via the status cable SS.

REGISTER BUFFER AND REGISTERS

Figure 10:
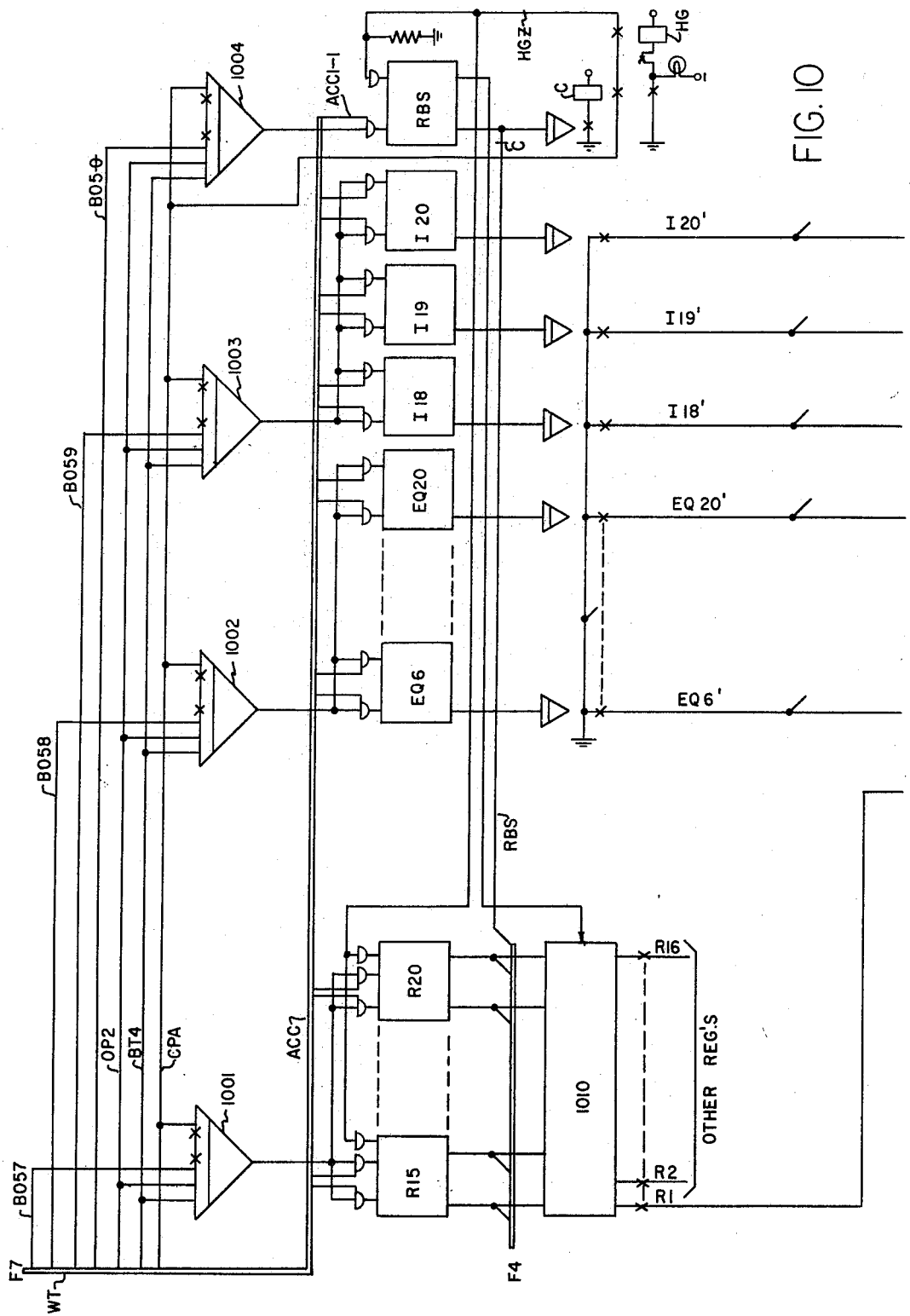

The block REG in FIG. 1 represents sixteen registers an a register buffer. The register buffer is shown by a functional block diagram in FIG. 10. At the top of FIG. 9 is shown that portion of one register interconnecting with the register buffer, the memory, and the switching network. The arrangement of FIGS. 9 and 10 is shown in FIG. 22.

The register buffer compises a plurality of flip-flops for receiving information from the central processor accumulator flip-flops, FIG. 7, in response to the write code OP2. The flip-flops R15–R20 receive the address of one of the sixteen registers from the accumulator in response to an output pulse from gated pulse amplifier 1001 when it is enabled by address B057 along with signals on leads OP2 and BT4 and triggered by the pulse on lead CPA. The output of these flip-flops is converted to a one out of sixteen signal by decoder 1010, and the decoder output signal enables a relay driver to supply ground potential to the corresponding register via one of the leads R1–R16. Only six flip-flops are required to receive the register address, since the first two digits thereof are always B0, and the first two bits of the third digit will always be 00. The decoder 1010 is enabled to supply output signals only when the register is busy, using the output 1 of flip-flops RBS. Therefore when the register buffer is idle the flip-flops R15–R20 may be used as temporary memory by the central processor to store register addresses. Whenever the register buffer is activated by the setting of flip-flop RBS, the output from decoder 1010 is enabled to operate a connect relay in the register address. For example if the address is B011, ground on lead R1 operates relay CA in the register REG–B011. Relay CA via its contacts connects relays EN6–EN20 and relays SA–SC to the outputs of the register buffer.

Flip-flops EQ6–EQ20 store the equipment number address of a calling line to which the register is being connected via the switching network. The address is transferred from the accumulator flip-flops to the flip-flops EQ6–EQ9 in response to an output pulse from gated pulse amplifier 1002 when it is enabled by address B058 in conjunction with signals on leads OP2 and BT4 and triggered by the pulse on lead CPA. The outputs of flip-flops EQ6–EQ20 operate relay drivers to supply ground to the leads EQ6'–EQ20' to operate the equipment number storage relays EN6–EN20 of a register having its relay CA operated.

Relays I18–I20 are an instruction store for a command to be given to a register. The command is transferred from the accumulator flip-flops ACC18–ACC20 in response to an output pulse from gated pulse amplifier 1003 when it is enabled by address B059 in conjunction with signals on leads OP2 and BT4 and triggered by a pulse on lead CPA. The outputs from flip-flop I18–I20 operate relays SA–SC in a register having its relay CA operated.

Flip-flop RBS is the status flip-flop for the register buffer. It is set by a signal from the accumulator on lead ACC1–1 in response to an output pulse from gated pulse amplifier 1004 when it is enabled by the addres B050 in conjunction with the signals on lead OP2 and BT4 and triggered by the pulse on lead CPA. The output of this flip-flop is supplied via break contacts of relay C to the temporary memory read portion of the memory, FIG. 4, to indicate the status of the register buffer, and enables decoder 1010 to cause information to be loaded into the register being addressed. The output of flip-flop RBS also actuates a relay driver whose contacts operate a relay C. Relay C completes an operate path for relay HG. These two relays constitute a timer for resetting the register buffer. The clock pulse on lead CPA via make contacts of relay C and HG resets flip-flop RBS. Break contacts of relay C open the status wire to the memory, which is equivalent to maintaining the signal true, until relay C restores.

When a register is connected to a calling line via the switching network, its relay A operates over the closed line loop. Hold relay B supplies ground for holding the switching network path. Dialing impulses from the calling line are followed by relay A and actuate a set of counting relays. At the end of each digit the number stored therein is converted to a four-bit binary code and stored in four of the digit storage relays DD5–DD20.

The register calls for service in accordance with a command in the instruction relays SA–SC. The call for service and busy indications are supplied to the memory via contacts in wires of cable SS. The outputs of relays DD5–DD20 are supplied via their respective break contacts to a cable R1DD, and the outputs of the relays EN6–EN20 are supplied via their respective break contacts to cable R1EN. These outputs are read via the temporary memory read circuits of FIG. 4. Bit 5 of the equipment number store is permanently wired as a 1 at the coincidence gate in the read circiut of FIG. 4.

SWITCHING NETWORK

Figure 11:
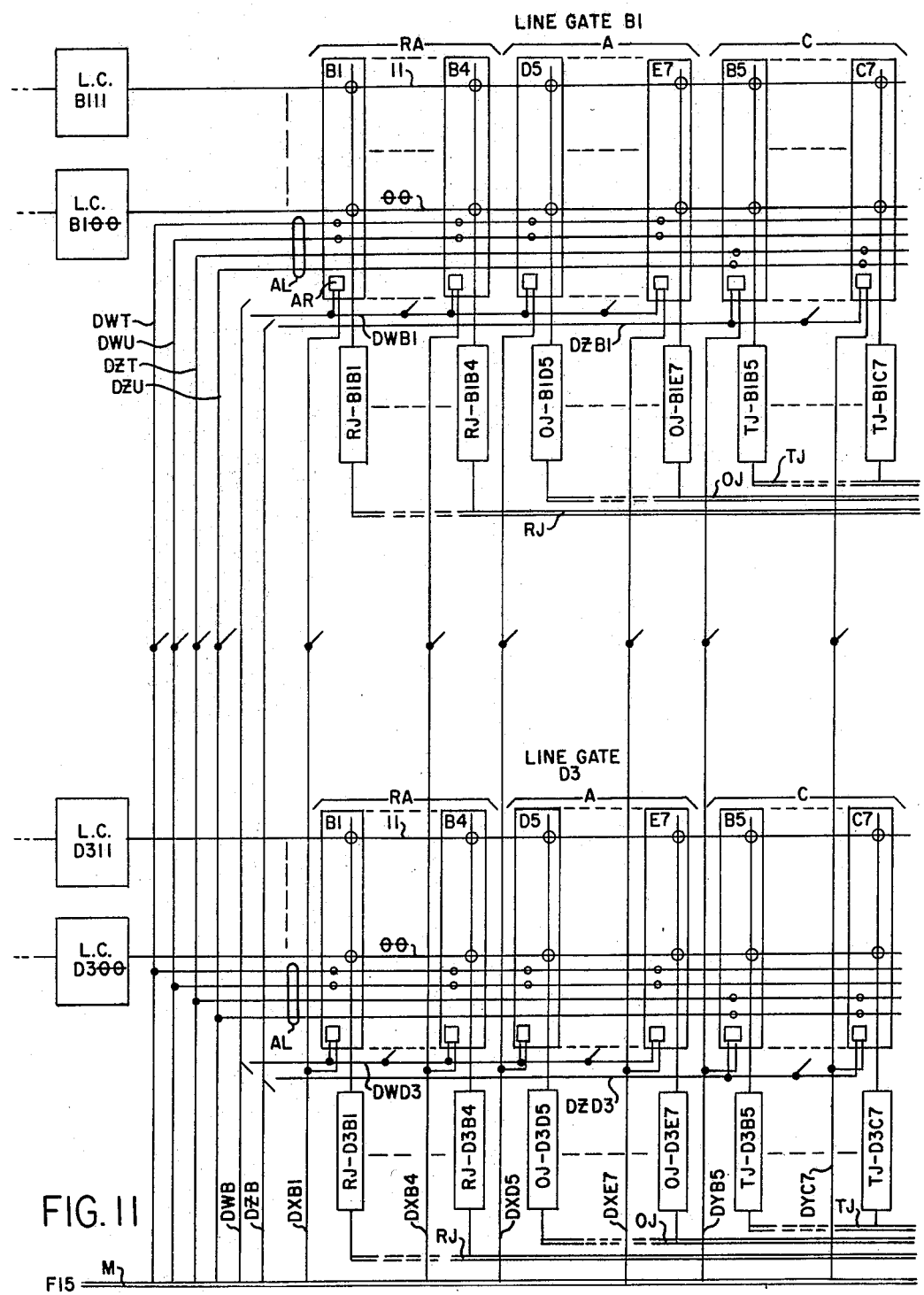
Figure 12:
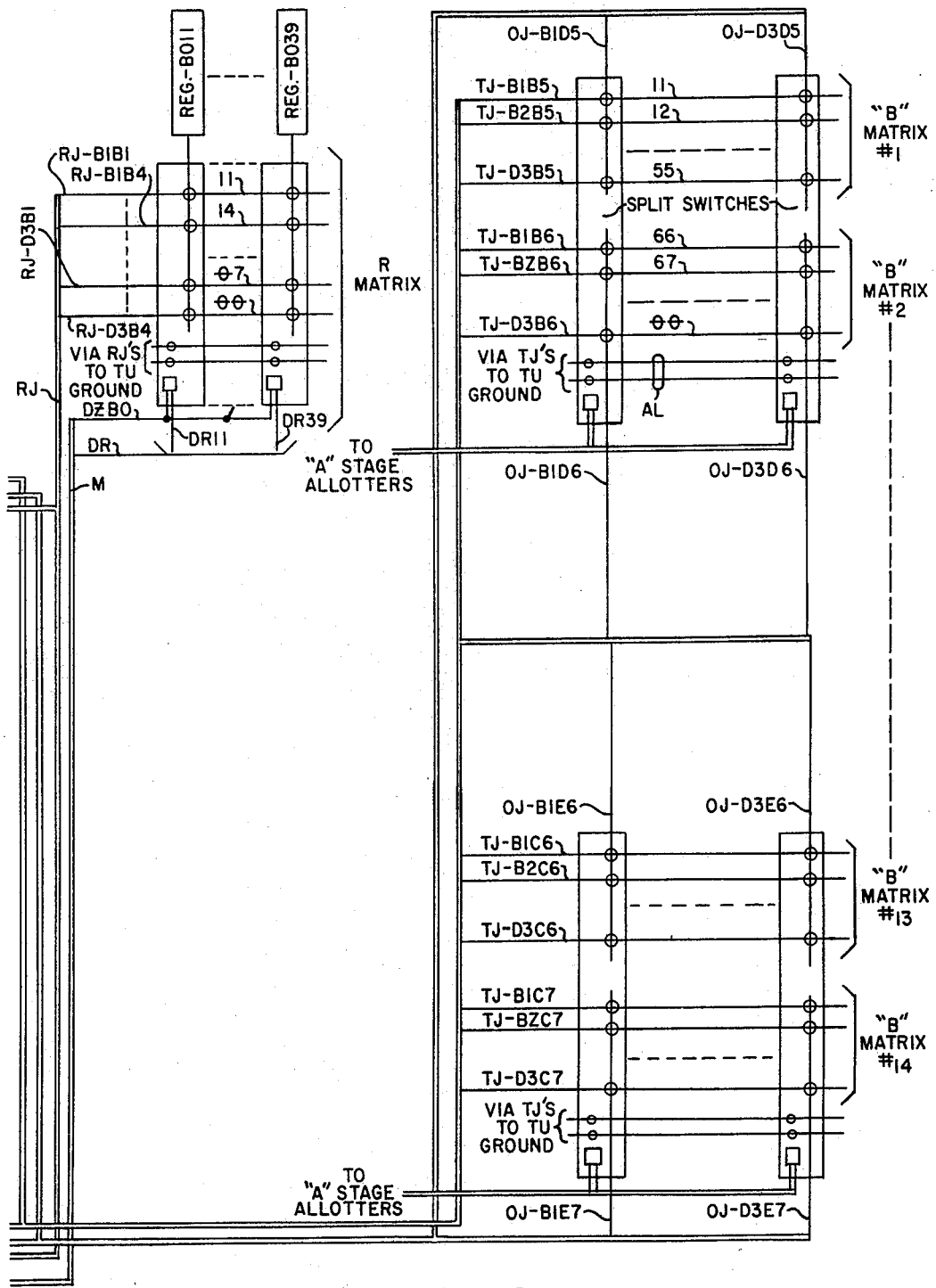

The drawings of FIGS. 11–12, symbolically show the ararngement of the switching network, the trunking between stages, and the numbering plan for the network equipment. The switching mechanism is of the type described in the Boswau U.S. Patent 2,573,889. A number of switches are removably arranged on a shelf side by side, each being jacked into corresponding jack terminals associated with the shelf, to form a unit designated herein as a gate. Each gate includes a plurality of bare rectangular multiple bars extending through the switches thereon. To receive the bars there are holes in each switch in an array of eleven columns and forty rows, ten of the columns being for the multiple bars of the transmission path, and the other column being for allotter bars. In the transmission path columns the holes are grouped into ten sets of four each. In the present system there are three conductors in a transmission path, two line conductors for the communication path and a control conductor, and therefore the fourth hole is left vacant. Each switch has ten tens magnets or actuators designated 10, 20, 30, 40, 50, 60, 70, 80, 90 and 00; each of which actuates an armature operating thirty contact fingers into contact with the bars in its column. Each individual horizontal row of conductor bars is provided with a bank spring having ten individual contact fingers, one for each conductor bar in the row, these being the contact fingers actuated by the tens magnets. Each of these springs has an eleventh finger actuated by the units magnet into engagement with fixed contact members which are connected to the conductors of the switch bus. Thus each units magnet actuates three of these contact fingers of a set. The ten units magnets are designated 1–9 and 0. Each tens magnet and each units magnet has its winding connected to a contact finger, the twenty contact fingers being actuated by an allotter magnet into engagement with allotter bars. Each of the tens and units magnets also includes a contact finger which engages a fixed contact of the control conductor of the switch bus to provide a holding path. In the symbolic diagrams of FIGS. 11 and 12, the multiple bars of each gate are represented by horizontal lines, the switch buses are represented by vertical lines, and circles at the intersections represent the tens and units contacts in series. The allotter magnets are represented by small rectangles in the lower left corner of each switch, and its contacts are represented by circles above it on the allotter bars.

FIG. 11 shows the switch gates for the line groups There are a maximum of twenty-five line groups in the system designated B1, B2, B3, B4, B5, B6, B7, B8, B9, B0, C0, C1, C2, C3, C4, C5, C6, C7, C8, C9, C0, D0, D1, D2, and D3. The first gate B1 and the last gate D3 are shown in FIG. 11. Note that an exchange needs to be equipped only with as many line group gates as there are groups of one hundred lines or fractions thereof to be served. Each gate includes switch for an RA matrix, an A matrix and a C matrix. Actually each gate is divided at the center by a bank jack as described in Reid et al. U.S. Patent 2,485,986, with jack terminals on each side, and with separate multiple bars in each half inserted into the jack terminals. Half of the switches for the RA, A and C matrices are mounted on each half of the gate. In FIG. 1 the switches for each matrix are shown together for convenience.

The one hundred sets, each of which comprises three multiple bars, are numbered from 11 to ΘΘ, with the first digit designating the tens and the second digit designating the units. The first set 11 and the last set ΘΘ are shown. Each set of multiple bars is connected to a line circuit, each of which has a four-digit equipment number, the first two digits corresponding to the line group, and the last two digits corresponding to the set of multiple bars in the group.

In the RA matrix there is a maximum of four switches designated B1, B2, B3 and B4. In the A matrix section there is a maximum of fourteen switches designated D5, D6, D7, D8, D9, DΘ, E0, E1, E2, E3, E4, E5, E6, and E7. In each C matrix there is also a maximum of fourteen switches designated B5–C7 with the last digit being the same as that of the corresponding switch in the A matrix, and the first digit having a value of two less than the corresponding switch in the A matrix. Each RA matrix has its switch bus connected to a register junctor RJ, each A matrix switch has its switch bus connected to an originating junctor OJ, and each C matrix switch has its switch bus connected to a terminating junctor TJ. Each junctor is designated by a four-digit equipment number, the first two digits corresponding to the line group number, and the last two digits corresponding to the switch number.

Each line gate is equipped with forty allotter bars represented in FIG. 11 by the four lower horizontal lines through the switches. The upper twenty bars are connected to contacts in the RA and A matrix switches, the first ten being connected to conductors in cable DWT for operation of the tens magnets, and the next ten being connected to conductors in cable DWU for operation of the units magnets. The lower twenty bars are connected to contacts of the C matrix switches, the first ten being connected to conductors of cable DZT for operation of the tens magnets and the last ten being connected to conductors of cable DZU for operation of the units magnets.

Each of the allotter magnets of the RA matrix switches and A matrix switches in the same line group has one side connected in common to one of the twenty-five conductors of conductor group DWB, for example in group B1 the connection is to conductor DWB1, for supplying battery potential. Likewise the allotter magnets in the C matrix switches of each line group are connected in common to one of the conductors of conductor group DZB. There are eighteen conductors designated DX for the connection of ground potential to the other side of the allotter magnet in the RA and A switches, each conductor being connected to one allotter magnet of a switch in each line group, for example conductor DXB1 is connected to the first switch B1 of the RA matrix in each line group, and conductor DXD5 is connected to the allotter relay of the first A matrix switch of each line group. In like manner fourteen conductors designated DY are provided for the connection of ground potential to the other side of the windings of the allotter magnets of the C stage. For example conductor DYB5 is connected to the allotter magnet of the first C matrix switch of each line group.

Referring to FIG. 12, the system includes one gate forming an R matrix to connect any of the hundred register junctors in any of sixteen registers. The bar multiple sets are connected via cable RJ to the register junctors, the first four sets being connected to the register junctors of the first line group, and the other bar multiples being connected to the register junctors of the other line groups in sequence. For example register junctor RJ–B1B1 is connected to multiple set 11, RJ–B1B4 to set 14, RJ–D3B1 to set ΘΘ7, and RJ–D3B4 to set ΘΘ. The switch buses of the sixteen switches are connected respectively to sixteen registers. Each register has two addresses, the first being a status and dialed digit address, the second being a calling line equipment number address in which is stored the identity of the calling line to which the register is connected via the R and RA stages. The first two digits of each register address is BΘ. The last two digits of the status and dialed digit addresses of the sixteen registers are 11, 13, 15, 17, 19, 20, 22, 24, 26, 28, 2Θ, 31, 33, 35, 37, and 39. The last two digits of the calling line equipment number stores are respectively 12, 14, 16, 18, 1Θ, 21, 23, 25, 27, 29, 30, 32, 34, 36, 38, and 3Θ. The registers may be identified by their status and dialed digit address.

All of the allotters of the R matrix switches have one side of the winding connected in common to conductor DZBΘ for supplying battery potential. The other side of the allotter windings are connected respectively to conductors DR11–DR39 (numbered according to the status address) for supplying ground potential. The allotter bar multiples are connected via relay contacts in the register junctors to supply the marker ground potential to the tens and units relays. Each register junctor supplies this ground potential to two of the allotter multiples, one for the appropriate tens magnet and the other for the appropriate units magnet.

The B stage is a distribution stage interconnecting the A stages and the C stages. It requires as many square matrices as there are A switches and C switches equipped in each line group, each matrix having as many inputs and outputs as there are line groups equipped. Thus a fully equipped exchange requires fourteen B matrices each having twenty-five inputs and twenty-five outputs. To achieve this the switch bus and bank springs of each switch are split to provide two sections with the bus of one section being connectable to the twenty-five multiple bar sets having tens digits 1–5 and units digits 1–5, and the other section bus is connectable to the twenty-five bar multiple sets having tens digits 6–Θ and units digits 6–Θ. The gate is then equipped with a maximum of twenty-five switches. Thus to provide fourteen matrices, seven gates are required. The switch bus sections are connected via the originating junctors to the A stage, and the bar multiples are connected via the terminating junctors to the C stage. Each B matrix requires a connection to one originating junctor and one terminating junctor associated with each line group. Thus from B matrix #1 the switches are connected to the originating junctors OJ–B1D5 to OJ–D3D5, these being the first originating junctors of each of the twenty-five line groups. The twenty-five sets of bar multiples 11–55 of B matrix #1 are connected to the terminating junctors TJ–B1B5 to TJ–D3B5, being the first terminating junctor of each of the line groups.

The allotter magnets of the B switches are connected in multiple with the allotter magnets of two A stage switches which are connected to the originating junctors associated with the two sections of the B switch. Appropriate isolating diodes are included in these connections. The allotter bar multiples are connected via relay contacts of the terminating junctors to the marker tens and units ground. Each terminating junctor supplies this ground via two conductors, to operate the appropriate tens magnet and units mganet, for example both terminating junctors TJ–B2B6 and TJ–B2C7 as well as corresponding terminating junctors in the other even numbered matrices must supply ground potential to operate tens relay 60 and units relay 7.

Note that with the numbering plan given here, a connection requires an originating junctor having the first two digits corresponding to the first two digits of the calling line number, and a terminating junctor having its first two digits corresponding to the first two digits of the called line number, the last digit of the originating junctor and terminating junctor numbers must be the same, and the third digit of the originating junctor must have a value which is two greater than the third digit of the terminating junctor number. This numbering plan facilitates easy operation of the central processor to determine the status of the various units in finding a path for a connection, and supplying the data to the marker for establishing the connection.

MARKER

Figure 13:
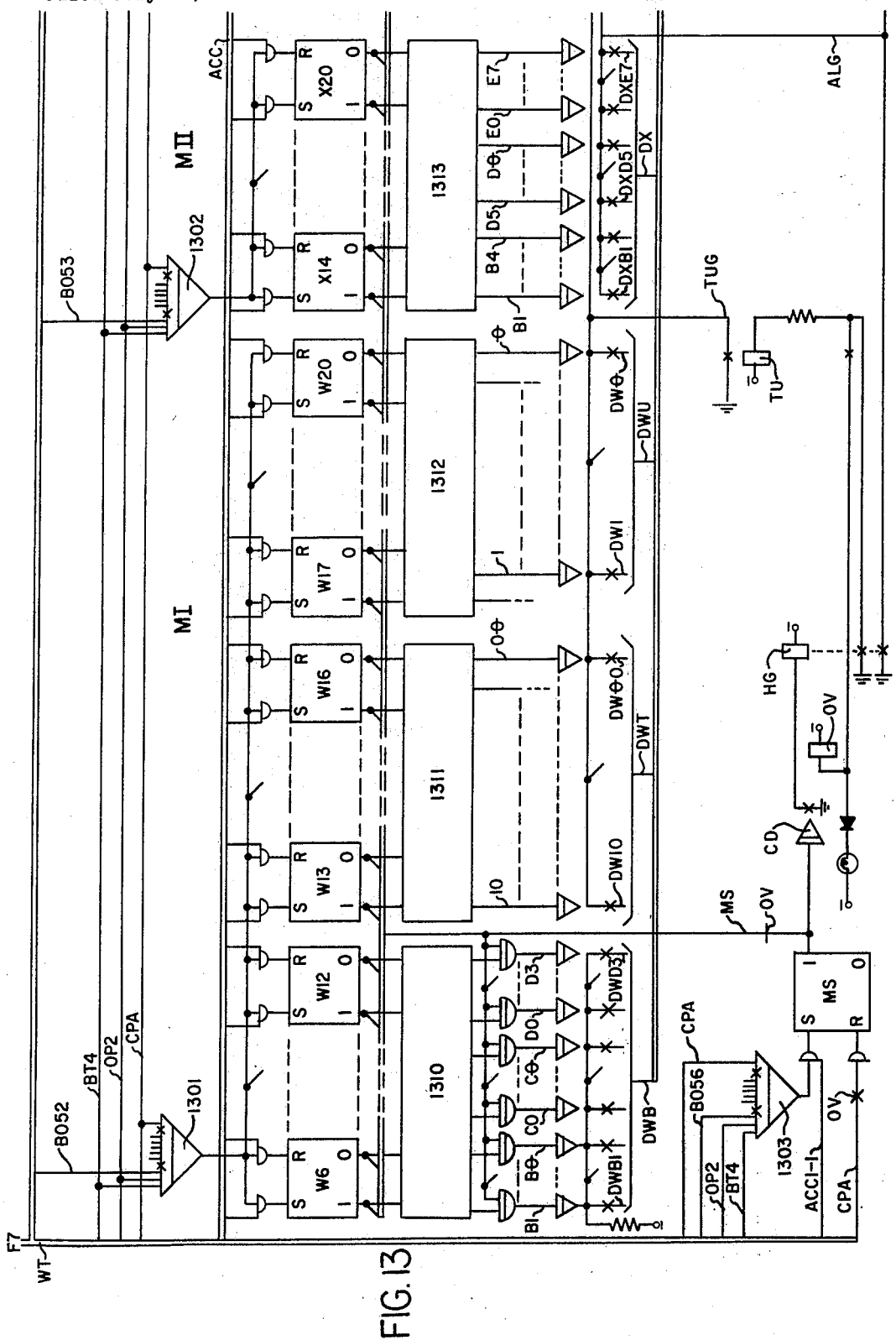
Figure 14:
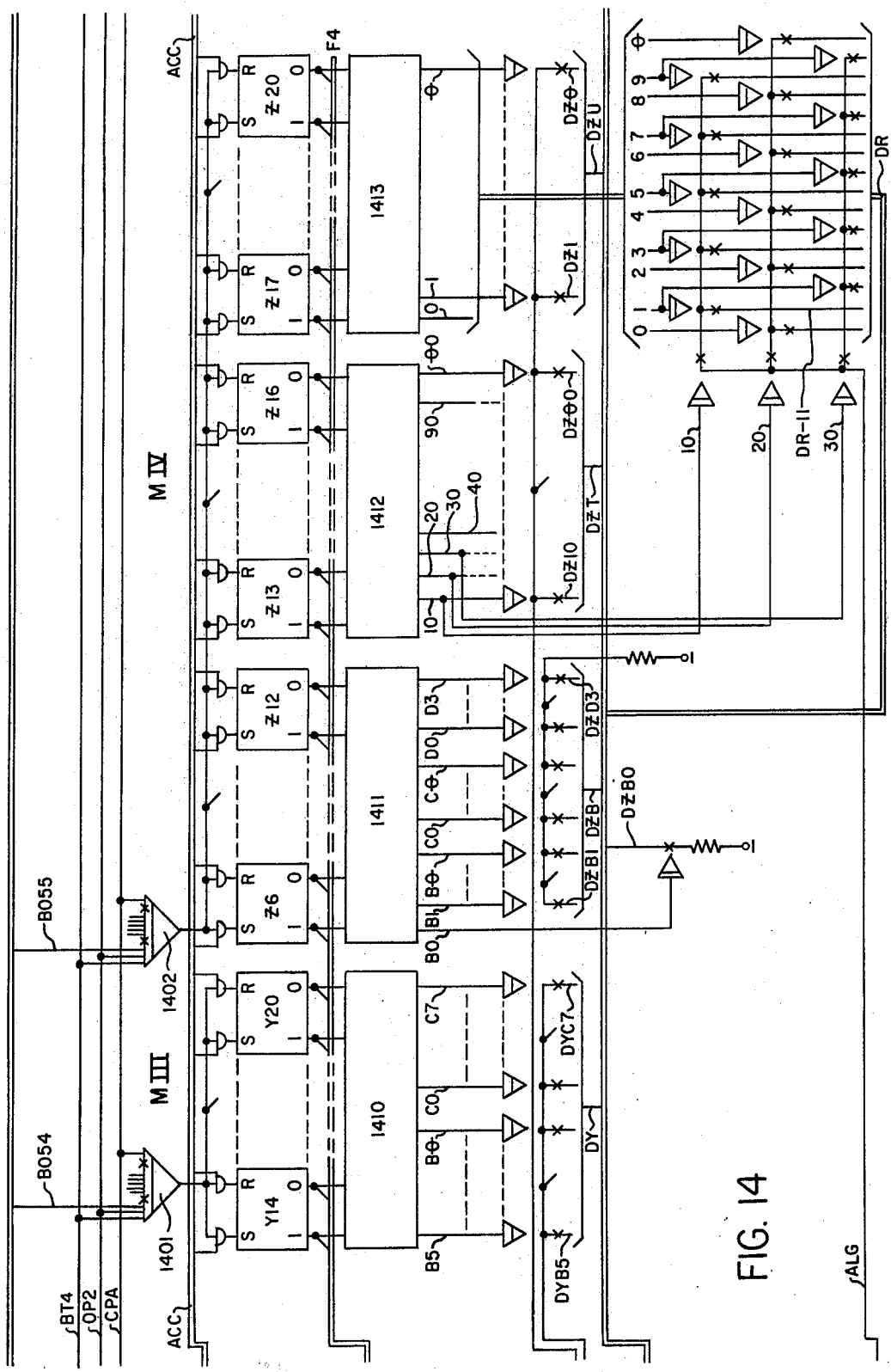
Figure 15:
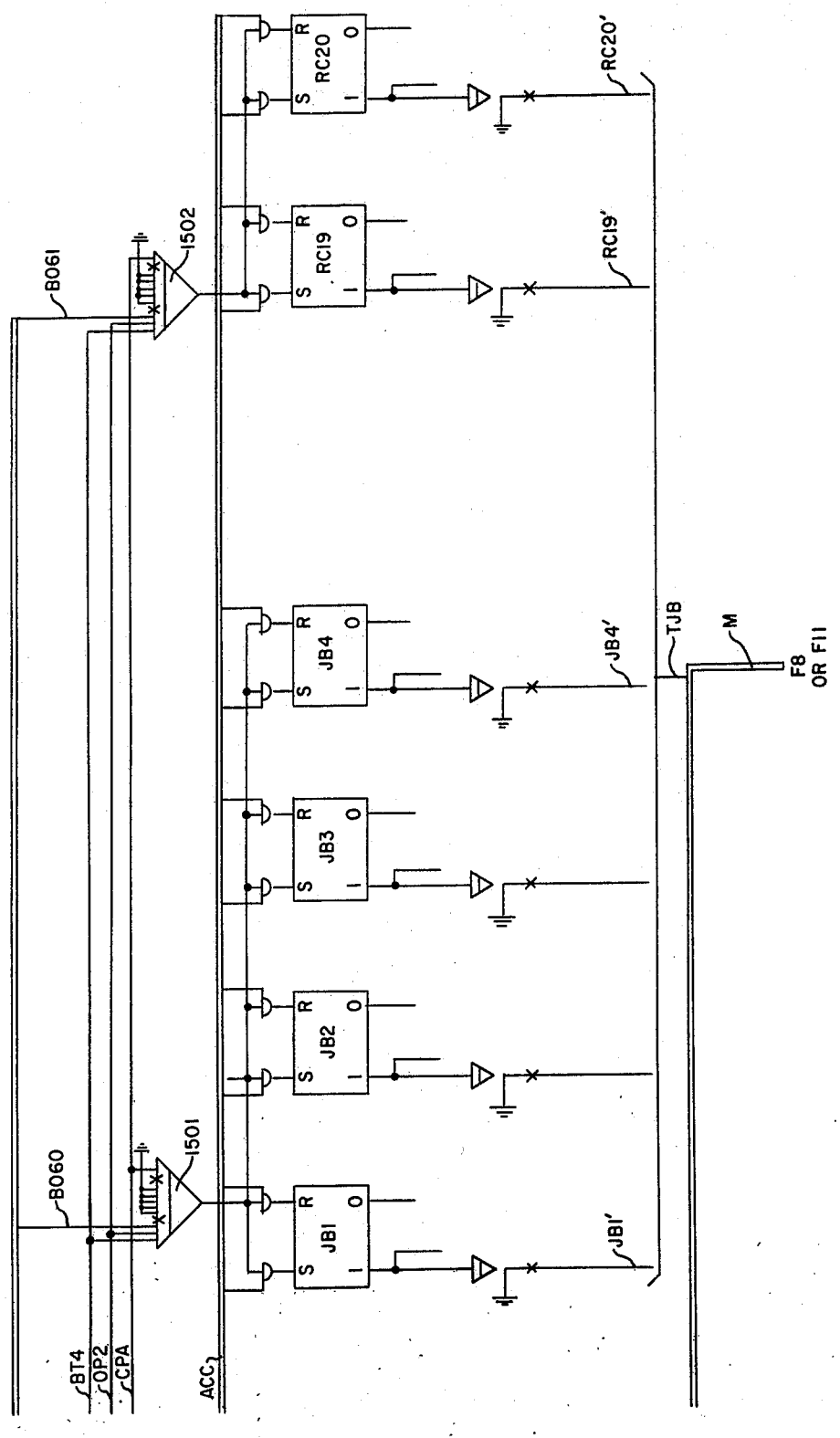
Figure 24:
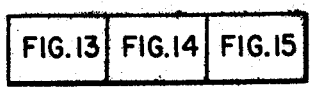

The marker is shown in FIGS. 13–15 arranged as shown in FIG. 24. Information is supplied to the marker from the central processor, FIG. 7, via cable WT. The The information is transferred from accumulator flip-flops to a section of the marker addressed when the write code OP2 is present; gated pulse amplifiers being enabled by the signals on leads OP2, BT4, and an address lead, and triggered by the clock pulse on lead CPA. Flip-flops W6–W20, designated marker MI and having address B052, receives the calling line number when gated pulse amplifier 1301 is triggered. Flip-flops X14–X20, designated marker MII and having address B053, receive the last two digits of the originating junctor number when gated pulse amplifier 1302 is triggered. Flip-flops Y14–Y20, designated marker MIII and having address B054, receive the last two digits of the terminating junctor number when gated pulse amplifier 1401 is triggered. Flip-flops Z6–Z20, designated marker MIV and having address B055, receive the called line number when gated pulse amplifier 1402 is triggered. FIG. 15 is the terminating junctor buffer portion of the marker. Flip-flops JB1–JB4, having address B060, receive the ring code number when gated pulse amplifier 1501 is triggered. Flip-flops RC19 and RC20 having address B061 receive further terminating junctor information when gated pulse amplifier 1502 is triggered. Flip-flop RC19 is set for a revertive call. Flip-flop RC20 is set when the alternate network path is to be used. This is an instruction to reverse the terminating junctor so that the calling line may be connected to the C stage and the called line to the A stage.

The output of flip-flops W6–W12 is converted by decoder 1310 to a signal on one out of twenty-five output leads to select the line group. These outputs are taken through gates enabled by signal MS when the marker is actuated, and thence to relay drivers whose contacts connect resistance battery potential to the allotters of the RA and A matrices in the selected line group.

The output of flip-flops W13–W16 is converted by decoder 1311 into a signal on one out of ten leads designating the tens digit of the calling line, and the output of flip-flops W17–W20 is converted by decoder 1312 into a signal on one out of ten leads designating the units digit of the calling line.

The output of flip-flops X14–X20 is converted by decoder 1313 into a signal on one out of eighteen output leads designating the switch in the RA and A matrix, for supplying ground to the allotter magnet thereof. The outputs B1–B4 designate switches in the RA matrices, and the outputs D5–E7 designate switches in the A matrices. The outputs of flip-flops Y14–Y20 are converted by decoder 1410 into a signal on one out of fourteen output leads to select switches in the C stage and supply ground to the allotter magnets thereof.

The output of flip-flops Z6–Z12 is converted by decoder 1411 into a signal on one out of twenty-six output leads. Output B0 is for supplying battery potential to the allotter magnets of the R stage, and outputs B1–D3 are for selecting the called line group and supplying battery potential to the allotter magnets of the C stage. The outputs of flip-flops Z13–Z16 are converted by decoder 1412 into a signal on one out of ten leads 10–Θ0, and the outputs of flip-flops Z17–Z20 are converted by decoder 1413 into a signal on one out of ten leads 0–Θ. For a connection to a called line the outputs of decoders 1412 and 1413 are for designating the tens and units magnets of the C stage and supplying ground potential thereto. For a connection to a register the outputs of these wo decoders are combined in a matrix of relay drivers, one coordinate being one of the tens digits 10, 20, or 30, and the other coordinate being one of the eleven units digits 0–Θ. The outputs of this matrix supply ground potential for the allotters of the switches in the R matrix. The tens and units digits at the inputs of the relay driver matrix correspond to the last two digits of the register address associated with the R matrix switch. For example the first R matrix switch is associated with register B011, and its allotter ground potential is supplied via lead DR11 actuated by relay drivers at the output 10 of decoder 1412 and the output 1 of decoder 1413.

The marker is actuated by setting flip-flop MS from an accumulator output signal ACC1-1 when gated pulse amplifier 1303 is enabled by address B056 and signals on leads OP2 and BT4 and triggered by the pulse on lead CPA. The marker status is supplied from the output of the flip-flop through break contacts of relay OV to the temporary memory read circuits of FIG. 4, along with the marker flip-flop outputs. The output of flip-flop MS also actuates the relay driver CD to operate a mercury wetted relay HG. Contacts of relay HG supply the allotter ground potential via conductor ALG, and also completes an operate circuit for relay TU. Relay TU operates after a delay period and at its contacts supplies ground potential to the tens and units ground conductor TUG, and also at other contacts thereof completes an operate circuit for relay OV.

Figure 19:
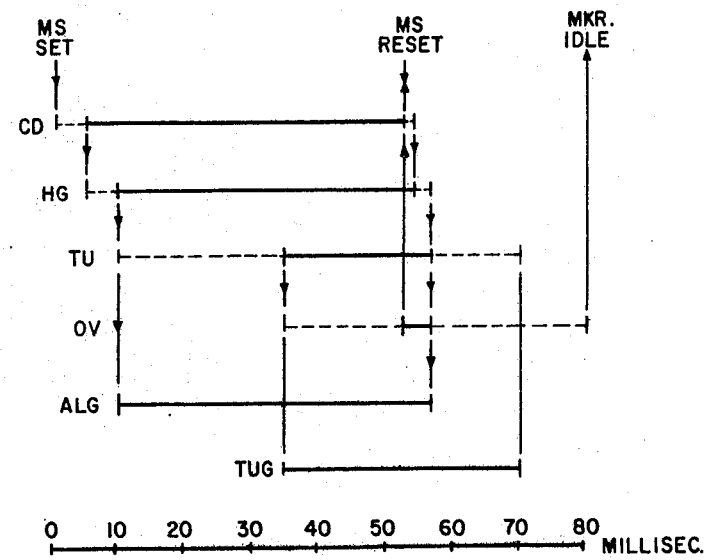

Relay OV operates after a delay period and at make contacts thereof completes a circuit to reset the flip-flop MS on the next clock pulse on lead CPA. Break contacts of relay OV open the connection to lead MS from the flip-flop, which maintains the signal in a true condition until relay OV restores, at which time the marker is idle. The timing sequence is shown in FIG. 19.

REGISTER CIRCUIT—DETAILED DESCRIPTION FOR LOCAL TO LOCAL CALL

Figure 16:
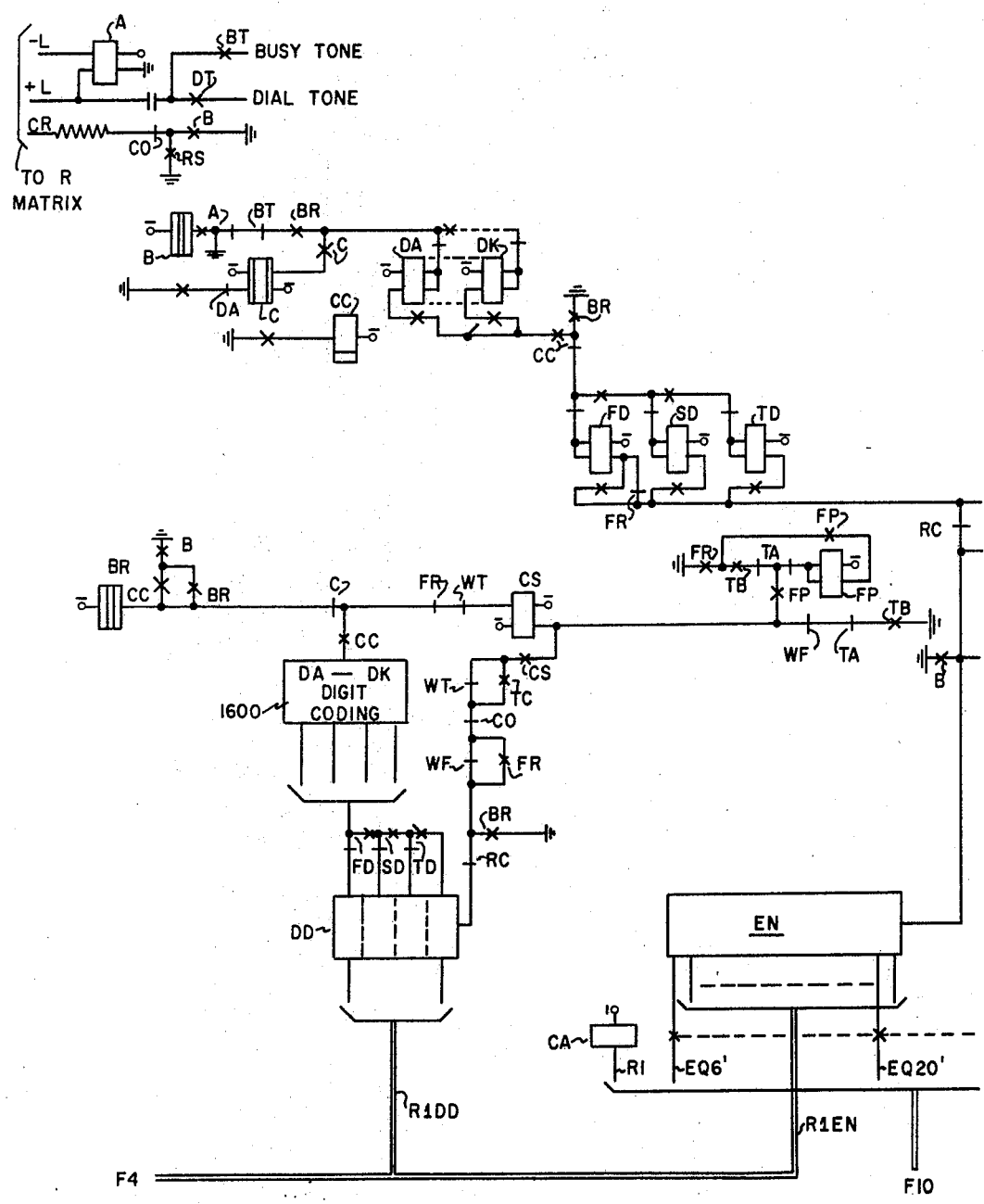
Figure 17:
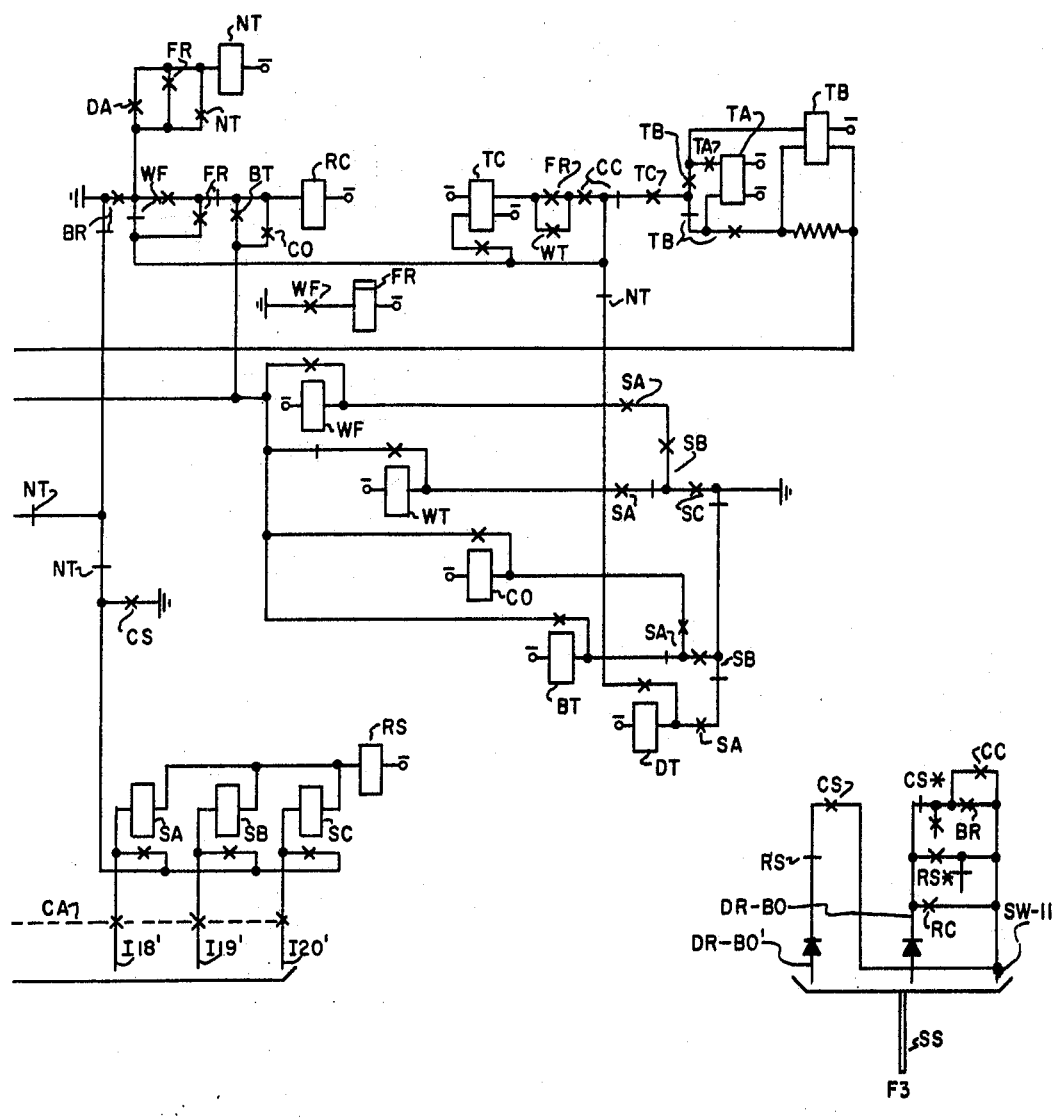
Figure 25:
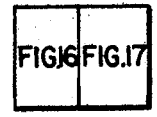

Referring to FIGS. 16 and 17 arranged as shown in FIG. 25, the register circuit comprises a dialed digit storage section DD (Relays DD5–DD20, FIG. 9) having four sets of four relays each for storing four digits in binary code, an equipment store section EN (relays EN6–EN20, FIG. 9) comprising four sets of relays for storing the calling line number as received from the register buffer in binary code, three instruction store relays SA, SB and SC for storing an instruction as received from the register buffer, a status control section for supplying the status of the register via cable SS to the memory, a line relay A connected across the line terminals —L and +L, a hold relay B, a series relay C along with a slave relay CC, a counting chain comprising ten relays DA–DK of which only the first and last are shown, a sequence circuit comprising a first digit relay FD, a second digit relay SD, and a number of other control relays. The register also includes a timer, which is not shown, to release the register if no digits are dialed or excessive time elapses after the dialing of part of the digits.

Seizure

The register buffer circuit applies ground to the lead R1 to operate a reed relay CA, thereby via its contacts connecting the input leads of the equipment store and instruction store to the outputs of the register buffer flip-flops. The calling line equipment number is supplied from the register buffer via conductors EQ6'–EQ20' into the equipment store, and the instruction command via conductor 118' operates relay SA. Relay RS operates in series with relay SA. Relay SA locks via a set of its own contacts and break contacts of relays NT and BR to ground, and the equipment store relays lock via break contacts of relay NT and BR to ground. Relay DT operates via make contacts of relay SA and break contacts of relays SB and SC to ground. Contacts of relay DT connect dial tone via a capacitor to the line conductor +L. Contacts of relay RS applies the register busy status condition by completing the connection from terminal DR-B0 to terminal SW-11. Contacts of relay RS also apply a holding ground to the CR conductor via break contacts of relay CO and a resistor.

When the telephone loop is extended across the —L and +L terminals, relay A operates. The hold relay B operates via contacts of relay A, and applies another holding ground to lead CR. Relay C operates via break contacts of relay DA and make contacts of relay B. The first digit sequence relay FD operates via its two windings in series, break contacts of relays FR and RC, and make contacts of relay B to ground. Relay CC operates via contacts of relay C.

Relay BR operates via contacts of relay CC and B to ground. This relay provides a hold ground for the impulse counting relays, and an operate ground via the same contacts for the digit sequence relays, provides a holding ground via a set of its make contacts in series with break contacts of relay RC for the dialed digit storage relays, prepares the dial impulsing circuit to the impulse counting relays, connects terminals DR-B0 and SW-11 to maintain the busy signal at the status control, releases relays SA and RS, provides a locking path for itself in series with contacts of relay B, and via contacts not shown extends ground to a motor start common lead, and via other contacts not shown lights the circuit busy lamp.

The first digit sequence relay is operated, so that the initial digit is stored in the second position of the dialed digit storage section DD (relays DD9–DD12).

The block 1600 comprises contacts of the ten counting relays DA-DK to convert a digit to binary for storage. The contacts shown between the four output leads of the dialed digit coding block 1600 and the storage locations of the dialed digit storage on relays FD, SD and TD represent contacts in each of the four leads.

First digit dialed

Relay A responds to the dialed circuit-interruption impulses. On the first release of relay A, relay DA partially operates via its upper winding, a set of its break contacts, make contacts of relay BR, and break contacts of relays BT and A to ground; closing only its preliminary make contacts shown immediately below its winding. When relay A reoperates at the end of the impulse, shunting ground is removed so that relay DA operates fully from battery via both of its windings in series, its preliminary make contacts, and make contacts of relays CC and BR to ground. The impulsing conductor is transferred to the next counting relay DB (not shown). The preoperate circuit of relay C is opened at break contacts of DA, leaving the relay C held via its other winding and its own contacts to the impulsing conductor. Being slow to release, relay C holds during the train of impulses. Relay NT operates via make contacts of relays DA and BR.

Separate break contacts of relay NT open circuits to release relays DT and the instruction relay SA.

Depending on the number dialed, the appropriate impulse counting relays DA-DK will operate in a similar manner to that described for relay DA. At the end of the train of impulses relay C releases followed, after its slow to release period by relay CC. Ground is extended via make contacts of relays B and BR, break contacts of relay C, and make contacts of relay CC to the dialed digit coding contacts, the coded digit being routed via make contacts of relay FD and break contacts of relay SD to the second position of the dialed digit storage to operate the appropriate relays therein.

Upon the release of relay C, relay CS operates from battery via one of its windings, break contacts of relays WT, FR, and C, and make contacts of relays BR and B to ground. Relay CS provides a call for service status mark by completing the circuit between conductors DR-B0′ and SW-11, and opening the circuit between conductors DR-B0 and SW-11. Relay CS locks to ground via its other winding, a set of its own contacts, break contacts of relays WT, CO and WF, and make contacts of relay BR to ground. A holding ground for the instruction relay is provided via make contacts of relay CS. Upon the release of relay CC the impulse counting relays are released. The second digit sequence relay SD now partially operates via a circuit including break contacts of relay CC to operate only its preliminary make contacts shown immediately below its winding. Upon release of relay DA, relay C reoperates and closes the circuit for relay CC. Relay CC is made slow to operate to allow sufficient time for relay SD to operate to its preliminary make contacts before relay CC operates to remove ground from the initial operate path. Relay SD now fully operates.

The central processor upon scanning and recognizing the call for service signal reads the dialed digit via conductor group R1DD.

Wait for two digit instruction

The central processor then supplies the instruction to wait for two digits to the register buffer which via lead R1 operates CA, and then supplies signals via leads I18′ and I20′ to operate relays SA and SC, with relay RS also operating in series therewith.

The wait-for-two-digits relay WT operates from battery via its winding, make contacts of relay SA, break contacts of relay SB, and make contact of relay SC to ground. The operation of relay RS opens the circuit between terminals DR-B0′ and SW-11 and closes the circuit between terminals DR-B0 and SW-11 to provide the busy status mark. Break contacts of relay WT cause the release of relay CS. This opens the hold circuit for the instruction relays, causing them to be released. When relay CC reoperates, relay TC operates from battery and one of its windings, make contacts of relay WT and CC, break contacts of relay WF, and make contacts of relay BR to ground. Relay TC via a set of its contacts locks itself to ground. The two digit delay circuit of relays TA and TB is prepared.

Second and third digits dialed

The second digit is dialed in the same manner as the first, and stored in the third position of the dialed digit storage relays.

The operate circuit of relay CS is disconnected at break contacts of relay WT and therefore cannot operate at the end of the second digit so that no call for service is given to the status control circuit. The third digit sequence relay TD operates.

When relay CC releases at the end of the second digit impulse train, relay TA operates via one of its windings, break contacts of relay TB, make contacts of relay TC, break contacts of relay CC, break contacts of relay WF and make contacts of relay BR to ground. This prepares the operate circuit of relay TB and a subsequent release circuit for relay TA. Break contacts of relay TA disconnect an operate circuit of relay CS. When relay CC reoperates, the shunting ground is removed from relay TB and it operates and holds in series with relay TA.

The third digit is then dialed and stored in the fourth position of the dialed digit storage relays. Ground is extended via make contacts of relay BR, break contacts of relay WF, break contacts of relay CC, make contacts of relay TC and make contacts of relay TB to hold relay TB via its upper winding. The same ground via contacts of relay TA energizes the upper winding thereof to oppose the lower winding in a differential manner and cause it to release. Relay TB holds during the period that relay CC is normal and relay CS operates from battery via its lower winding, break contacts of relay WF, break contacts of relay TA, and make contacts of relay TB to ground.

Relay CS applies the call for service mark to the status control and disconnects the busy marking. Relay CS holds from battery and one of its windings via its own contacts, make contacts of relay TC, break contacts of relay CO, break contacts of relay WF and make contacts of relay BR to ground.

The central processor in scanning recognizes the call for service and reads the three dialed digits from the dialed digit storage via conductor group R1DD.

Wait for four digit instruction

Since the three digits sent to the central processor are the code for a local call, the next instruction received is to wait for four digits, which comprises relays SA, SB and SC all operate, with relay RS operated in series therewith. The wait-for-four relay WF operates via the make contacts of relays SA, SB and SC to ground, and locks via its own contacts. Relay RC operates via make contacts of relays WF and BR to ground. The break contacts of relay WF release relays TB and TC. The hold circuit of relay CS is opened at break contacts of relay WF and released. Relay FR operates via make contacts of relay WF.

Contacts of relay RC open a holding ground and release the dialed digit storage relays. The sequence relays FD, SD and TD are released via break contacts of relay RC. Make contacts of relay RC maintain the busy mark to the status control. Relay FR is slow to operate to allow time for relay CS to release and relay RC to operate long enough to release the digit storage relays DD and the three digit sequence relays FD–TD before their respective hold and operate circuits are disconnected and prepared at contacts of relay FR.

Relay FR upon operating prepares the hold ground for relay CS and operate ground for relay FP later. Break contacts of relay FR release relay RC, and ground is extended to the TA, TB and TC timing circuit via make contacts of relays BR, WF and FR. This ground is extended to operate relay TC via make contacts of relays FR and CC. Contacts of relay FR disconnect the initial operate circuit for relay FD.

Last four digits dialed

The last four digits are dialed and routed to the respective positions of the dialed digit storage relays via contacts of the digit sequence relays FD, SD, and TD. A fourth digit sensing circuit is provided by relays TA, TB and FT.

After the fourth digit train of impulses is received relay CC releases and completes a circuit to operate relay TA, followed by TB when relay CC operates, to remove ground from relay TB at contacts of relay CC. Relays TA and TB hold in series.

At the end of the fifth digit relay CC again releases and at its contacts ground is extended to release relay TA and hold relay TB until relay CC again operates. Relay FP now partially operates to close its premilinary contacts via its own break contacts, break contacts of relay TA, make contacts of relay TB, and make contacts of relay FR to ground. When relay CC again operates relay TB is released removing the initial operate ground of relay FP and operating it fully via both of its windings in series and it own preliminary make contacts and the make contacts of relay FR.

When relay CC releases after the sixth digit, relay TA is again operated followed by relay TB when relay CC reoperates.

On release of relay CC after the seventh digit relay TA is released and relay TB holds via contacts of relay CC until relay CC reoperates. Relay CS now operates from battery via its lower winding, make contacts of relay FP, break contacts of relay TA, make contacts of relay TB, and make contacts of relay FR to ground. Relay CS completes the call for service marking to the status control and removes the busy marking. This relay CS holds via its own contacts, and also prepares a holding ground for the instruction relays SA, SB and SC.

The central processor upon recognizing the call for service status reads the four dialed digits from the dialed digit storage relays via conductor group R1DD.

Register cut-off

The central processor next returns a release instruction operating the instruction relays SA and SB, and relay RS in series therewith. The cutoff relay CO now operates via make contacts of relay SA and SB and break contacts of relay SC to ground. Relay CO holds via a set of its own contacts. Break contacts of relay CO open the ground connection to lead CR to release the switch train, at a set of its break contacts opens the holding path for relay CS to restore the busy marking to the status control circuit upon release of relay RS, and operates relay RC.

Relay RC at a set of its break contacts opens the holding ground to release the dialed digit storage relays DD, releases the digit sequence relays FD, SD, and TD, and maintains the busy marking to the status control circuit.

The removal of ground from the CR lead removes the holding loop to relay A which releases, followed by relays B and BR. Upon release of relay CC the register presents the idle condition to the status control circuit for further calls.

FLOW CHARTS

Figure 26:
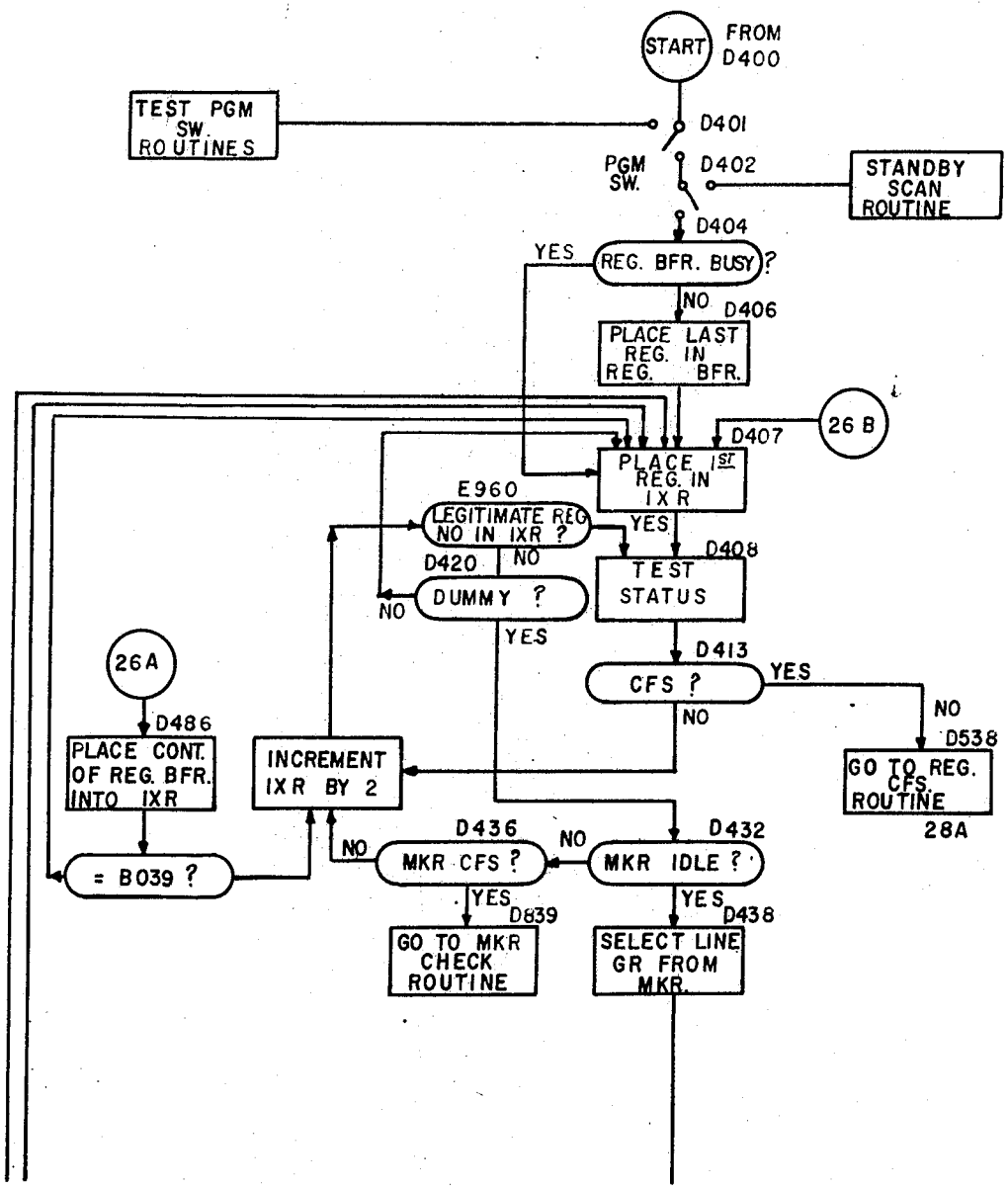

FIGS. 26–42 are flow charts of a typical program which may be used with the apparatus described in FIGS. 1–25. FIG. 26 along with FIG. 26A placed below it comprise a single chart, FIG. 27 with FIG. 27A placed below it comprise a single chart, and FIG. 39 along with FIG. 39A placed below it comprise a single chart. The flow charts show all of the operational sequences required for the ordinary operation of telephone exchange, and also many special service features such as abbreviated dialing and home intercom service. Some of the program addresses are indicated on the flow charts above the individual boxes. Most of the operations indicated in a single box require a few memory cycles following the indicated program address. All of the program addresses have an initial digit of D or E. Therefore the current address counter (FIG. 6) may have the first two flip-flops CAC5 and CAC6 omitted and these two bits permanently wired as true at the D.C. inputs of the coincidence gates (FIG. 2) enabled by a trigger pulse from gated pulse amplifier 201. Some of the auxiliary sequences shown on the flow charts require apparatus not shown in FIGS. 1–25, for example a marker check routine at address D839 requires that the marker call for service (address D436) at the end of its timing sequence rather than return to idle as shown in FIGS. 13–15 and 19. There are abbreviations used in the flow charts as follows:

AD—Abbreviated Dialing
ADD—Address
BFR—Buffer
CFS—Call For Service
CLR—Combined Line and Recording
   (a type of trunk to an operator position)
CMD—Command
DDD—Direct Distance Dialing
DN—Directory Number
EQUIP—Equipment
EAS—Extended Area Service
GR—Group
IXR—Index Register
INF—Information
INCPT—Intercept
MKR—Marker
NO—Number
OJ—Originating Junctor
PTR—Printer
PAX—Private Automatic Exchange PBX—Private Branch Exchange
  (designates a group of lines to the same location requiring trunk hunting)
PGM—Program
REG—Register
RJ—Register Junctor
RLSE—Release
REQD—Required
SW—Switch
TJ—Terminating Junctor
TRK—Trunk Information stored in memory addresses The memory stores twenty bits of information which are numbered from left to right. As explained in the section entitled "Memory," an address is stored in the register, translation and program sections of the memory in bits 5–20 constituting four digits of four bits each, with the first digit comprising bits 5–8, and the fourth digit comprising bits 17–20. Note also the numbering plan for the addresses described in the section entitled "Memory" in which the first digit may take values of 0–E, with the value F being also possible if required, the second and fourth digits may take values 0–θ, and the third digit may take values 0–E.

There are thirty-three memory addresses allocated to the sixteen registers and a dummy register number. Each register has two addresses, the first being for status and dialed digits, and the second for a calling line equipment number. For example the first register uses address B011 for status and dialed digits and address B012 for the calling equipment number. In the status and dialed digit address bits 1 and 2 designate the status with the idle indicated by 00, a call for service indicated by 01, and busy indicated by 10. The dialed digits are stored in the four address digits of bits 5–20. At the equipment number store address the calling line equipment number is stored in the four digits of bits 5–20. Address B040 is a dummy address designated by bit 4 being true along with the call for service bit 2. This is equivalent to a value of 5 for the digit comprising bits 1–4. If an exchange is equipped with less than sixteen registers, the unequipped register status addresses should be wired with bit 1 true for busy.

Temporary memory addresses comprise B050–B065 designated the various flip-flop stores in which information may be written as well as read.

The equipment number addresses comprise B111–D3θθ as indicated in FIGS. 11 and 12. Of these equipment number addresses, those having the third and fourth digits decimal values 1–θ designate the 2500 line circuits, some of which are used as trunks, and those in which the third digit is B, C, D, or E designate the junctors of the network. For the junctors the first bit is a status bit with a one indicating a busy junctor having the status relay contacts closed, and a zero indicates an idle junctor. For the line and trunk circuits the first two bits indicate status by means of the line and lockout contacts, with idle indicated by 00, a call for service indicated by 01, busy indicated by 10, and lockout indicated by 11. Those addresses in this section in which the third and fourth digits are 10 are used for indicating the status of a group of 100 lines. In a group of lines requiring trunk hunting, each line except the last has a 1 in bit 3, and the last line in the group is indicated by a 0 in bit 3. Bit 4 is used to designate a dummy line, which also has bit 2 wired true, used as a dummy call for service to indicate that the last line has been scanned. Class of service indications for the lines use a 1 in bit 5 for hot line, in bit 6 for direct distance dialing restriction, in bit 7 for incoming trunks to force the subscriber to dial seven digits, in bit 8 to indicate a line which has push button dialing service, in bit 9 to indicate that a trunk hunting indication follows, in bit 10 to indicate that the line is equipped for abbreviated dialing, in bit 11 to indicate home extension intercom service, and in bit 12 to indicate a multiparty line.

A 1 in each of the bits 11 and 12 indicates a two party line. The terminating junctor addresses also store class of service information to designate junctors equipped for service such as multiparty, revertive call, trunk switch through, etc.

The number translation section uses addresses 0100–θθθθ. In this section the input address is a directory number, and the information stored includes a ringing code in bits 1–4 and an equipment number corresponding to that directory number in bits 5–20.

The program section uses those addresses in which the first digit is a D or an E. Bits 1–4 of the information stored comprise the OP code, and bits 5–20 comprise the "A" address.

Figure 26A:
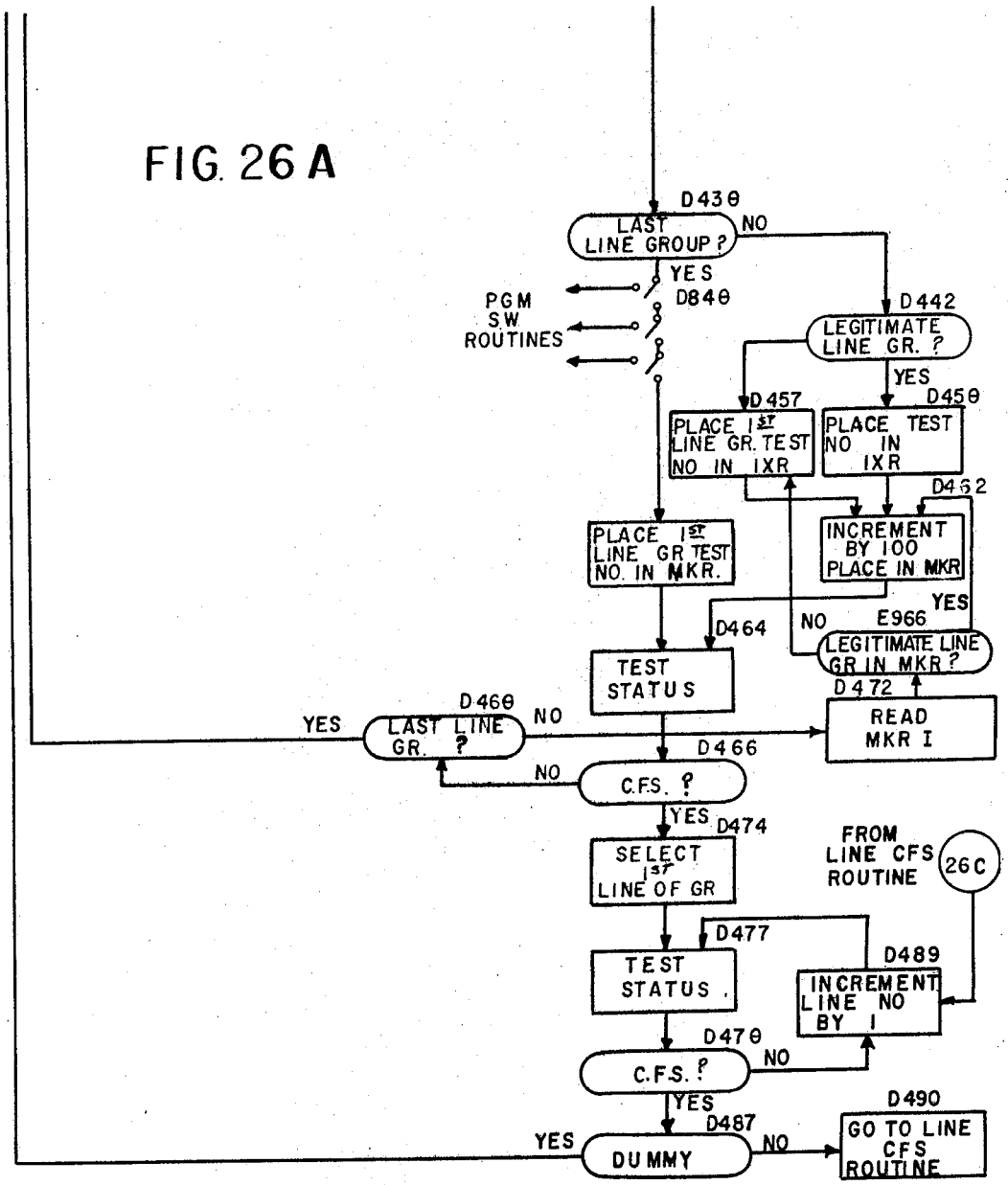

FIGS. 26 and 26A comprise a flow chart of the scanning of registers and lines for call for service indications. Note in this flow chart that the registers have priority and are always scanned first. Although not shown in this flow chart, it is possible to provide priority to incoming trunks and then to outgoing trunks ahead of the registers.

The requirements on speed of operation of the system are that not more than 1.5% of all calls will have to wait more than 3.0 seconds for dial tone, and that a trunk call must be switched through during the interdigital pause of 600 milliseconds or less.

The marker I flip-flops store a number designating the last hundred-line group in which a call for service has been handled or the last line group which has been scanned.

Figure 27:
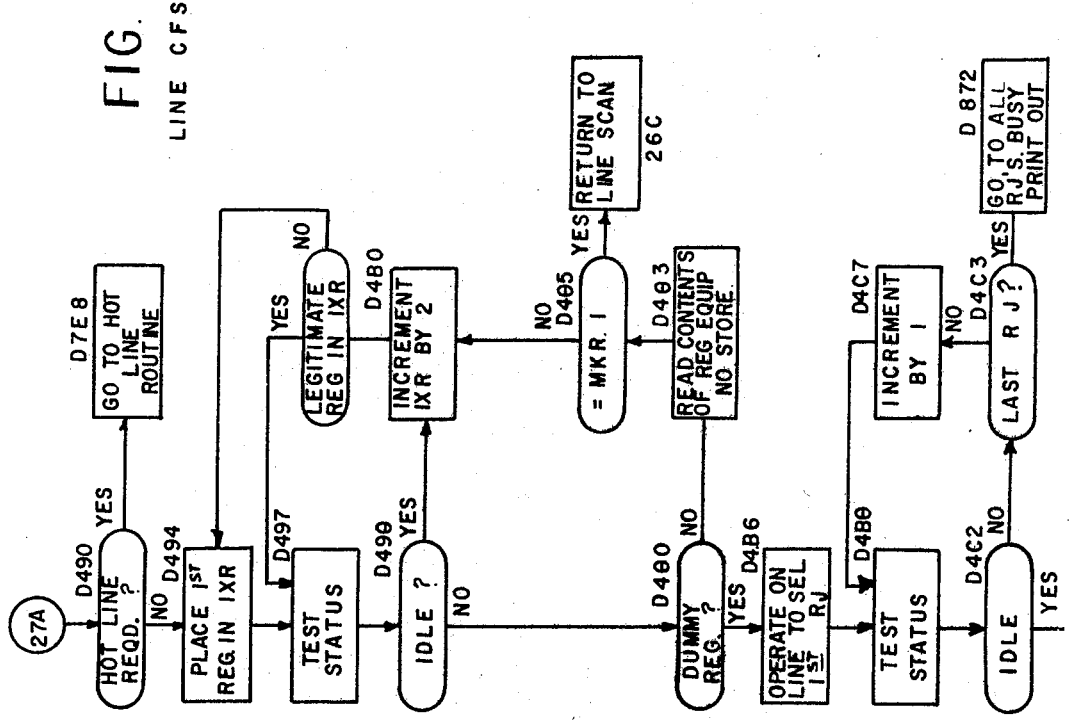

FIGS. 27 and 27A comprise a flow chart for the line call for service routine, which provides for instructing the marker to connect a calling line to a register.

Figure 28:
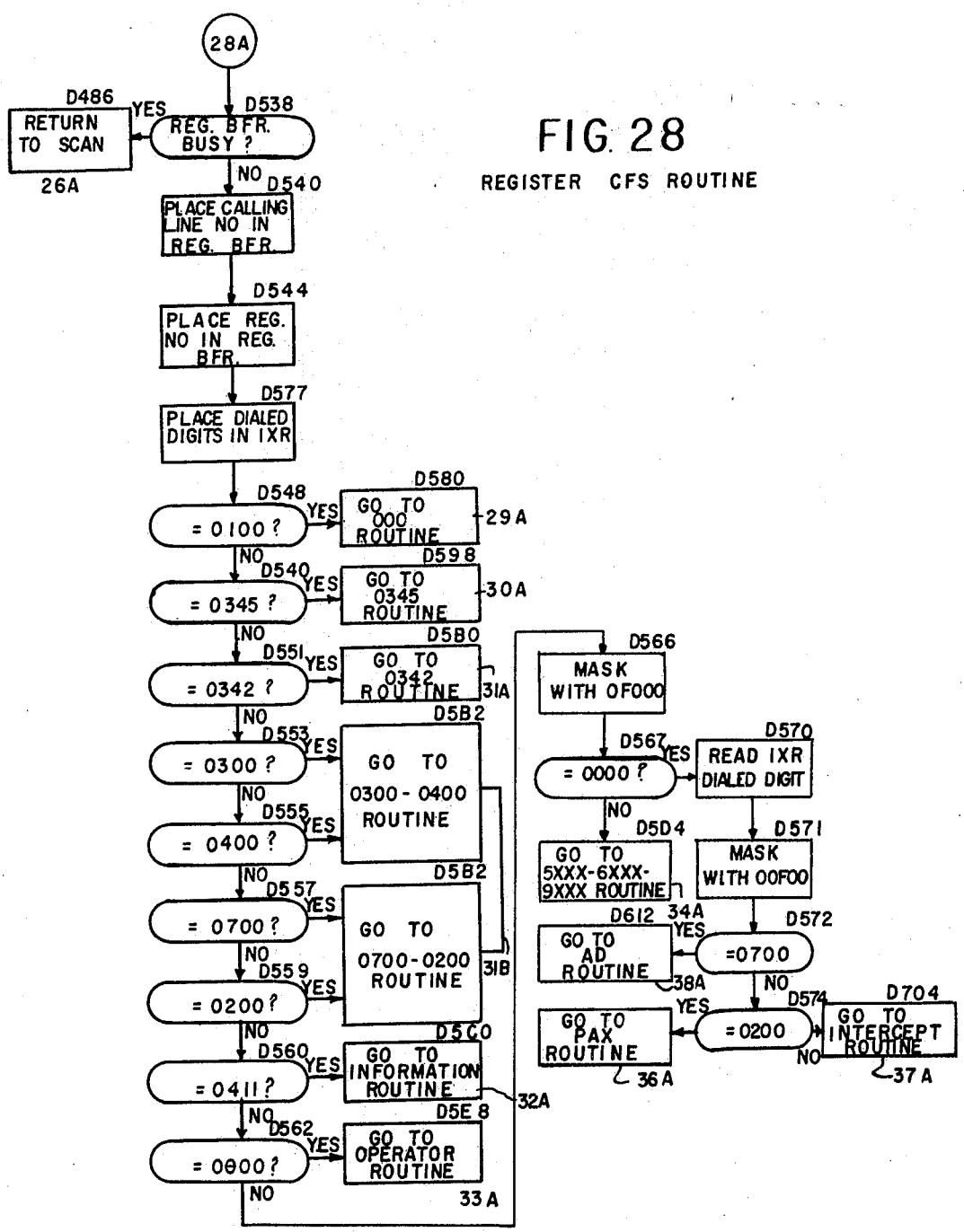
Figure 29:
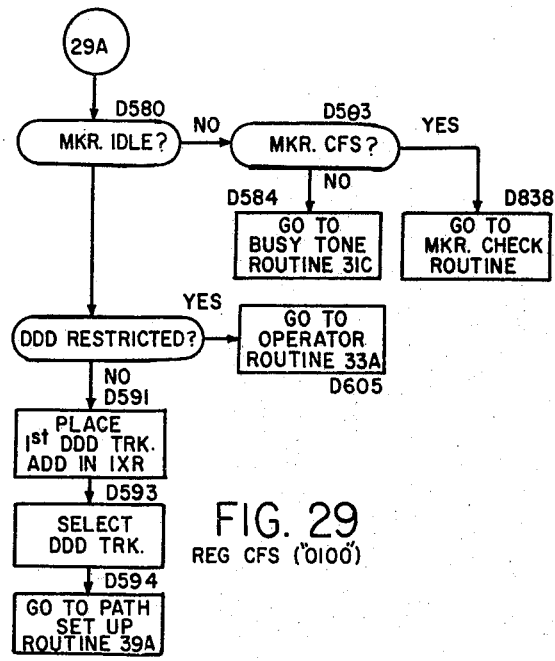
Figure 30:
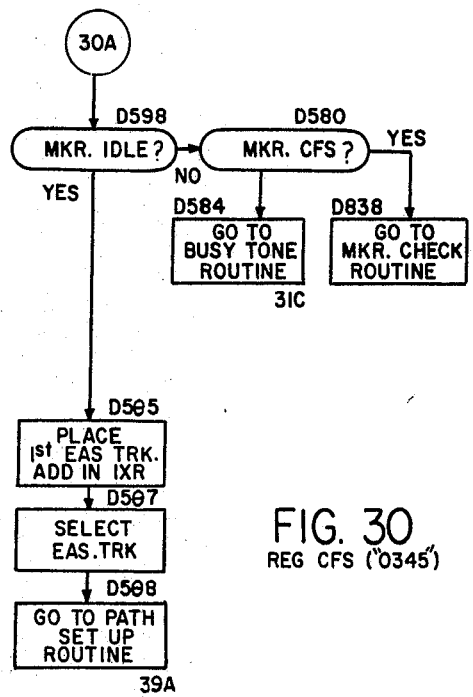

FIG. 28 is the register call for service routine which determines what action to take after one, three and seven digits have been dialed. Depending on the pattern of digits present in the dialed digit store of the register, the sequence of operations then follows the routine shown in one of FIGS. 29–37. FIGS. 39 and 39A comprise a chart showing the path setup routine, which is entered from a register call for service sub routine when the dialed digits correspond to the requirements for establishing a path between the calling line and the called line through the network. This routine tests the terminating and originating junctors in the fourteen possible paths (if the exchange is fully equipped) and supplies the instructions to the marker to set up the path. If an all links busy condition is encountered then the alternate path routine of FIG. 40 is used to determine if a path is available in the reverse direction connecting the calling party to the C stage and the called party to the A stage. FIG. 41 shows an address readout routine using the printer. FIG. 42 shows the home intercom ring selection routine, which is an auxiliary sequence indicated in FIG. 39A. FIG. 38 shows an abbreviated dialing routine.

LOCAL CALL—DETAILED DESCRIPTION

The flow charts and program will be illustrated by a detailed analysis of a typical local call. This should provide an understanding of the principles involved, so that the remainder of the flow charts will be self-explanatory. The call-thru diagram for this call is shown in FIGS. 8 and 9.

Assume that a call is initiated at a station 342–5928 on a line whose equipment number is C112. Closure of the line loop operates the line relay, which closes contacts in the status conductors for the group address C110 and line address C112 so that each has a 4 as the first data digit in memory. Also assume that the previous number stored in marker I (address B052) is C011.

In the description which follows the memory output in bit time 1 will be referred to as an instruction, which includes an operation code and an address, and the memory output in bit time 3 will be referred to as data.

As shown in the flow sheet FIG. 26, the program starts with address D400, with a test of the program switches.

Assuming all of the program switches in the normal position the program advances to D401, jumps to D402, and then jumps to D404. The instruction at address D404 is 1B050, indicating read the register buffer status. Assuming that the register buffer is idle the data read is all zeros. Advancing to address D405 the instruction is 40001 which indicates compare the register buffer status now in the accumulator with the constant 80000, stored in address 0001, which yields an inequality and advances the program an extra step. At address D407 the instruction is 10002 indicating to read the constant from 0002 which is 0B039, the last register. At address D408 the instruction is 2B057 which causes the last register number to be written into the register buffer register number address B057.

Register scan

At address D409 the instruction is 10003 which indicates read the data from address 0003 which is a constant 0B011. At address D400 the instruction is 2B050 which causes the register number B011 to be read into the index register. This register is next tested for a call for service. At address D410 the OP code is 3 which causes the data (all zeros assuming that the register is in an idle state) to be transferred from register B011. At address D411 the instruction indicates to mask with a constant from 0012 having the value C0000; thereby eliminating all but the status bits from the information in the accumulator. At address D412 the instruction is 40004 which indicates compare the status to a call for service indication 40000 which is stored in address 0004 yielding an inequality signifying no call for service and advancing the address to D414. There is nothing stored at the next three addresses so the current address counter continues to advance to address D417, at which the instruction is 1B050. Therefore the data from the index register is read, being the number of the register B011. At address D418 the instruction is 50005 which indicates add 1, yielding 0B012 in the accumulator, and at address D419 another 1 is added giving the register number B013 in the accumulator. At address D410 the instruction is 6E960, causing a jump to address E960 to test whether there is a legitimate register number in the index register. This test determines whether or not the digits represent an actual register number and provides protection against noise which might destroy or modify the data stored in flip-flop memory. The result would be an infinite loop.

At address E960 the register number B013 is written into the index register. At the following address the register number in the accumulator is masked with the constant 0FF00 to leave only the group number B0, which is compared to the constant 0B000 stored in address 0014, and equality causes a jump from address E963 to D424. The register number B013 is read from the index register, masked with the constant 000F1 to leave 00011, and compared to the constant 00011. The equality signifies a legitimate register number. (For registers B020–B039 additional comparisons are required.) There is now a jump from address D427 to E9B0. The register number B013 is read from the index register, and the address jumps to D410. The program continues to cycle to test all of the registers for call-for-service status. It is assumed that all registers are idle or busy so the program continues testing registers until the number B040 appears in the index register and accumulator during address E960. At addresses E961 to E963 the group number B0 is determined to be correct, and there is a jump to address D424. At addresses D424, D425, D426, D428, D420, and D431 it is determined that the last two digits are not legitimate, and there is a jump to D420. At address D420 the instruction is 1B050 reading the dummy register number into the index register. At address D421 the instruction is 40013, indicating a comparison is to be made with the constant 0B040. Being equal the program advances to the next address D422 which has the instruction to jump to address D432. An inequality on the other hand during the legitimate register comparisons and the dummy register comparison indicates that it is necessary to reset the computer to address D409 to start a cycle which is known to contain correct data.

Scan of line groups

At address D432 the instruction 1B056 reads the marker status from address D056 which is assumed to be idle and therefore all zeros. At address D433 a comparison is made with a constant 00000 and the equality advances the address to D434 which has an instruction to jump to address D438. The instruction at this address is 1B052 to read the line number stored in marker I, which is line number C011. At address D439 the instruction 70007 masks this number with the data 0FF00 from address 0007 so that only the group number C0 remains. At address D430 (FIG. 26A) the instruction 2B052 writes the group number back into marker I. At address D440 the instruction 40018 causes a comparison of the line group with the data stored in address 0018, namely constant 0D300, with the inequality indicating that this is not the last line group.

The address is advanced to D442 having data 40014 indicating a comparison with the constant 0B000 to start a test for a legitimate line group. The inequality advances the address to D444 with an instruction 70009 to mask with the data 0C000, leaving 0C000 in the accumulator. At address D445 the instruction 40014 causes another comprision with the data 0B000 and advances the address to D447. The instruction is to make another comparison with 0C000 which gives an equality and advances the address to D448 and a jump to D450. The above test is to determine whether the group number as read from marker I address represents an actual group combination in the system. Illegitimate number combinations could be a result of noise spikes upsetting the contens of marker I. If illegitimate information has been introduced the program will jump to address D457 to select the 1st line group test number and thence proceed to address D460. However the group number is assumed to be C000 and the program advances to D450.

At address D450 the instruction is 1B052. This causes reading of the information C000 from marker I. The address D460 has the instruction 50011 which indicates add the constant 00010 prdoucing the number C010 in the accumulator. The address D461 has instruction 2B050 which writes this number C010 into the index register address B050.

The next address D462 has instruction 50010 which indicates add 100 (data 00100 stored in address 0010) giving the number 0C110 in the accumulator. The address D463 has instruction 2B052 which writes the number C110 into marker I address B052.

The next address D464 has an OP code 3 which causes the data from the line number address C110 to be read. This is the address for group C1 in which line C112 is assumed to have initiated a call. Therefore the information read is 40000. At address D465 the instruction 10004 indicates a comparison with the data 40000 which is an equality. At address D466 the instruction is to jump to D474.

Scan lines

At address D474 the instruction is 1B052. The data C110 is read from marker I. At address D475 the instruction 50005 causes an addition of 1 (data 00001 stored at address 0005), giving the line number C111 in the accumulator. At address D476 the instruction 2B052 causes this information to be written into marker I. At address D477 the OP code 3 causes a transfer of the data at address C111 into the accumulator, which we will assume to be 02000. At address D478 the instruction 70012 masks this information with the constant C0000 from address 0012 so that only the status bits remain giving 00000.

At address D479 the instruction 40004 causes a comparison with the constant 40000, and the inequality advances the address to D480.

The address jumps to D489, having instruction 1B052. The number C111 is read from marker I. From address D480 there is a jump to address D475 having instruction 50005, causing an addition of 1 and producting the line number C112 in the accumulator. At address D476 the instruction 2B052 writes this number into marker I. At address D477 the OP code 3 transfers the data of this line number into accumulator. We have assumed that this line is calling for service so the result is 40300. At address D478 the instruction 70012 masks this information with the constant C0000 causing only the status bits to remain, so that the result is 40000 in the accumulator. At address D479 the instruction 40004 causes a comparison with the constant 40000, and the equality gives the next address as D470.

The address now jumps to D481 having instruction 1B052 reading the number C112 from marker I. At address D482 the OP code 3 again transfers the data for this line number into the accumulator as 40300. At address D483 the instruction 40006 causes a comparison with the constant 50000 which is unequal, signifying that this is not a dummy line, and advances the address to D485. The dummy line is used to indicate the end of the line group. There is now a jump to address D490.

Line call for service routine—FIG. 27

At address D490 the instruction 1B052 reads the line number C112 from marker I. At address D491 the OP code 3 again transfers the line number data 40300 into the accumulator. At address D492 the instruction 70009 masks this information with the constant OF000 leaving only the data 00000 remaining in the accumulator. At address D493 the instruction 40019 compares this with the constant 08000 to test for hot line service and the inequality advances the address D495. The expression "hot line" designates a special class of service requiring only a call for service to cause a network connection to be established to a line stored in the memory, for example, to an operator line.

At address D495 the instruction 10003 places the constant 0B011 which is the address of the first register in the accumulator. At address D496 the instruction 2B050 writes this number into the index register.

At address D497 the OP code 3 transfers the status of this register which is assumed to be idle and therefore 00000. At address D498 the instruction 70012 masks this with the constant C0000 leaving all zeros assuming that register B011 is idle. At address D499 the instruction 40000 makes a comparison with all zeros and with the equality the next address is D490.

There is a jump to address D4B0 having instruction 1B050 which reads the register number B011 from the index register. At address D4B1 the instruction 50005 adds 1 and at address D4B2 another 1 is added giving the number B013 of the next register. At address D4B3 there is a jump to address D496 having the instruction 2B050, writing the next register number B013 into the index register.

All of the registers are now tested in a like manner for an idle condition. If a register is found to be not idle at D49 (i.e. it is busy or a calling for service) the program will advance an extra step to D400. The instruction 1B050 reads the register number (B011–B040) from the index register. The address D401 causes a comparison with the constant 0B040; an equality indicating that the dummy register has been reached and causing the program to go the next address D402. Address D402 causes a jump to address D4B6. An inequality above causes the program to advance an extra step to D403 where the instruction 50005 adds 1 to the register number yielding the register equipment number store address. The 3 op code at address D404 transfers the data from this address to the accumulator. Address 405 compares this data with the data contained in the marker I address B052 and if equal advances to D406 which causes a jump to address D469. If unequal the program advances an extra step to D407 which causes a jump to D4B0. This starts a legitimate register test to be conducted on the data contained in the index register, a legitimate register number causes the program to proceed to D497 whereas an illegitimate register number causes the program to jump to D495.

The instruction 1B052 reads the line number C112 from marker I. The adddess D4B7 with instruction 70007 masks this with the constant 0FF00 leaving the group number C1. The address D4B8 with instruction 80010 superimposes the constant 000B1 giving the first register junctor number C1B1.

The register junctors are now tested to find an idle one. The address D4B9 with instruction 2B053 places the junctor number in marker II. The address D4B0 with OP code 3 transfers the status of this junctor into the accumulator. If the junctor is idle a result is all zeros. The addresses D4C0 and D4C1 cause a masking and comparison indicating the idle condition. If on the other hand the first register junctor C1B1 is found to be busy the address D4C1 comparison will result in the program proceeding an extra step to D4C3. In this and subsequent steps to D4C9 the program will test the register junctor to determine whether it is the last junctor in the group and if not adding 1 to obtain the next junctor. The program would then return to address D4B9 to test the status for an idle indication.

A test is now made to determine whether a push button tone register is required. The address D4C2 causes a jump to address D4D0 having instruction 1B052. The line number C112 is therefore read from marker I. The address D4D1 with OP code 3 transfers the data from the line number address C112 which is 40300. Addresses D4C2 and D4C3 cause a masking with a constant 0F000 to eliminate all but the second digit, and a comparison with the constant 01000 yielding an inequality and advancing the address to D4D5.

The instruction 1B057 reads the register number B039 from the register buffer. The addresses D4D6 and D4D7 each has the instruction to add 1 giving a result of B040. At address D4D8 the instruction 2B050 writes this into the index register. At address D4D9 the OP code 3 gives the call for service information 40000 from the dummy register. At adddesses D4D8 and D4E0 this is masked by a constant C0000 and compared with the constant zero with the inequality advancing the address to D4E2. The instruction 1B050 reads the dummy register number B040 from the index register. The address D4E3 with instruction 4B057 causes a comparison with the number in the register buffer and the inequality advances the adddess to D4E5 having instruction 40013. This causes a comparison with the constant 0B040 and being equal the next address is D4E6. There is now a jump to address D500 having instruction 1B052. The line number C1112 is read from marker I. At address D501 the OP code 3 transfers the data 40300 from the line number address C112.

At addresses D502 and D503 the data from the calling line address is masked with the constant 0C000 and then compared with the constant 01000 to determine if a push button tone register is required. The comparison being negative, the address is advanced to D505 and a constant is read which is the address 0B011 of the first register.

The next address gives the command to jump to address D4D8, with an instruction 2B050, which causes the register address to be written in the index register. At address D4D9 the OP code 3 transfers the data from the register address, which at this time is all zeros. At addresses D4D0 and D4E0 the register output data is masked with the constant C0000 and then compared with all zeros to test the status of the register for idle.

Being idle the next address gives an instruction to jump to address E990, which reads the register number from the register buffer address B057, to test for legitimacy of the number. This number at this time is B039 which at address E991 is masked with the constant 000F1 to produce the result 00031. This is then compared at address E992 with a constant 00011 and at address E994 with the constant 00031. The last result being equality, at address E995 the command is given to jump to address E9B2. The register number from address B057 is again read and masked at address E9B3 with a constant 0000F to give the result 00009. At addresses E9B2 through E9B7 masking and comparisons take place to determine the legitimacy of the register number, at address E9B9 the command is given to jump to address D510.

At addresses D510 and D511 the register buffer status address B050 is read and compared with the constant 80000 to test the register buffer for busy. Being idle the result of the comparison is an inequality advancing the address to D513, where the register number B011 is read from the index register. At addresses D514 and D515 the register number is read into marker IV address B055 and the register buffer register number address B057.

At address D516 the calling line number C112 is read from the marker I address, and at address D517 this number is written into the register buffer equipment number address B058. At address D518 the OP code 3 transfers the data 40300 from the calling line number address. At addresses D519 and D510 this data is masked with the constant 02000, and then compared with the same constant to determined if this is an incoming trunk, with the result being negative and advancing the address to D521.

The constant 00001 is read into the accumulator, and at address D522 this constant is read into the register buffer command address B059, as an instruction to the register to supply dial tone and await for one digit.

At addresses D523 and D524 the constant all zeros is read into the accumulator, and then written into the marker III address B054, indicating that no terminating junctor is to be connected at this time.

At addresses D525 and at D526 the constant 80000 is read from memory and then written into the register buffer status address B050 to activate the register buffer. At address D527 the same constant is written into the marker status address B056 to activate the marker. At address D528 the command is given to jump to address D409 to return to scanning, staring with a scan of all of the registers (Circle 26B in FIG. 26).

Register buffer

In the register buffer (FIG. 10) the following data is now present.

| | |
|---|---|
| B057 | B011 |
| B058 | C112 |
| B059 | 1 |
| B050 | Set |

At address 050 setting of the flip-flop S1 initiates the timing sequence of the register buffer by the timing circuit consisting of relays C and HG, and supplies ground to the output relay driver contacts.

The output of the flip-flop R15–R20 (address B057) is decoded to operate a relay driver and supply ground to register B011 via output lead R1. This operates relay CA in the register to connect the equipment number and instruction storage relays to the register buffer.

The outputs from flip-flops EQ6–EQ20 (address B058) set corresponding ones of relays EN6–EN20. The outputs of flip-flops I18, I19 and I20 (address B059) set corresponding ones of relays SA, SB, and SC; in this case only relay SA being set. This in turn operates relay DT to supply dial tone.

The register buffer returns to idle after an appropriate interval.

Marker

In the marker the following data is present.

| | |
|---|---|
| I–B052 | C112 |
| II–B053 | B1 |
| III–B054 | 00 |
| IV–B055 | B011 |
| B056 | Set |

The decoded output of marker I (WX and W flip-flops) supplies battery to the allotter relays of group C1 (A and RA matrices), and operates relay drivers for tens relay 10 and units relay 2. The decoded output of marker II (flip-flops X) operates a relay driver for ground to the allotter of switch C1B1 of the RA matrix. There is no output from marker III (Y flip-flops). The decoded output of marker IV (Z flip-flops) via output B0 operates a relay driver to supply battery to the R matrix allotters, and via outputs 10 and 1 operates relay drivers for the supply of ground to the allotter of the switch connected to register B011. From the output of the status flip-flop, relay AL operates to complete the ground connection via mercury wetted contacts to the allotter relays, and also to a relay in parallel with the RA matrix allotter relay in the register junctor C1B1 to prepare a path for tens relay 50 and units relay 5 of the R matrix switch. In the marker, after twenty milliseconds the TU relay operates to complete the ground connection to the tens and units relays. In the RA matrix switch CC1B1 tens relay 10 and units relay 2 operates, and in the R matrix switch B001 the tens relay 50 and units relay 5 operate. Ground is applied to the C lead via the contacts of the tens and units relays operated. The C0 relay in the line circuit C112, and the ground applied to the C lead in the register during the marking process holds the switch path set-up by the marker in the RA–R matrices. The marker resets its status flip-flop, and the relays release to return the marker to idle.

Digit 3 dialed

The subscribers at the calling station upon receiving dial tone dials the digit 3. The register is arranged to store the first digit in the second position. As instructed, the register calls for service after the first digit, so that its status and dialed digit store now contains the data 40300.

The central processor in scanning (FIGS. 26 and 26A) reaches address D409, where the instruction 10003 causes the address B011 of the first register to be placed in the accumulator. At address D409 the register number is placed in the index register. At addresses D410–412 the status of the register is checked by transferring the data from its address into the accumulator, masking it with the constant C0000 to eliminate all but the status bits, and comparing the result with the constant 4000, with the equality indicating a call for service.

Register call for service routine —FIG. 28

At address D413 the instruction is to jump to address D538. The register buffer status address B050 is read, being all zeros, and at address D539 is compared to the constant 80000 and found to be idle.

At address D540 the register number B011 from the index register is read, and at address D541 a 1 is added to give the equipment number address B012. At addresses D542 and D543 the calling line number is transferred from the register equipment store and written into the register buffer equipment number store at address B058.

At addresses D544 and D545 the register number is read from the index register and written into the register buffer store at address B057.

At address D546 the OP code 3 transfers the status and dial digit data from the register address B011, and at the next address D457 there is a jump to address D577 where the dialed digits are written into the index register. At D578 the accumulator is masked with the constant 0FFFF to eliminate the status information, followed by a jump back to address D548.

Figure 31:
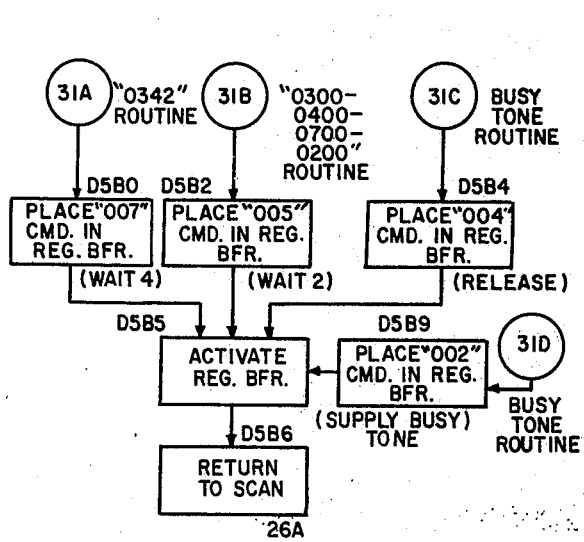
Figure 32:
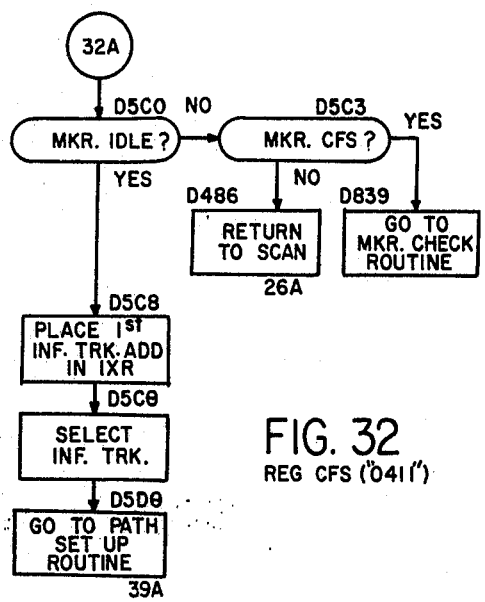

The dialed digits are then compared at addresses D548, D540, D551, and D553 with the constants 00100, 00345, 00342, and 00300, respectively, the last being an equality which causes a jump at address D554 to address D5B2 (Circle 31B of FIG. 31).

The instruction 10037 reads the constant 00005, and there is a jump to address D5B5 where the instruction is to write this constant into the register buffer command address B059. The command 5 is an instruction to the register to wait for two additional digits. At addresses D5B6 and D5B7 the constant 80000 is read and then written into the register buffer status address B050 to activate the register buffer. This causes the command to be given to the register.

Resume scanning

At address D5B8 there is an instruction to jump to address D486 (Circle 26A of FIG. 26), to read the contents of the register buffer address B057, and at address D487 to read it into the index register. There is then a jump to address E900 at which the register address is compared to a constant B039, and being an inequality the address advances to E902, with an instruction to jump to address E960. Being a legitimate register number in the index register the program returns to address D410 and continues to scan.

Local code 342 dialed

This being a local call, the subscriber next dials the digits 4 and 2 to complete the local code 342, following where the register calls for service, so that the status and dialed digits store at address B011 now reads 40342.

When the central processor next scans register B011 at address D410, the program follows the same sequence of events as that following the call for service after the first dialed digit, until address D551 (FIG. 28). The instruction 40027 causes a comparison of the constant 00342 with the dialed digits and yields an equality. At the next address D552 there is instruction to jump to address D5B0, where the instruction 10023 causes reading of a constant 00007. The next address then produces a jump to address D5B5 where the 7 is read into the register buffer command address B059. This is an instruction to the register to clear the dialed digits and wait for four additional digits. At addresses D5B6 and D5B7 a constant is read and then written into the register buffer status address B050 to actuate it. This causes the command to be placed in the register relays. The next address then contains an instruction to jump to address D486 (26A) and resume scanning.

Dialing of local call completed

Assume that the subscriber next dials the digits 5913. The register calls for service so that its status and dialed digit section now reads 45913. When the central processor next scans this register B011 at address D410 the sequence is the same as that following the first dialed digit down to address D553 (FIG. 28). At addresses D555, D557, D559, D560, and D562 there is successive comparisons with the constants 00400, 00700, 00200, 00411, and 00000. Then at address D564 there is an instruction to jump to address D566 where the dialed digits are masked with the constant 0F000, leaving 05000. Then at address D567 there is a comparison with all zeros and at address D569 there is an instruction to jump to address D5D4, which is the register calls for service "5XXX" routine (Circle 34A of FIG. 34). At addresses D5D4 and D5D5 the marker status from address B056 is read and compared with all zeros, indicating that the marker is idle and causing a jump at the next adderss to D5D0. The address then steps along until D5E1, where the dialed digit number is read from the index register.

At address D5E2 OP code 3 produces a transfer from the dialed digit address, 5913 of the data 1C015, thereby providing a translation to the ringing code 1 and equipment number C015 of the called line. At address D5E3 the equipment number is read into the index register, and at address D5E4 the translated number is compared to all zeros. Note here an important feature of the system— if the dialed digits are an unused directory number there is no word wire in the memory and therefore the translation output data is 00000. This is used at address D5E4 to enter an intercept routine. However in this call the inequality between C015 and 0000 advances the address to D5E6 where there is an instruction to jump to address D8C0. At addresses D8C0 and D8C1 there is a masking with the constants FFF00 and a comparison with the constant 0E900, the inequality advancing the address to D8C3. The first digit of the translated called line number, which is a 1, is read into the terminating junctor buffer ring code store B060. At address D8C4 the called line equipment number is read from the index register, and at the next address there is a jump to D691 (Circle 39B of FIG. 39).

Path set up routine—FIGS. 39 and 39A

At address D691 the called equipment number is read into the marker IV address B055, and at the next address there is a jump to D6C1. Next the calling line number is placed in the marker, starting with the reading of the register number from the register buffer number store B057, and adding a 1 to this at address D6D2 to obtain the address B012 of the register equipment number store. At address D6C3, with OP code 3, the equipment number is transferred into the accumulator, and at address D6C4 it is written into the marker I address B052.

At address D6C5 the called equipment number is read from address B055, and at the next address its status is transferred (OP code 3) into the accumulator, followed by a jump to address D693. At the next two addresses the status is masked with the constant C00000 and compared with all zeros, with the equality indicating that the line is idle and producing a jump at the next address to D6C8.

At addresses D6C8 and D6C9 the count of 1 is set in the index register. At addresses D6C0 and D6C0 the data 00 is read into the terminating junctor buffer command register B061, indicating that this is an ordinary call.

The terminating junctors are now scanned to select an idle one. At address D6D1, the called line equipment number is read from the marker IV address B055. At addresses D6D2 and D6D3 this is masked with the constant 0FF00 to obtain the group number, and then superimposed with the constant 000B5 to obtain the first terminating junctor number. At address D6D4 this number is read into the marker III address B054. At the next three addresses the OP code 3 transfers the status of the terminating junctor into the accumulator, OP code 7 masks it with the constant C0000, and OP code 4 compares with all zeros. It is assumed that this junctor is idle so that the next command is a jump to address D6E5 to select a matching originating junctor.

The calling line number is read from the marker I address B052 and there is then a jump to address D766. At the next four addresses the calling line number is masked with the constant 0FF00 to obtain the group number, superimposed with the last two digits B5 of the terminating junctor number, and the value 10 added twice to obtain the corresponding originating junctor number C1D5. There is then a jump to address D6E7, where the last two digits of this junctor number are written into the marker II address B053.

At the next three addresses the status of the originating junctor is transferred into the accumulator, masked with the constant C0000, and compared with the constant 80000, with the inequality indicating an idle junctor and advancing the address to D701, where there is a jump to address D702. The constant 80000 is read, and at address D703 it is written into the marker status address D056 to activate the marker.

At addresses D704 and D705 the number 0001 is read from the index register and compared with the constant 00002, with the inequality advancing the address to D707. The current address counter advances to address D708 to read the calling line number from marker I address B052. At the next three addresses the status and class of service of the calling line is transferred into the accumulator, masked with the constant 0F000, and compared with the constant 08000 to determine if this is a hot line. The inequality advances the address to D712 where there is a jump to D5B4 (Circle 31C of FIG. 31). The instruction 10038 causes the constant 0004 to be read and at the next address to be written into the register buffer command address B059. At the next two addresses the constant 80000 is read and written into the register buffer status address B050 to activate the register buffer. At the next address there is a jump to D486 (Circle 26A of FIG. 26). Scanning is now resumed, starting with a scan of the registers.

Marker

The following information is now in the marker.

| | |
|---|---|
| I–B052 | C112 |
| II–B053 | D5 |
| III–B054 | B5 |
| IV–B055 | C015 |
| B056 | Set |
| B060 | 1 |
| B061 | 0 |

The output of marker I connects battery potential to the allotter relays of A matrix group C1 and to the C1 switch in each B matrix. Relay drivers are operated for the A matrix tens relays 10 and units relays 2. Marker II operates a relay driver to connect ground to the allotter relays of the D5 switches of the A matrices and in the first B matrix. Marker III operates a relay driver to connect ground to the allotter relays of the B5 switches of the C matrices, and the BC relays of the associated terminating junctors. Marker IV connects battery potential to the allotter relays of C matrix group C0 and the BC relays of the associated terminating junctors. Relay drivers are operated for the C matrix tens relays 10 and units relays 5.

With the marker status flip-flop set, relay AL operates to complete the ground connection to operate the A, B and C matrix allotters and the BC relay of the terminating junctor. Relay BC connects the terminating junctor to the buffer flip-flops JB1–4 (B060), and RC19–20 (B061). With digit 1 stored at address B060, flip-flop JB4 is set and its output operates relay SD in the junctor. Relay BC also prepares a path for the B matrix #1 tens relay 30 and units relay 1. After twenty milliseconds the marker TU relay operates to complete the ground connection to the tens and units relays of the A, B and C matrices, and via these relay contacts to the cut-off relay in the called line circuit C015. After an interval the marker status flip-flop resets and the relays then restore to return the marker to idle. The terminating junctor supplies ground to the C lead to hold the tens and units relays of the A, B and C matrices and to hold the switch path set up by the marker.

The register buffer supplies an instruction to the register to release. The register removes ground from the RA and R matrices, C lead and drops the tens and units relays in the RA and R matrices, thereby releasing the connection from line circuit C112 to register B011.

While we have described above the principles of our invention in connection with specific apparatus, it is to be clearly understood that this description is made only by way of example and not as a limitation to the scope of our invention.

In the memory, referring to FIG. 3, the status section may use three drivers D with parallel inputs for each address, the first driver having its output connected to the wire through the core MC1 for the first status bit, the second driver having its output connected through core MC2 for the second status bit, these two wires being connected to contacts in the equipment units, and the third driver may be connected to wires through certain of the cores MC3–MC20 for class of service information.

What is claimed is:

1. A communication switching system comprising a plurality of lines and a plurality of registers;
   a switching network for interconnecting said lines or a register and a line;
   a permanent memory for storing control program sequences of orders;
   status indicating means for each line to indicate whether the line is idle, busy, or calling for service;
   a single reading means for reading information out of said permanent memory and said status indicating means;
   process control means having logic circuits, with arrangements to supply address information to said reading means, to receive program orders, status indications, and other data information therefrom, and to execute the program orders by an individual simple operation for each order, only one of said program sequences being performed at a time;
   means including a scan sequence which is one of said program sequences to supply line addresses to said reading means to read the status which is compared to constants to determine if it is a call for service status;
   another of said program sequences being a line call-for-service sequence which is entered in response to a line call-for-service status indication during said scan sequence, means operative responsive to signals from the process control means during the call-for-service sequence to cause a connection through said network to be established from said line to a register for receiving call signals from the line, call digits being recorded in accordance with the received call signals.

2. A communication switching system according to claim 1, further including status indicating means for each register to indicate whether it is idle, busy, or calling for service;
   said scan sequence including register addresses being supplied to said reading means and the status read to determine if it is a call-for-service status;
   one of said program sequences being a register call-for-service sequence entered in response to a register call-for-service status indication during said scan sequence;
   means effective during the register call-for-service sequence to read and analyze the call digits recorded in that register.

3. A communication switching system according to claim 2, further including at least one marker, there being only one marker in service at a time to receive network path data from said process control means and to supply operating signals to said switching network for establishing interconnections;
   means to test the status of the marker for idle or busy;
   means including some of said program sequences which are path-testing sequences to test the switching network for an available path, the program being arranged to enter the path-testing sequences only if the marker is idle, the call in process then being processed to completion of path testing and giving of the path data to the marker, or alternatively determining that the called line or all paths are busy, before entering any other program sequences;

whereby a path cannot become busy after path testing starts and the marker cannot be used for any other call until after the network connection is established or a busy determination is made.

4. A communication switching system according to claim 3, wherein said switching network includes a plurality of switching devices in successive stages, and junctors interconnecting the stages;

wherein each of said junctors includes status indicating means to indicate whether it is idle or busy;

said path-testing sequences including sequence orders to test the status of junctors one at a time until a complete path is found via idle junctors.

5. A communication switching system according to claim 4, wherein said junctors comprise originating junctors and terminating junctors, and said stages of the switching network include a first stage between the lines and originating junctors, a second stage between the originating junctors and the terminating junctors, and a third stage between the terminating junctors and the lines, said lines being arranged in groups, with each line assigned an address equipment number which comprises the group number and an individual number within the group, said originating and terminating junctors being divided into groups corresponding to the line groups, with the first and third network stages arranged to connect any line of the group to any junctor of the group, each junctor having an address equipment number comprising the group number and an individual number within the group, the individual junctor numbers being in a distinct set of numbers from the individual line numbers, wherein said second stage of the switching network comprises a plurality of coordinate matrices, with one side of a matrix connected to one originating junctor of each group having the same individual number, the other side of each matrix connected to one terminating junctor of each group having the same individual number;

wherein the path testing sequences comprise selecting one type of junctor having the group number of one of the lines to be connected and the first individual junctor number and testing the status thereof, and each time a busy status is found advancing the individual count to test the status of the next junctor until an idle junctor is found, and then selecting a junctor of the other type having the group number of the other line to be connected and a number indicating the junctor on the same matrix as the selected junctor and testing the status, with a busy status advancing the individual number of the junctor of the first type until an other idle one is found and then testing the corresponding junctor of the second type, advancing in this manner until two idle junctors on the same matrix of the second stage are found for connecting the two lines.

6. A communication switching system according to claim 5, wherein each of said switching stages comprises a plurality of switches each having a first set and a second set of actuating magnets with the switching devices being contacts of said magnets in series to form a connection through a stage, each switch of the first stage having a switch bus individually connected to an originating junctor, and each switch of the third stage having a switch bus individually connected to a terminating junctor, and there being a plurality of multiple conductors connecting the lines of each group to all of the first and third stage switches of that group, the individual equipment number of each line comprising two digits one designating one of the magnets of one set and the other designating one of the magnets of the other set of each switch, each switch being arranged upon actuation of an actuating magnet of each set to connect its switch bus to the multiple conductors of line designated by the two digits;

whereby the data from the process control means to the marker and supplied therefrom to the switching network comprises the group and individual number of one line, the group and individual number of the other line, and the individual numbers of the selected junctors to thereby select the first and third stage switches connected to those junctors in the designated respective groups, and supply the individual line numbers to the respective switches to connect to the lines, the individual junctor numbers being effective to select a matrix of the second stage, and the group numbers of the two lines to select the specific connection through that matrix.

7. A communication switching system according to claim 1, wherein said permanent memory comprises a plurality of ring-shaped magnetic cores with an individual sense winding on each core, word wires selectively threaded through the inside of some of said cores and outside of others to thereby store information, and wherein said reading means includes input address means to select one of said word wires and supply a current pulse thereto, to thereby generate an output pulse in the sense winding of each core having the selected wire threaded through it.

8. A communication switching system as claimed in claim 7, wherein said status indicating means includes at least two switching devices for each line, each of said switching devices being connected in series with the wire threaded through the inside of at least one of said cores and connected to said input address means, the switching devices of any one line being connected to wires threaded through different cores and connected to be selected by the same address, the completion of a path for the memory input current pulse being dependent upon the switching device in series therewith being closed, whereby the presence or absence of an output pulse in the sense winding of a core signifies whether the switching is respectively closed or open, and the combination of the two outputs identifies the status of the line.

9. A communication switching system according to claim 8, wherein said switching devices comprise relay contacts in line circuits associated with the respective lines.

10. A communication switching system as claimed in claim 8, wherein said switching network includes a plurality of stages and a plurality of junctors interconnecting the stages;

wherein each of said junctors includes status indicating means comprising a switching device connected in series with a wire threaded through one of the cores used for line status indication, and connected to said input address means to be actuated by an address distinct from any of the line equipment addresses, and wherein said program sequences include a path-testing sequence in which said status of said junctors are tested to find an available path.

11. A memory arrangement for a system having common control apparatus and a plurality of peripheral units;

said memory arrangement comprising a plurality of ring-shaped magnetic cores with an individual sense winding on each core, word wires selectively threaded through the inside of some of said cores and outside of others to thereby store information, and memory input address means to select one of said word wires and supply a current pulse thereto, to thereby generate an output pulse in the sense winding of each core having the selected wire threaded through it;

the improvement comprising each of said peripheral units having a status indicating switching device, each of said switching devices being connected in series with a wire threaded through the inside of at least one of said cores and connected to said input address means so that in response to an address selecting a peripheral unit the completion of a path for the memory input current pulse depends upon the switching device being closed, whereby the presence or absence of an output pulse in the sense winding of said one core signifies whether the switching device is respectively closed or open, and thereby identifies the status of the peripheral unit.

12. A memory arrangement according to claim 11, in which said cores have a substantially linear magnetization characteristic.

13. A memory arrangement according to claim 12, in which said switching devices are relay contacts.

14. A memory arrangement according to claim 12, wherein at least some of said peripheral units have a plurality of said switching devices connected to respective wires through different ones of said cores to said input address means so that wires to switching devices in the same peripheral unit are selected in response to the same address, whereby a number of states for each unit equal to the number of combinations of the switching devices being open and closed may be identified by the output pulses from the sense windings.

15. A memory arrangement according to claim 12, in which at least some of said peripheral units each have an individual word wire which is threaded through other of said cores to store information relating to that unit, and having the same address as said wire in series with the switching device of that unit.

16. A memory arrangement according to claim 12, in which word wires in series with said peripheral unit switching devices comprise a status section of the memory, and other word wires, comprising a program section, store control program sequences of orders; with the addresses in the two sections being distinct, while being part of a single set of numbers.

17. A memory arrangement according to claim 16, for use in a communication switching system in which some of said peripheral units are line circuits, each having an individual equipment number, and at least some of the line circuits have at least one directory number associated therewith;

said memory arrangement further including a translation section comprising other of said word wires, each having a directory number as a memory input address and stored information which is the equipment number of the line circuit associated therewith.

18. A memory arrangement according to claim 17, in which the memory input address means includes address register means to store a given number of digits forming the addresses, each digit having more than ten possible values, with ten of the values designated as decimal values; wherein each said directory number address has every digit equal to a decimal value, and each of said status section and program section input addresses has at least one digit having a value other than decimal.

19. A memory arrangement according to claim 17, further including means responsive to all zeros output from the memory when a directory number translation address is supplied thereto to cause a connection to be established from the calling line circuit to a line circuit having a trunk line to an intercept operator, whereby no word wires are required in the memory for unused directory numbers to provide intercept service.

References Cited

UNITED STATES PATENTS

| | | |
|---|---|---|
| 2,843,838 | 7/1958 | Abbott. |
| 3,139,486 | 6/1964 | Bray et al. _____ 179—8 |

WILLIAM C. COOPER, Primary Examiner